US005160264A

United States Patent [19]

Banura et al.

[11] Patent Number: 5,160,264

[45] Date of Patent: Nov. 3, 1992

[54] RADAR TARGET SIMULATOR

[76] Inventors: George A. Banura, 621 Joyner; Richard L. Noland, 441 Cheyenne Cr., both of, Ridgecrest, Calif. 93555

[21] Appl. No.: 687,882

[22] Filed: Dec. 31, 1984

[51] Int. Cl.[5] .................. G01S 7/40

[52] U.S. Cl. .................. 434/2; 342/169; 342/171

[58] Field of Search .................. 343/17.7; 434/2

[56] References Cited

U.S. PATENT DOCUMENTS

| | | | |
|---|---|---|---|
| 3,277,476 | 10/1966 | Sabin et al. | 343/17.7 |
| 3,903,521 | 9/1975 | Jensen et al. | 343/17.7 |
| 4,168,502 | 9/1979 | Susie | 343/17.7 |
| 4,278,430 | 7/1981 | Bauer et al. | 434/2 |
| 4,467,327 | 8/1984 | Drake et al. | 343/17.7 |

*Primary Examiner*—T. H. Tubbesing
*Assistant Examiner*—Mark Hellner
*Attorney, Agent, or Firm*—Melvin J. Sliwka; John L. Forrest, Jr.

[57] ABSTRACT

A programmable radar target simulator provides microwave signals for testing a missile that is otherwise controlled by such signals when it is deployed. The simulator has the capability for initiating suitable microwave signals at the proper power levels in the fully automatic, semi-automatic, or fully manual modes. A control section and an IF section accept digital commands from an external computer or manual control from switches and thumbwheels on the front panel of the simulator to provide for the automatic and manual control signals respectively. A frequency synthesizer section provides three frequency modulated IF signals and one amplitude modulated coding signal which respectively are fed to the IF section and to the control section. Doppler frequency shifts are extracted and representative signals are provided in both AC and DC forms to a microwave section. The microwave section uses the frequency modulated input IF signals and microwave switching commands from the IF section to generate and output proper microwave signals which are used to simulate a target for the missile. A frequency and power metering section assures that the microwave signals emanating from the microwave section are of the proper frequency and power level and a DC power section assures a stabilized source of DC power for all the sections heretofore listed.

7 Claims, 78 Drawing Sheets

| BIT # | FUNCTION | DESCRIPTION |
|---|---|---|
| 1 | SURFACE | Surface mode is entered when bit 1 is high. |
| 2 | PD | PD mode is entered when bit 2 is high. |
| 3 | CW | CW mode is entered when bit 3 is high. |
| Note: | Since the SURFACE, PD and CW functions are ganged together in a single switch, then only one mode can be selected at any one time. | |
| 4 | FIXED/SWEPT (FS1) | This switch, which is located along with the FS1 functions, causes FS1 to have a fixed doppler if bit 4 is low and a swept doppler if bit 4 is high. |
| 5 | FIXED/SWEPT (FS2) | Performs a similar function as FIXED/SWEPT (FS1). |
| 6 | M-CODE ON/OFF | This switch adds the mother coding on the rear signal if bit 6 is high and shuts mother code off if bits 6 is low. |
| 7 | INT MOD HI/LO | This switch results in a high FM ranging modulation index (sea sparrow) when high and low FM ranging modulation index (CW) when low. |
| 8 | INT MOD ON/OFF | This switch applies the FM ranging modulations when high and removes the FM ranging modulations when low. |
| 9 | EXT MOD ON/OFF (FS1) | This switch connects the external modulations to board B-18 (FS1 Doppler) when high and disconnects the external modulations when low. |
| 10 | EXT MOD ON/OFF (FS2) | This switch connects the external modulations to board B-19 (FS2 Doppler) when high and disconnects the external modulations when low. |
| 11 | EXT MOD HI/LOW (FS1) | This switch increases the FM modulation index of the external modulations for FS1 when high and decreases the FM modulation index when low. |
| 12 | EXT MOD HI/LOW (FS2) | Similar to EXT MOD HI/LOW (FS1). |

FIG. 6

D = 4-bit BCD DIGIT

| FUNCTION | FUNCTION ADDRESS: BINARY CODE | DEC | ENT # | COMMAND FORMAT | RESET VALUE OF COMMAND: DIGITAL | DECIMAL | UNITS |
|---|---|---|---|---|---|---|---|
| RESET | 00000000 | 0 | RESET | N/A | N/A | N/A | N/A |
| RF MODE | 0000 0001 | 1 | 1 | (X2H/X2L)(X1H/X1L)(X2/MOD)(X1)<br>(Int Mod On/Int Mod Off)(Int Mod Hi/Int Mod Lo)<br>(MC ON/MC OFF)(S2/F2)<br>(S1/F1)(CW)(PD)(SU) LSB | (X2L)(X1L)(NO X2 MOD)(NO X1 MOD)<br>(INT MOD OFF)(INT MOD LOW)(MC ON)(F2)<br>(F1)(CW)(NO PD)(NO SU) | N/A | N/A |
| RANGE | 0000 0011 | 3 | 3 | $D_3 D_2 \cdot D_1$ | 0000 0010·0100 | 2.4 | Nautical Miles |
| FIXED DOPPLER1 | 0000 0101 | 5 | 5 | (−/+)(0.5/0)$D_3 D_2 D_1$ | (0)00000 1110 0000 | +070.0 | KHZ |
| SWEEP RATE 1 | 0000 0111 | 7 | 7 | (−/+)(H/0/D)(X10/X1)$D_3 D_2 D_1$ | (0)0000000011 1000 | +038 X 1 NO HOLD | KHZ/SEC |
| SWEEP DURATION 1 | 0000 1001 | 9 | 7 | $D_4 D_3 \cdot D_2 D_1$ | 0000 0000·0000 0000 | 00·00 | SEC |
| FIXED DOPPLER 2 | 0000 1011 | 11 | 11 | AS FIXED DOPPLER #1 | | | |
| SWEEP RATE 2 | 0000 1101 | 13 | 13 | AS SWEEP RATE 1 | | | |
| SWEEP DURATION 2 | 0000 1111 | 15 | 13 | AS SWEEP DURATION 1 | | | |
| REAR POWER | 00001 0001 | 17 | 17 | (1/0) $D_2 D_1$ | | 120 | -DBM |
| REAR CAL | 0000 0010 | 2 | 17 | $D_2 D_1$ | SET BY FRONT PANEL | | DB |
| FS1 PWR | 0001 0011 | 19 | 19 | (1/0) $D_2 D_1$ | | 120 | -DBM |
| FS1 CAL | 0000 0010 | 4 | 19 | $D_2 D_1$ | SET AT FRONT PANEL | | DB |
| FS2 PWR | 00001 0101 | 21 | 21 | (1/0) $D_2 D_1$ | | 120 | -DBM |
| FS2 CAL | 0000 0110 | 6 | 21 | $D_2 D_1$ | SET AT FRONT PANEL | | DB |
| FS3 PWR | 0001 0111 | 23 | 23 | (1/0) $D_2 D_1$ | | 120 | -DBM |
| FS3 CAL | 0000 1000 | 8 | 23 | $D_2 D_1$ | SET AT FRONT PANEL | | DB |
| FS4/FT PWR | 0001 1001 | 25 | 25 | (1/0) $D_2 D_1$ | | 120 | -DBM |
| FS4/FT CAL | 0000 1010 | 10 | 25 | $D_2 D_1$ | SET AT FRONT PANEL | | DB |
| FREQ & POWER METERS | 0001 1011 (D2 D1) | 27 | 27 | $D_2 D_1$<br>Di<br>0 REAR REAR<br>1 FS1 ANT1<br>2 FS2 ANT2<br>3 – NBF<br>4 – WBF<br>5 – REF | → Input to power meter.<br>→ Input to freq. meter. | | |
| MICROWAVE OUTPUT SWITCHING | 0000 1100 | 12 | 12 | BIT#<br>1 (FS1→ANT#1)<br>2 (FS2→ANT#1)<br>3 (FS1→ANT#2)<br>4 (FS2→ANT#2)<br>5 (FT→ANT#2)<br>6 (REAR ON)<br>7 (NBF ON)<br>8 (WBF ON) | 00000000 | NO MICROWAVE OUTPUT | |

IF SECTION

*FIG. 7*

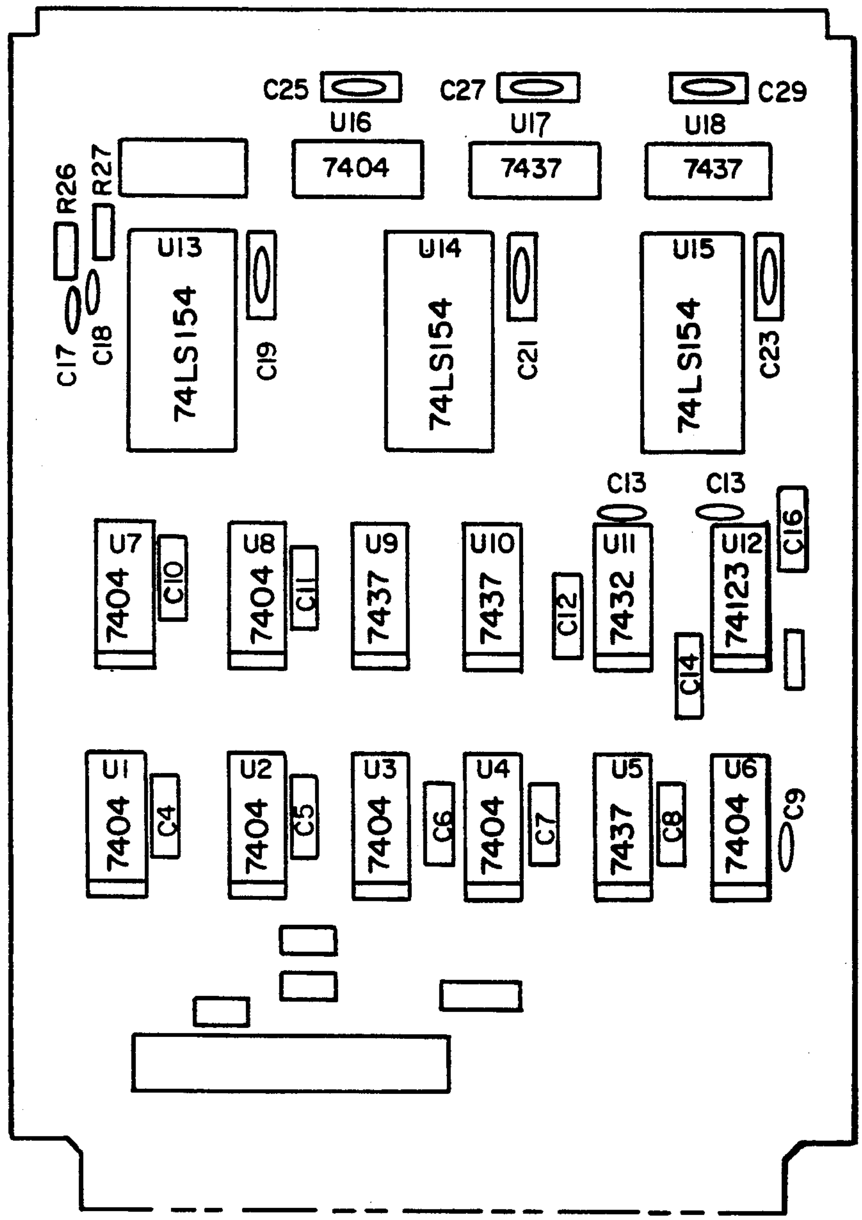
FIG. 14 ADDRESS DECODER BOARD

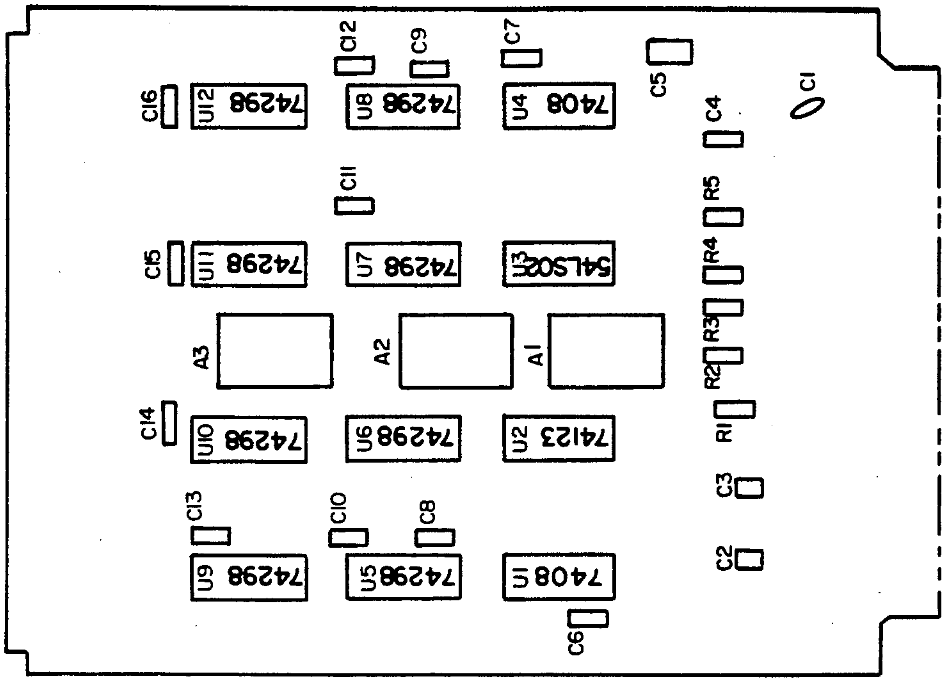
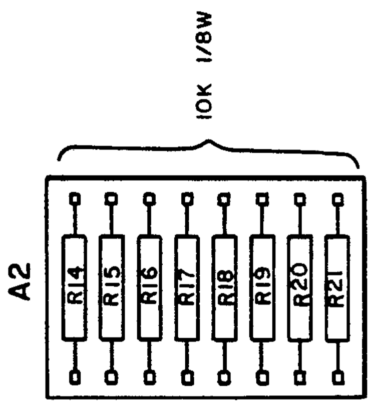
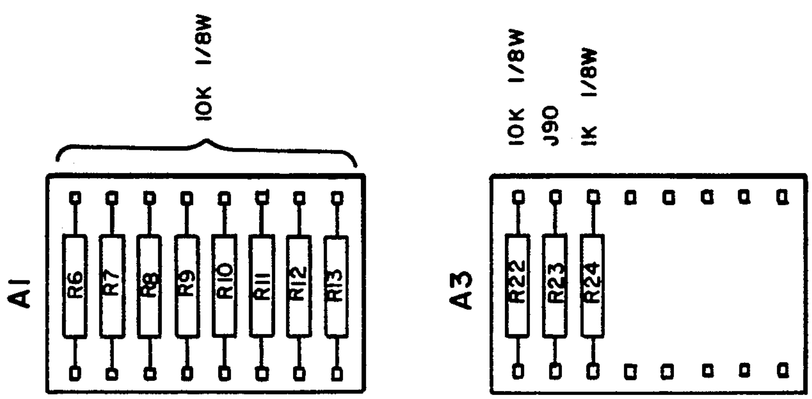
FIG. 22

| | BOARD NO. | ADDRESS BIT AD-a | | AD-b | ENT X |
|---|---|---|---|---|---|
| REAR | B-10 | 17 | | 2 | 17 |
| RF1 | B-11 | 19 | | 4 | 19 |
| RF2 | B-12 | 21 | | 6 | 21 |
| RF3 | B-13 | 23 | | 8 | 23 |
| RF4 | B-14 | 25 | | 10 | 25 |

TABLE 1. ADDRESS AND ENTER ASSIGNMENTS

FOR OPTIMUM RESULTS USE: R20 = R23 = 38.3K, R24 = R27 = 37.4K, R23' = R27' = 2K VAR.

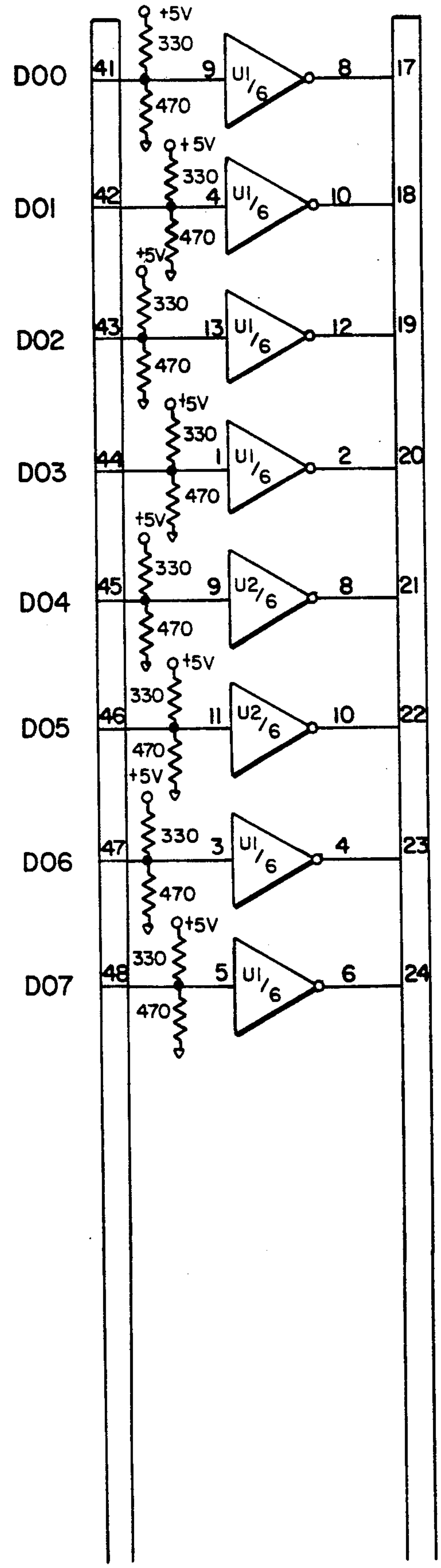
FIG. 33a
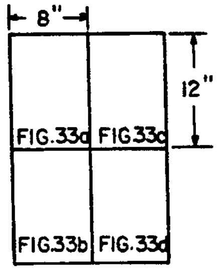

RADAR TARGET SIMULATOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates to an apparatus for simulating radar reflected target images for training and other simulation purposes. In greater particularlity a programmable radar target simulator is capable of operating in the fully automatic, semi-automatic and fully manual modes of operation. In still greater detail the multimode programmable radar target simulator is fabricated from a reduced number of components to improve reliability yet affording flexibility and a variety of waveforms to realistically portray target sequences.

BACKGROUND OF THE INVENTION

The effective deployment of highly sophisticated and expensive missile systems requires a high level of competence. To achieve this level of competence training must be realistic and at the same time cost effective. Live firings while providing valuable experience at some phases of the training program, generally may not be suitable for teaching and are expensive even when practicing with reuseable decoys.

Target simulators increasingly are used for training purposes as well as providing a reference test source for system readiness. Signals have been generated which it is hoped simulate a reflected radar image. Circuitry which produces Doppler shifted signals at different power levels in response to analog control signals have been developed. However, by and large, the simulators have been unduly complicated and therefore susceptible to reliability problems. Frequently, the simulators were programmed to simulate a particular flight envelope of a target and lacked the flexibility to be modified, in part, by manual inputs or actuated with fully automatic or fully manual inputs to allow characterization of a variety of flight envelopes that include routine and erratic target flight patterns.

Thus, there is a continuing need in the state-of-the-art for a programmable radar target simulator capable of operation in a fully automatic, semi-automatic or fully manual mode of operation while being of uncomplicated design to assure a full display of operating test parameters for an operator.

SUMMARY OF THE INVENTION

The present invention is directed to providing an apparatus for providing microwave signals that simulate a target for a missile in a fully automatic, semi-automatic or fully manual mode of operation. An external computer provides automatic digital command signals and a plurality of front panel switches provide for manual digital command signals which are fed to a control section. The control section provides controlling signals representative of the mode of operation and drives a frequency synthesizer that synthesizes first, second and third frequency modulated IF signals and an amplitude modulated coding signal. An IF section also receives the digital command signals and stores them for extracting Doppler frequencies in both AC and DC forms. These signals along with the output signals from the control signals are fed to a microwave section for generating the microwave signals to simulate a target for the missile. Frequency and power meters are provided which are coupled to the source of the digital command signals to assure that the signals from the microwave section are within the proper ranges.

It is a prime object of the invention to provide an improved programmable radar target simulator capable of operating in several modes.

Another object is to provide a multimode target simulator being capable of fully automatic semi-automatic and fully manual modes of operation.

Yet another object is to provide for a target simulator having the capability to be digitally controlled and selectively changeable to portray anticipated target flight envelopes.

Still another object of the invention is to provide for the generation of microwave signals for an anti-air missile that allows programmable power levels in 1 dB steps over six microwave outputs.

Still another object is to provide for the independent control of doppler information in conjunction with the aforementioned six microwave outputs.

Yet a further object is to provide for programmable manual switching of microwave outputs from one or two antennas without needing a disconnection of circuitry to the microwave signals lines.

These and other objects of the invention will become more readily apparent from the ensuing description when taken with the appended claims and associated drawings.

BRIEF DESCRIPTION OF THE DRAWINGS

FIG. 6 shows specific functions of the RF mode command.

FIG. 7 is a graphic display of the digital command in the operation of the control section and IF section.

FIG. 11(*b*) shows synchronization of PD Mother Coding.

FIG. 11(*c*) portrays a surface-to-surface sawtooth waveform $f_s(t)$.

FIG. 11(*d*) is a showing of FM power density for each RF output in 1 Hz bandwidth.

FIG. 14 is the address decoder board B-1 of the control section.

FIG. 22 is fixed Doppler and sweeprate board B-5.

FIGS. 33a, 33b, 33c and 33d show the constituents of board B-22.

DESCRIPTION OF THE PREFERRED EMBODIMENT

Figure 1:
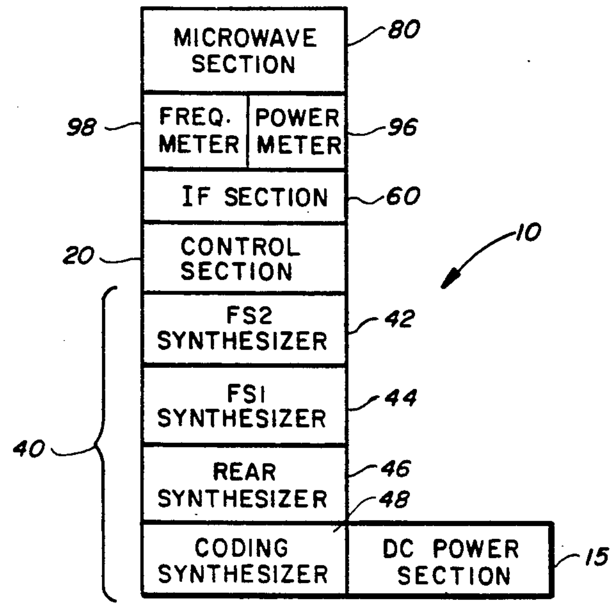
FIG. 1 is a block diagram representation of the simulator depicting a typical layout of the functioning modules.

Referring now to the drawings FIG. 1 shows a front view of the panel of the simulator 10 that has the capability for operation in three modes. In the automatic mode digital command signals are preprogrammed from an external computer source 40 and fed to the simulator through an internal 24-bit system bus. In the semi-automatic mode an operator-instrument interaction is allowed to permit a partial changing of the parameters. In the fully manual mode the simulator is fully controlled by digital command signals entered by an operator through switches and thumbwheels on the front panel 21a of a control section 20 of the simulator.

Figure 3A:
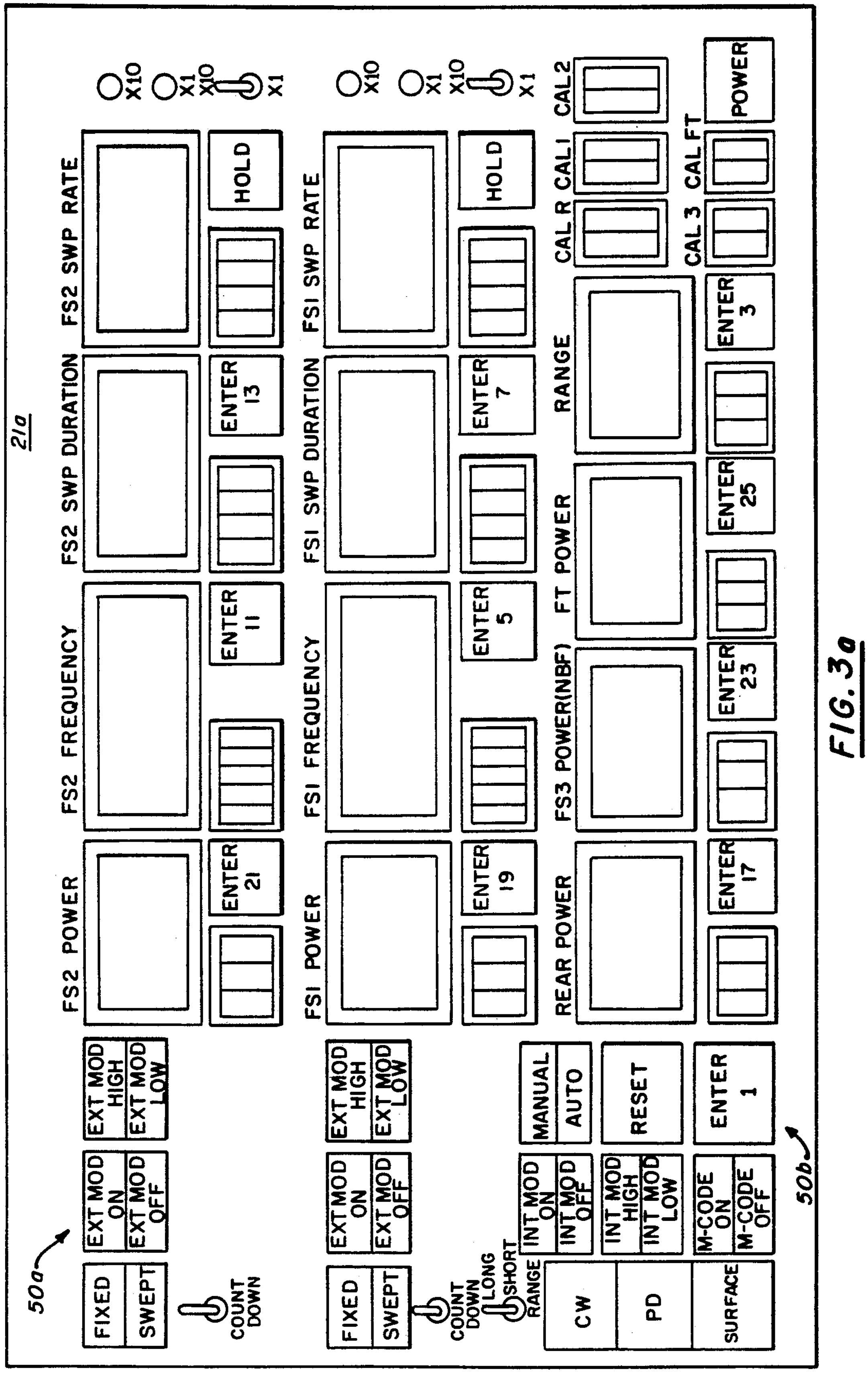
FIGS. 3*a*, 3*b*, 3*c* and 3*d* show the front and rear panels of the control section and the IF section, respectively.
Figure 3B:
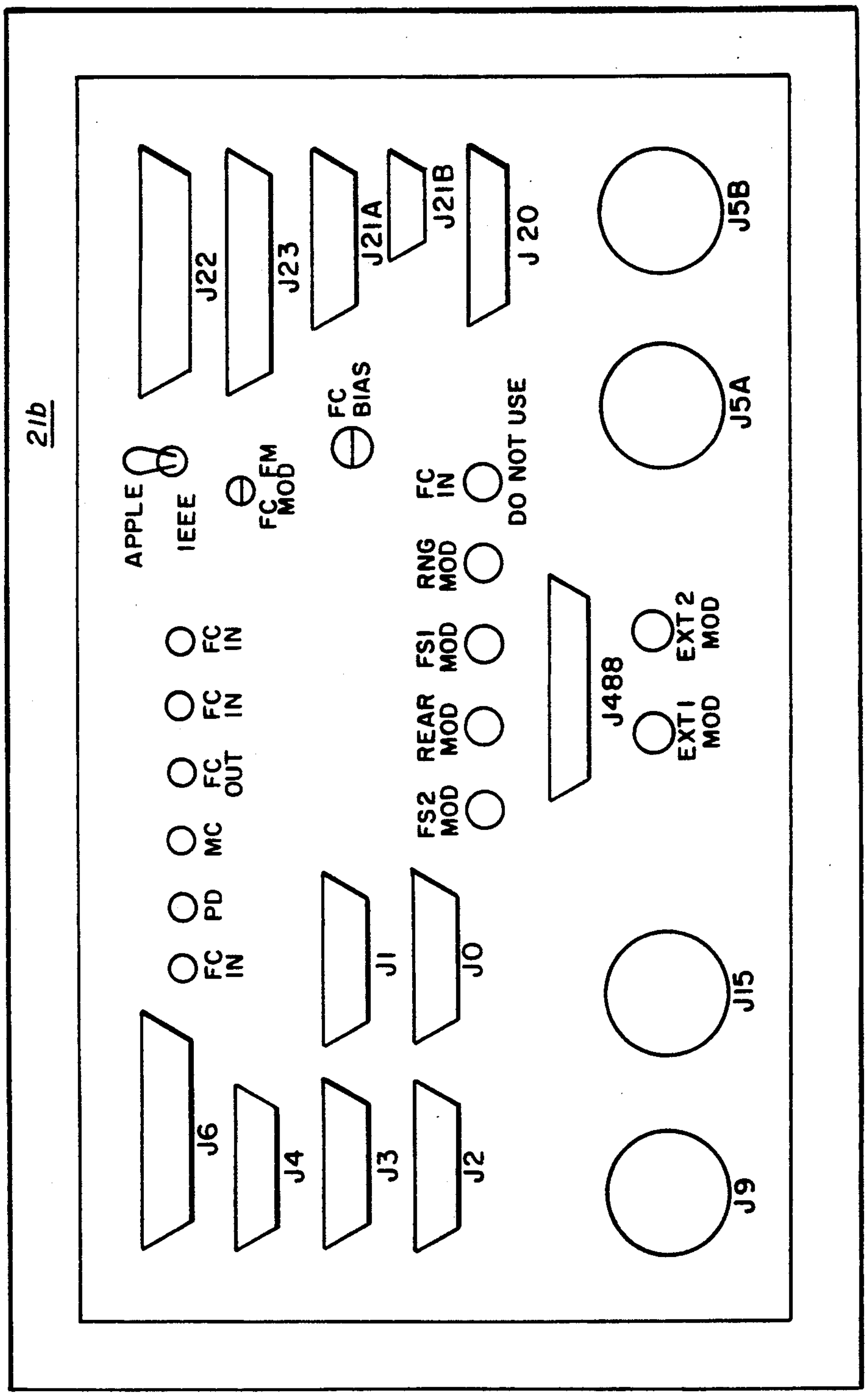
Figure 3C:
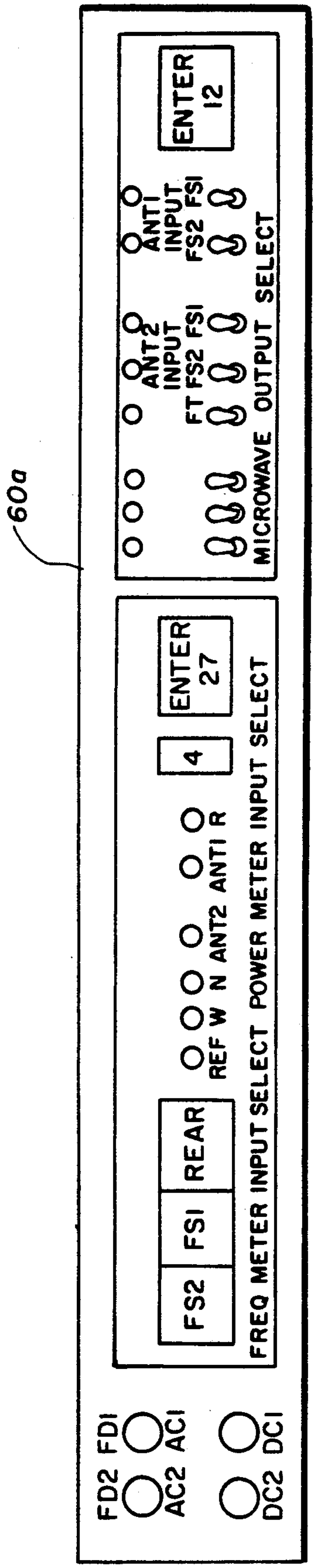
Figure 3D:
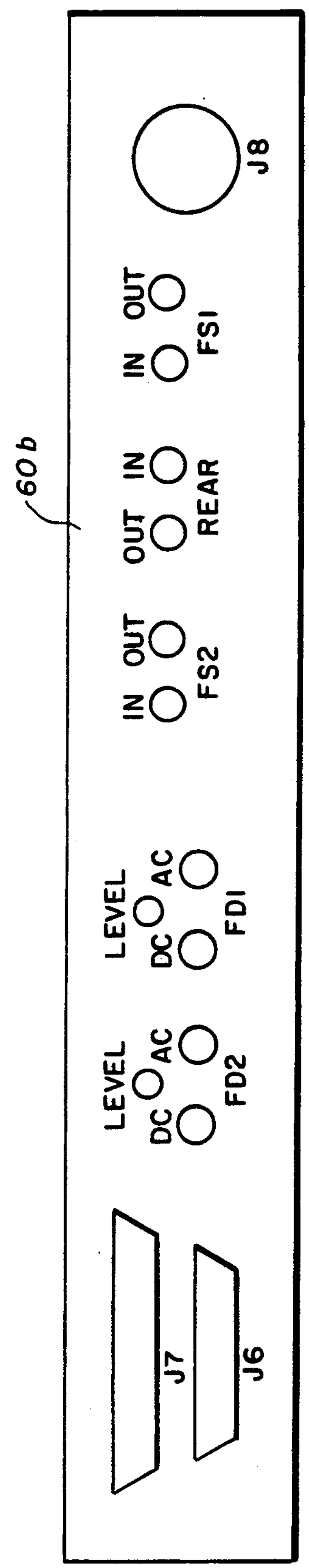

The simulator was designed with simplicity of operation in mind. FIGS. 3a, 3b, 3c a and 3d show a front panel 21a and back panel 21b of a control section 20 and an IF section 60 that has front and rear panels 60a and 60b. The panels were configured to be a program guide to an operator with full display of the operating test parameters.

The simulator supplies all the necessary microwave signals for the Sparrow missile. Modifications within the scope of this concept could accommodate other missiles. It provides six microwave outputs with programmable power levels in 1 dB steps. All the necessary modulations are internally provided. External modulations can also be applied. Two front signals which carry the Doppler information are independently controlled and each Doppler can be programmed in a fixed value with 500 Hz resolution or can be swept with 1 kHz per second to 10 MHz per second sweep rates. A hold feature is included to permit synthesis of complex Doppler waveforms.

Further capabilities of the simulator, to be elaborated in detail below, include programmable manual switching of the microwave outputs such that either front panel signals or a combination of both front panel signals can be applied to a first antenna or a second antenna output. This switching feature eliminates the need to manually disconnect or reconnect the microwave signal lines. Furthermore the simulator is capable of providing output levels of up to +5 dBm on all outputs. The MICROWAVE oscillators in the simulator have an excellent frequency modulation noise specification that is better than −113 dB at 1 kHz away from the carrier frequency.

Figure 2:
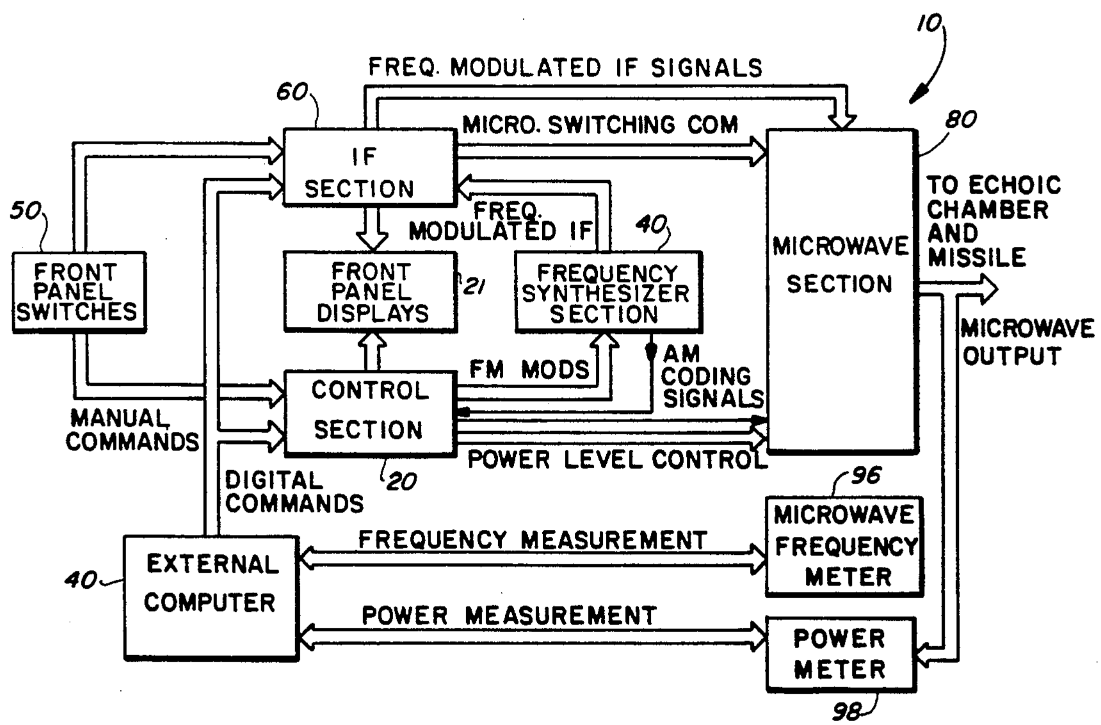
FIG. 2 is a simplified functional diagram of the programmable radar target simulator.

The basic function of the simulator is to provide the necessary microwave signals needed for testing the guidance of an air-to-air missile. The front view of the simulator of FIG. 1 is elaborated on along with the functional interconnections in FIG. 2. From these figures it is seen that the simulator consists of six basic sections.

A control section 20 accepts digital command signals from either an external computer 40′ or from a number of manual or front panel switches 50 that are located as switches and thumbwheels 50a and 50b on front panel 21a of the control section 20. These digital commands are stored in the control section then are sequentially displayed on the front panel. The stored digital command signals are then used to control the operation of the other sections of the simulator. These control commands include power level control commands sent to a microwave section 90 and RF mode commands which are sent to several modulation circuit boards within the control section itself. These modulation circuit boards generate the required modulations as indicated below and send these modulations to a synthesizer section 40.

The synthesizer section consists of four synthesizers 42, 44, 46 and 48. A front signal No. 2 (FS2) from synthesizer 42, a front signal No. 1 (FS1) from synthesizer 44, a rear synthesizer 46 and an AM coding signal synthesizer 48 are the constituents of the synthesizer section. These synthesizers accept the modulations sent by control section 20 and outputs three frequency modulted IF signals and one amplitude modulated coding signal. The three frequency modulated IF signals are sent to the microwave section via an IF section 60 while the coding signal is sent to control section 20 for bias addition and subsequent transmission to a CW oscillator in microwave section 90.

IF section 60 is similar to the control section in that it accepts computer or manual digital command signals. These commands signals are stored and then sent to microwave section 90 for controlling the microwave switches there. In addition, the IF section receives the three modulated signals and extracts the Doppler frequencies of FS2 and FS1. These extracted doppler frequencies are provided in both AC and DC forms.

Microwave section 90 using the modulated input IF signals from the IF section and the power level control commands from the control section generates and outputs the proper microwave signals which are used to stimulate the missile. Elaboration on this section as well as the other sections here generally described will follow in much greater detail below.

A frequency meter 96 and a power meter 98 are used for measuring the frequency and output power levels of the microwave signals. The resulting measurement is read back by computer 40 via a pair of appropriate buses thereby implementing frequency and power control loops.

The last section of the simulator is the DC power section 15. This provides the necessary DC supply voltages of 5, ±15, +20, and +28 volts to drive control section 20, IF section 60 and microwave section 80. The power control interconnections have been deleted from FIG. 2 of the drawings to avoid complicating the functional diagram.

Figure 4:
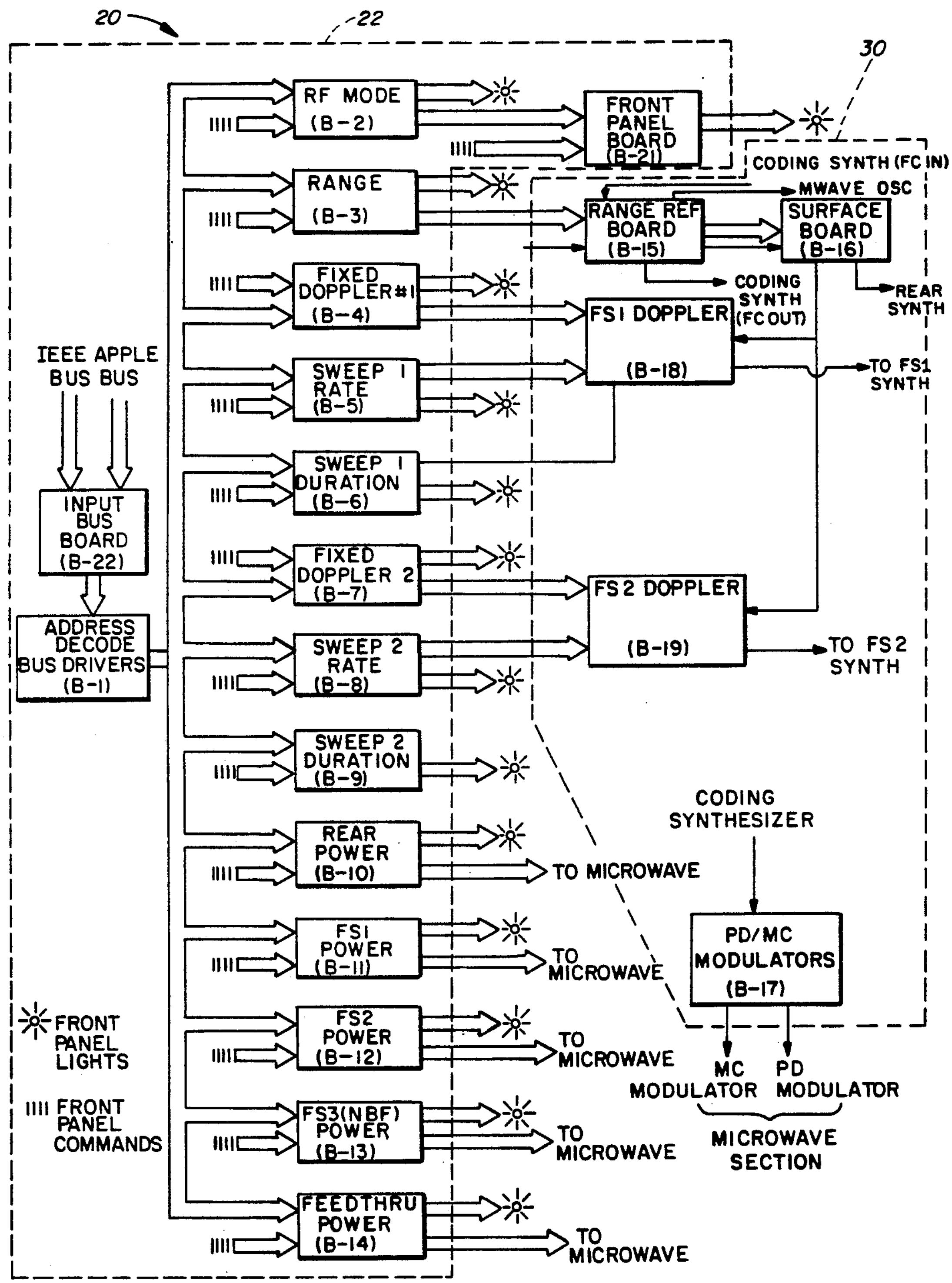
FIG. 4 is a block diagram of the control section.

Referring to FIG. 4 of the drawings, control section 20 is divided into two subsections, those being a commands-subsection 22 and a modulations-subsection 30. The commands-subsection is formed of appropriately interconnected circuit boards B-1 through B 14 along with board B-21 and B-22. The modulations-subsection includes the appropriately connected circuit boards B-15 through B-19.

The commands-subsection accepts the control commands which are entered either through the switches and thumbwheels located on front panel 21*a* of control section 20 or through a 24-bit system bus that is accessed by a computer connector extending between external computer 40' through the control section. The 24-bit system bus is divided into an 8-bit address (functional) bus and a 16-bit data (function value) bus. The commands-subsection utilizes nineteen addresses to designate the various types of commands. At this point it should be noted that IF section 60 uses two additional addresses.

To simplify the use of the simulator the front panels of the control and IF sections are configured such that the order of command bits on the data bus is the same as that indicated by the displays and the commands address (function type) is given at the ENTER buttons at the front panel, see FIG. 3*a*. Thus, the front panels serve as a programming guide to the operator. The pictorial representation of the front panels of the control and IF sections are shown in FIGS. 3*a* and 3*c*.

The digital commands of the simulator are grouped and described as follows:

1. RF mode command consists of twelve bits with each bit providing a specific function, see FIG. 6 of the drawings.

The two count down switches are not programmable, their purpose is to allow the operator to see the countdown of the sweep length (duration) on display. The long/short range switch is also not programmable and it is used by printed circuit board B-16*a* in the surface mode.

2. Manual/automatic is a specific digital command that when MAN is selected, all commands are entered via the front panels and when AUTO is selected all commands are sent by external computer 40.

3. The RESET command is used to initialize the simulator by entering a known internal set of commands by turning on the simulator (a power-on reset), by activating an address designated 31 in the AUTO mode or when the RESET button is pushed in the manual mode. The RESET Light will turn on for approximately two seconds whenever the RESET Mode is activated, see FIG. 7.

4. REAR power command consists of nine bits and specifies the FS2 power level in dB arriving at the front mixer of the missile being simulated or tested. The value entered by this command is subtracted internally in printed card B-10 from the CALR command and the result is sent to the rear programmable attenuator in the microwave section. In the manual mode, both the REAR POWER and the CALR are entered by ENTER 17 whereas, in the AUTO mode, the REAR POWER was address 17 while CALR was address 2. Please note again FIG. 7.

5. FS1 power, FS2 power, FS3 power and FS4 power commands are similar to the REAR POWER command. FIG. 7 shows the necessary addresses and enter numbers that are associated with each command. Note that FS4 represents the feedthrough signals. FS3 represents the narrowband frequency signal. The wideband frequency signal is always held at 10 decibels below the NBF signal which is discussed below in the calibration signal.

6. The RANGE command consists of twelve bits and specifies the range at launch. The range command is used to generate a phase delay in the FM ranging (in CW and SUR) of two front signals (FS1,FS2) as referenced to the rear signal. The range phase delay is 0.189° per nautical mile in CW; 0.378° per nautical mile in surface-to-air (long range) and 1.89° per nautical mile in surface-to-surface (short range). This command should be set larger than 0.5 nautical miles.

7. The FIXED DOPPLER No. 1 and FIXED DOPPLER No. 2 commands each is fourteen bits long. The MSB results in a positive Doppler when low and negative Doppler when high. The preceding twelve bits specify the value of the Doppler using BCD format. The LSB adds 0.5 kHz to the value of the Doppler if the LSB is high, and adds 0 kHz if the LSB is equal to zero. Inside the simulator, these two commands are converted in boards B-18 and B-19 to analog DC voltages which are fed into the FM ports of FS1 and FS2 synthesizers resulting in the necessary Doppler offset. The proper address and ENTER buttons associated with FIXED DOPPLER No. 1 and FIXED DOPPLER No. 2 are indicated in FIG. 7 along with the reset values of 70 kHz.

8. The digital commands for SWEEP RATE No. 1 and SWEEP DURATION No. 1 are provided for. Any ramp function can be specified by three quantities which are the starting frequency, the ramp rate and the time duration of the ramp. Whenever the swept mode of Doppler No. 1 is commanded (by setting bit 4 of RF mode command to high), a ramp will be generated 2 microseconds after the reception of both the SWEEP RATE and SWEEP DURATION commands. The resulting ramp or sweep will have a starting frequency equal to that commanded by the FIXED DOPPLER command. Thus, the FIXED DOPPLER command plays a role in both the fixed Doppler mode and the sweep Doppler mode. Two other subcommands are associated with the Doppler ramp function. These are the HOLD and the X10/X1 subcommands. The HOLD command, when active high, prevents the ramp at the end of the sweep from returning to its starting value, and when low, forces the ramp at the end of the sweep to return to its starting value. The X10/X1 subcommand multiples the ramp rate by a factor of 10 when high, and by a factor of 1 when low.

The SWEEP DURATION command consists of sixteen bits in the BCD format (fourth BCD digits), while the sweep rate command consists of fifteen bits. The fifteen bits of the sweep rate command are divided as follows:

(a) The MSB indicates the slope of the ramp. The slope will be positive (rising ramp) if MSB is low and negative (falling) if MSB is high.

(b) The following twelve bits indicate the ramp rate using the BCD format.

(c) The hold subcommand is active when high and inactive when low.

(d) The LSB of the sweep rate command determines whether the sweep rate as given by (b) above should be multiplied by a factor of 10 or 1. The multiplication factor will be 10 if LSB is high and 1 if the LSB is low.

In the AUTO mode, the SWEEP RATE No. 1 command has address 7 while SWEEP DURATION No. 1 has address 9. In the MANUAL mode, both SWEEP RATE No. 1 and SWEEP DURATION No. 1 are entered with a single enter 7 button. Note that the HOLD and the X10/X1 are parts of the SWEEP RATE command. The above addresses and enter numbers are indicated in FIG. 7 along with the command format and the reset values.

Inside the simulator -31, SWEEP RATE No. 1, SWEEP DURATION No. 1, and FIXED DOPPLER No. 1 are all sent to board B-18 via boards B-4, B-5 and B-6. Boards B-4 and B-5 are identical and are used for storing FIXED DOPPLER No. 1 and SWEEP RATE No. 1 commands. B-6 in addition to storing the SWEEP DURATION command, has a 4-digit BCD down counter that outputs a timing pulse whose width is equal to the command sweep duration. The timing pulse is used to reset the ramp generator in B-18.

9. SWEEP RATE No. 2 and SWEEP DURATION No. 2 are two commands used in conjunction with FIXED DOPPLER 2 command in the same fashion as discussed in item 8 above. FIG. 7 shows the command's format along with the reset values.

10. The MICROWAVE OUTPUT SWITCHING is a command which is sent to the IF section and consist of eight bits. These bits are divided as follows. The first bit (LSB) connects FS1 microwave output to antenna No. 1 when high. The FS1 output is disconnected from antenna No. 1 when bit 1 is low. The second bit connects FS2 microwave output to antenna No. 1 when high, and disconnects FS2 from antenna No. 1 when low. Note that when both bits 1 and 2 are high then both FS1 and FS2 are connected to antenna No. 1. The third bit connects FS1 to antenna No. 2 if bit 3 is high and bit 5 is low and FS1 is disconnected to antenna No. 2 when bit No. 3 is low. The fourth bit connects FS2 to antenna No. 2 when it is high, and it disconnects FS2 from antenna No. 2 when it is low. The fifth bit connects the feedthrough signal (FT) to antenna No. 2 when bit No. 5 is high and bit No. 3 is low. The fifth bit connects the FT from antenna No. 2 when it is low. Note that the internal logic in the IF section is configured such that neither FT nor FS1 will be connected to antenna No. 2 if both bit 3 and 5 are high. The sixth bit passes the rear signal to the rear microwave output connector when high, and disconnects the rear signal from the rear output connector when low. The seventh bit connects the NARROWBAND FREQ (NBF, or FS3) to the NBF output connector when bit 7 is high and disconnects when low. The eighth bit connects the WIDEBAND FREQ (WBF) signal to the WBF output connector when 8 is high and disconnects it when low.

11. The POWER METER and FREQUENCY METER command consists of eight bits in BCD and is sent to the IF section. The eight bits represent two BCD digits. The least significant BCD digit controls the power meter input. Any one of the microwave outputs can be applied as an input to the power meter. The microwave outputs are represented by the numbers 0–5, 0 represents the rear, 1 represents antenna No. 1, 2 represents antenna No. 2, 3 represents the NBF output, 4 represents the WBF output and 5 represents the MICROWAVE REFERENCE SIGNAL. The second BCD digit controls the input to the microwave frequency meter. When the second BCD digit is 0, then the rear signal is connected to the meter; when the second BCD digit is 1 then FS1 is connected to the meter; and when the second BCD digit is 2, then FS2 is connected to the frequency meter.

Figure 5:
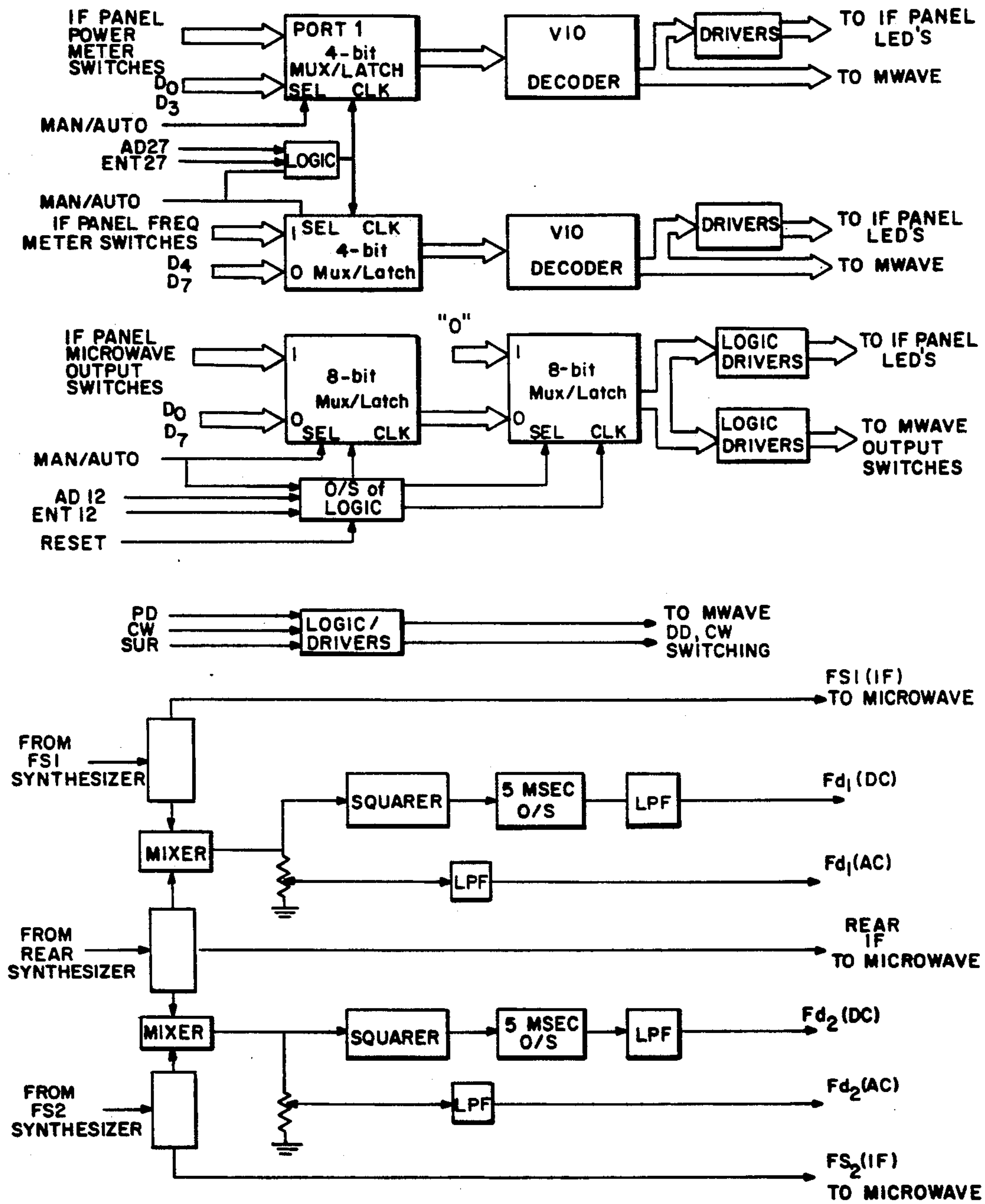
FIG. 5 sets out a block diagram at the IF section.
Figure 8:
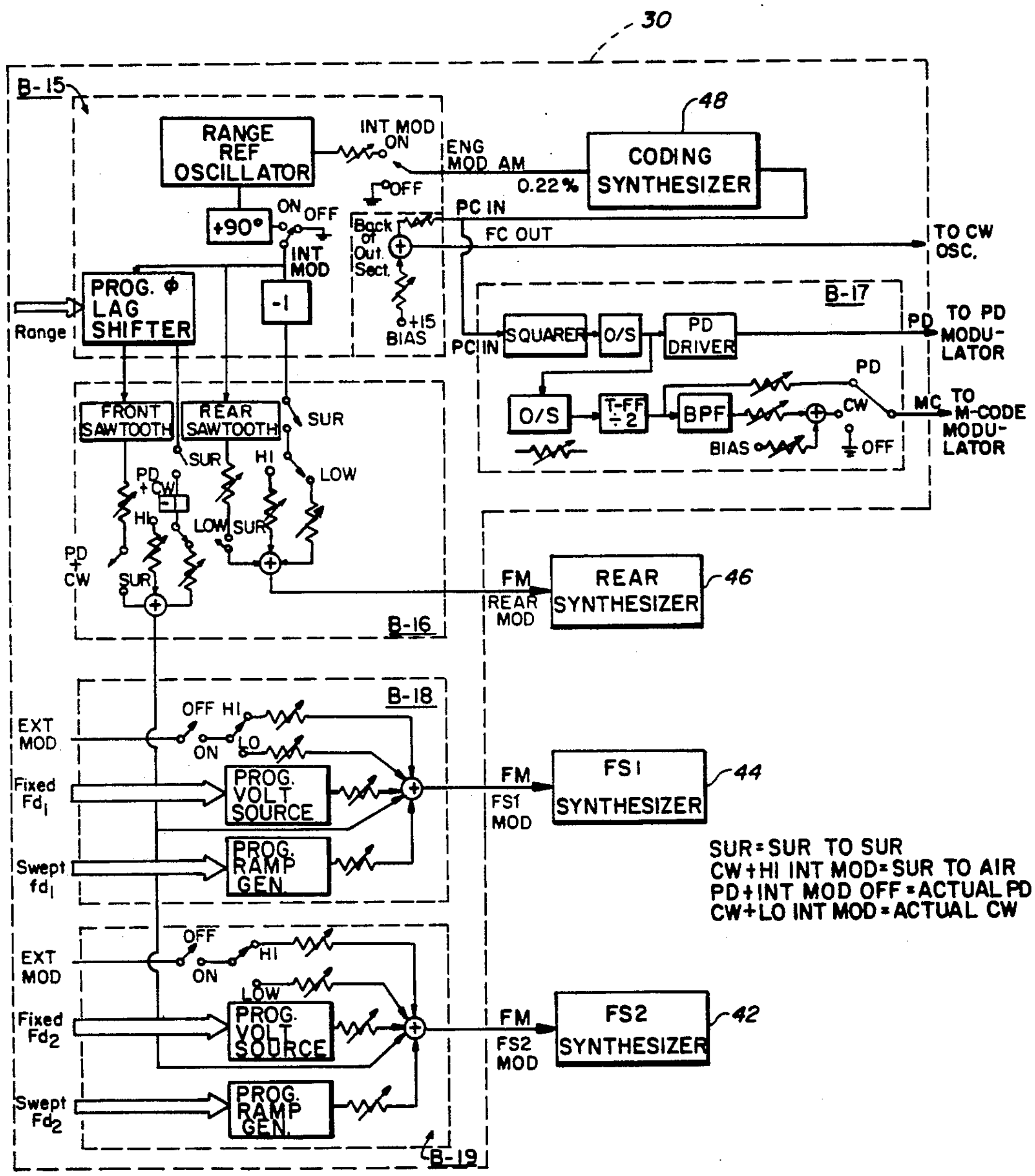
FIG. 8 is a block diagram of module section 30 of the control section depicting how anwhere the modulations are generated.
Figure 9A:
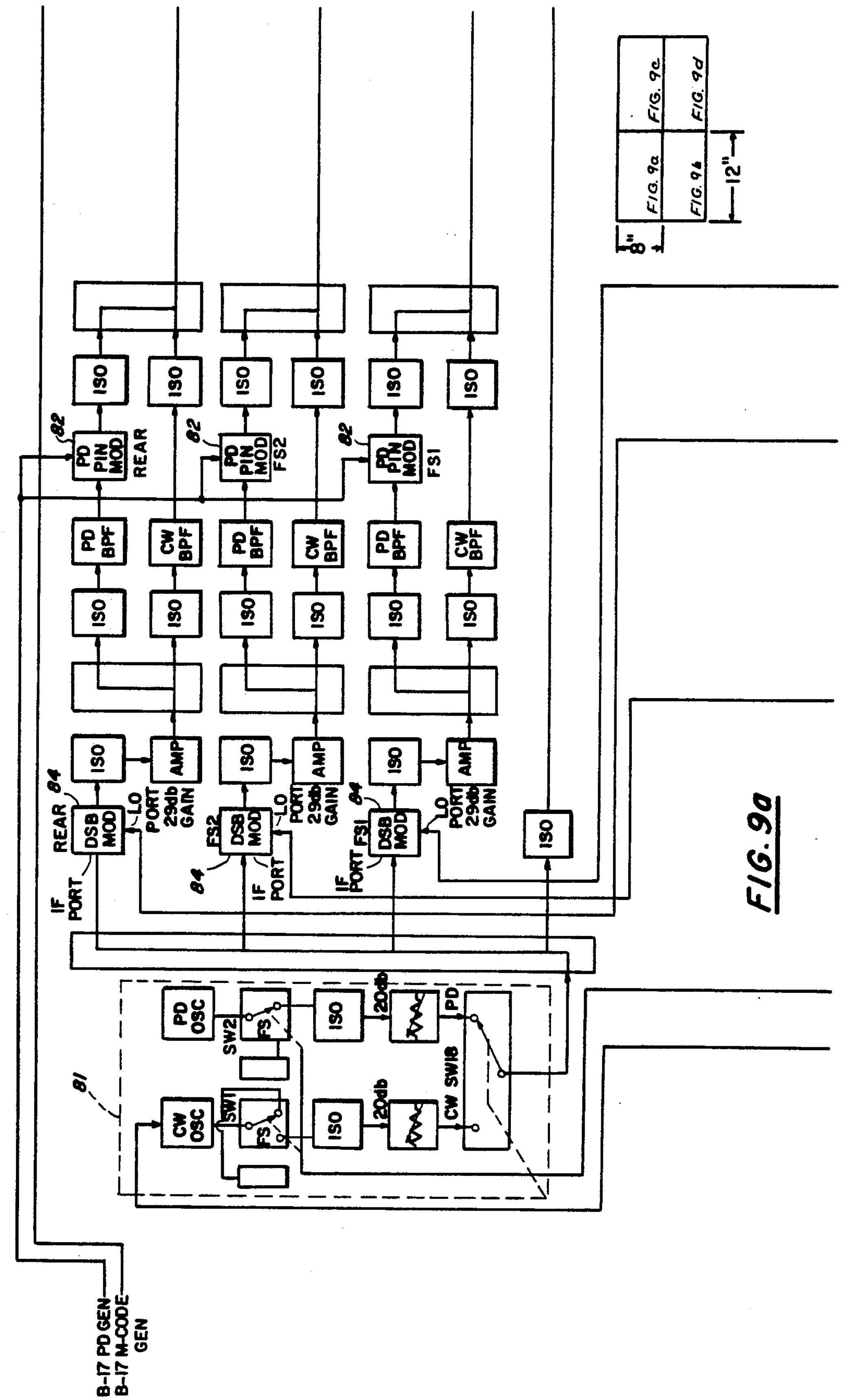
FIGS. 9*a*, 9*b*, 9*c* and 9*d* are a composite of the constituents of the microwave section.
Figure 9B:
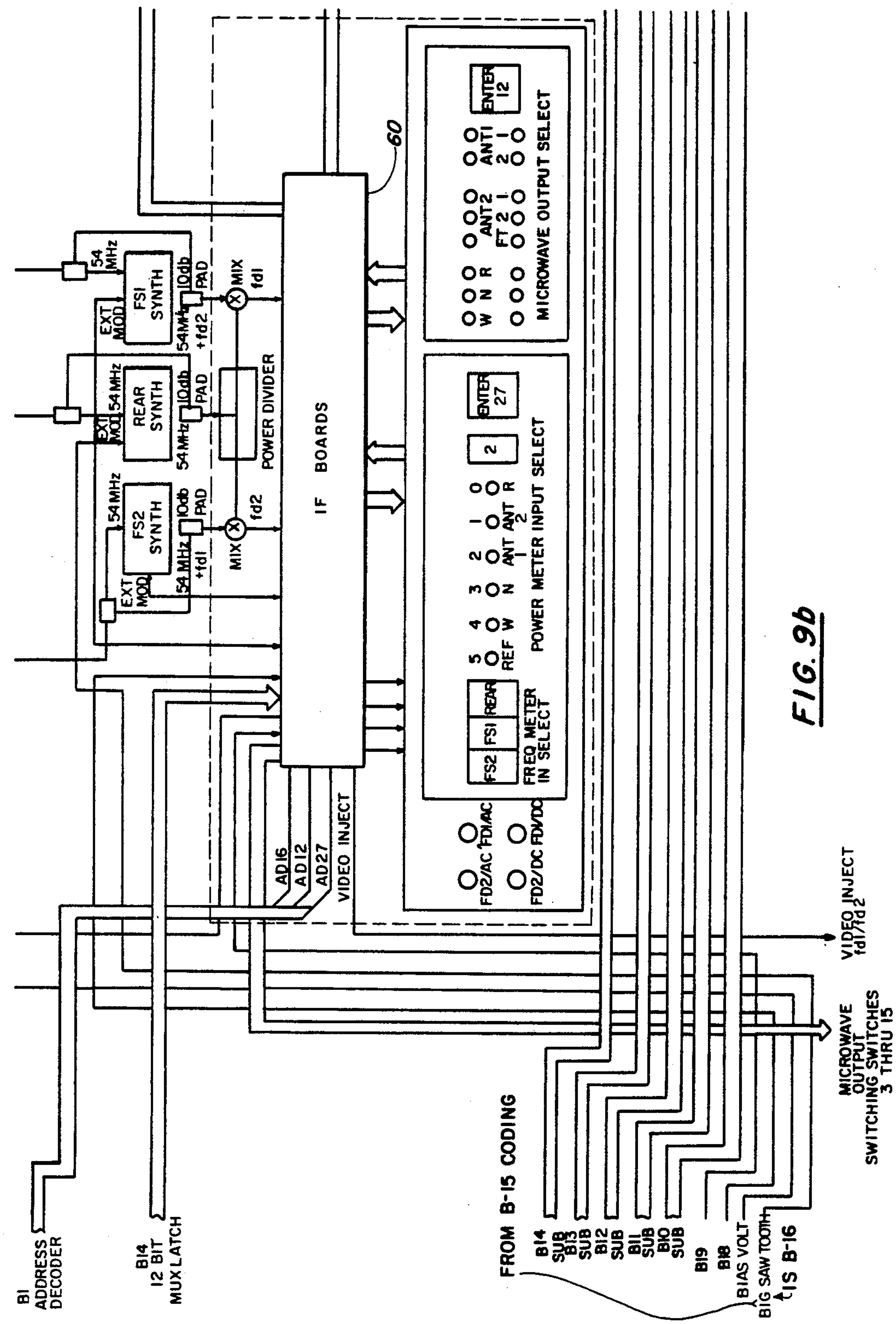
Figure 9C:
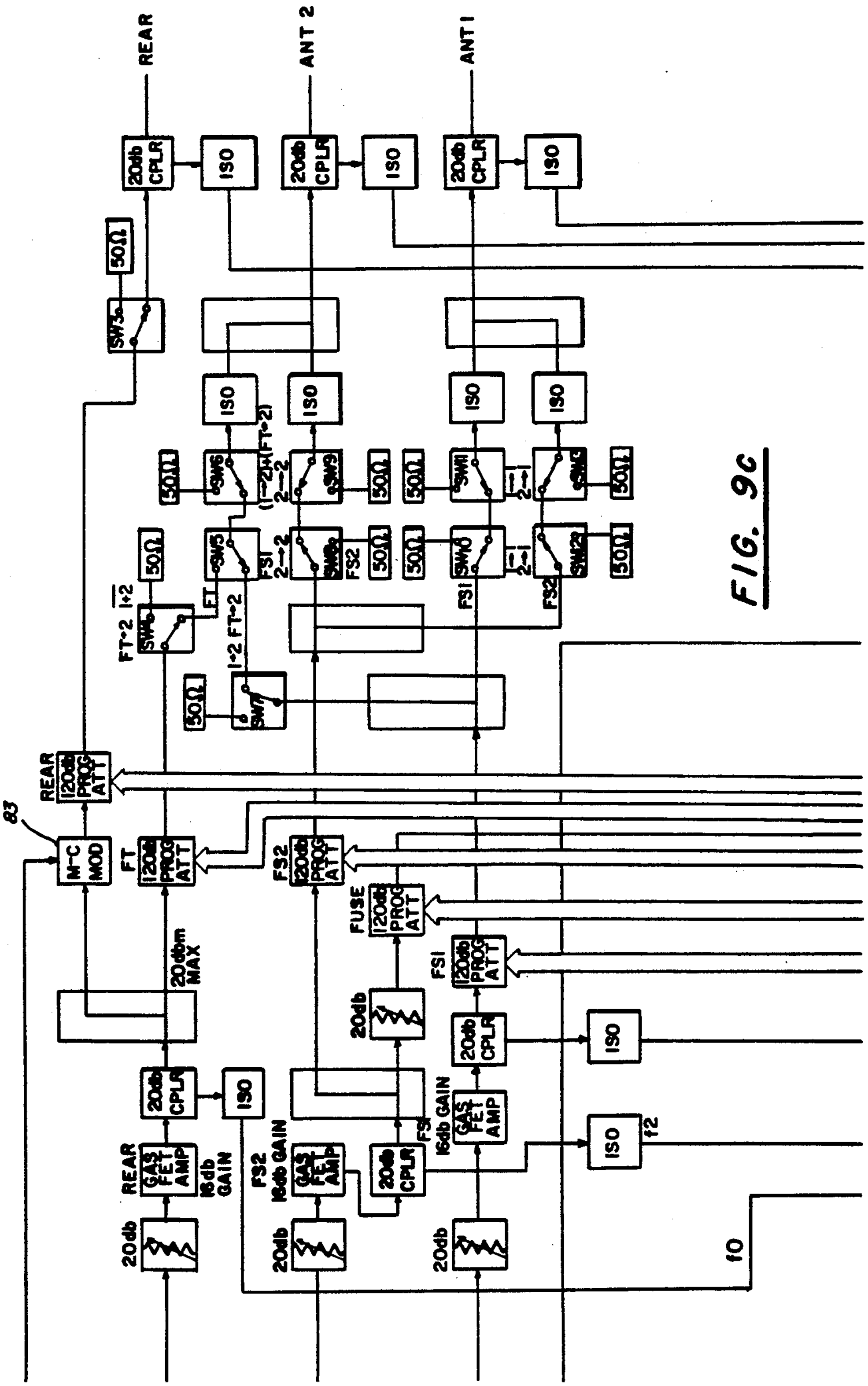
Figure 9D:
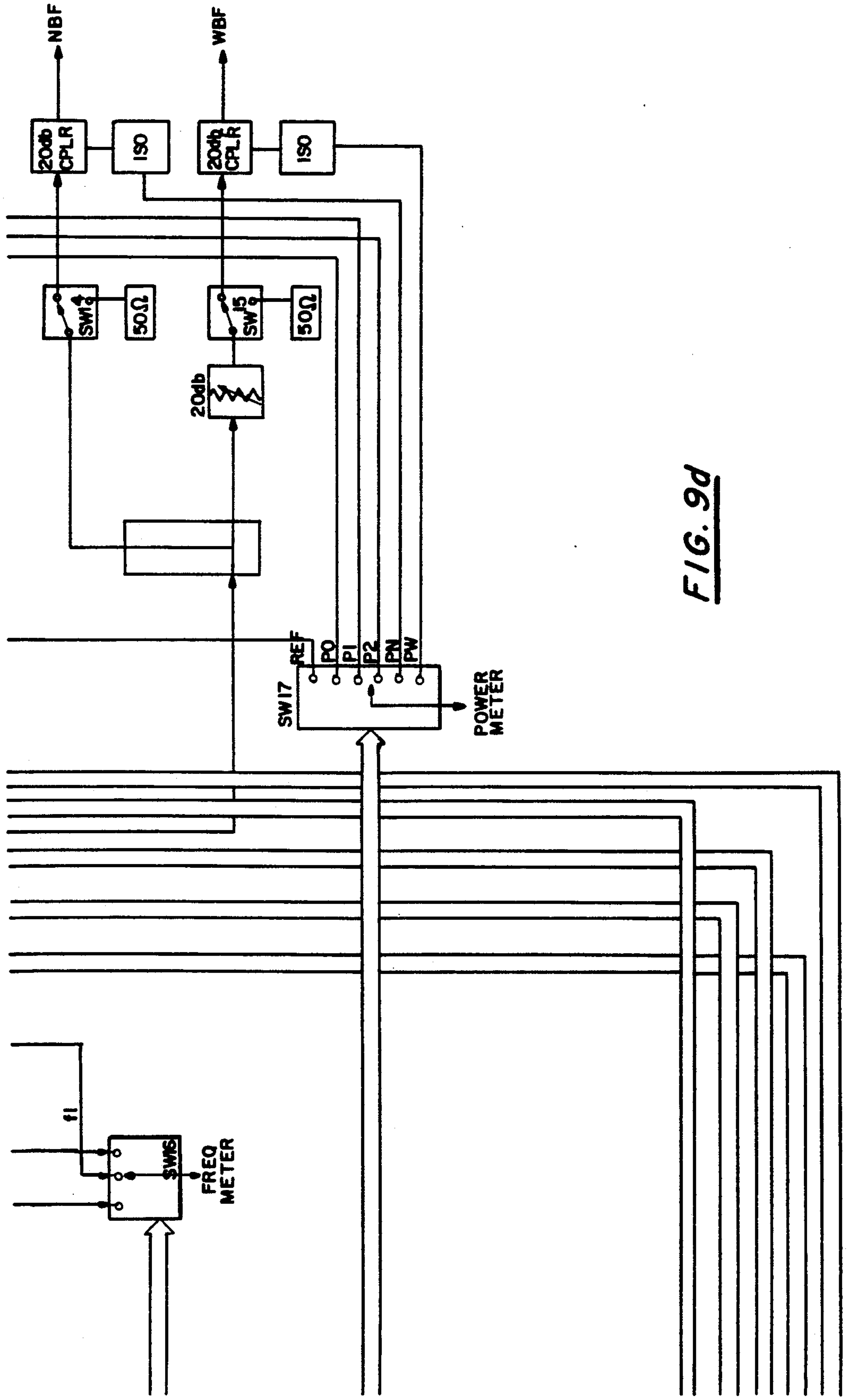

Referring now to FIG. 4, 5 and 8 the output commands of control section 20 and IF section 60 are described as follows. The control section outputs five digital commands to the microwave programmable attenuators of microwave section 80. Each of these commands consists of nine bits. The least significant eight bits represent two BCD digits, while bit 9 represents the MSB which can be either a "1" or "0". The output digital commands to the microwave programmable attenuators represent the amount of attenuation needed to make the power level of the microwave signals at the missile front mixer equal to that commanded by the operator. That is, if the commanded power level at the input of the mixer is −120 dB and the losses between the microwave outputs of the simulator and the mixer within the missile is 25 dB, then the output digital command to the programmable attenuator is −95 dB. The minus sign is not displayed because all power level will have a minus sign.

Referring to FIG. 4 boards B-10 through B-14 in control section 20 are used for scanning the power level commands. Each board has two separate digital commands. One command represents the power level commmanded at the front mixer while the second command represents an adjustment value to be subtracted from the commanded power level. The adjustment value or calibration command should take into account the power losses between the simulator and the mixer in the missile plus any inaccuracies in the programmable attenuator.

The IF section outputs to the microwave section all the necessary logic signals to implement the POWER METER, FREQUENCY METER and MICROWAVE output switching commands.

The control section has three separate analog inputs. These, first, are the coding signal which is outputted from the coding synthesizer. This signal is routed into the control section for the purpose of adding a DC bias as required by the CW OSCILLATOR 81 to which it will be sent eventually; second, two external modulation inputs which are used for inputting any desired external modulation to FS1 and FS2 such as noise; and, third, the control section provides seven analog output signals.

The analog output signals are: a RANGING REFERENCE SIGNAL which is sent to the AM port of coding synthesizer 48; a DC-biased coding signal which is sent to CW oscillator 81 of microwave section 80; a rear modulating signal which is sent into the FM port of the rear synthesizer 46; a FS1 modulating signal which is sent to the FM port of the FS1 synthesizer 44; a FS1 modulating signal which is sent to the FM port of the FS2 synthesizer 42; a PD signal which is sent to the PD modulators 82 in the microwave section; and a mother-coding signal which is sent to the LINEAR M-code modulator 83 in the microwave section.

The IF section has three analog input signals which are the outputs of the REAR, FS1 and the FS2 synthesizers. These three signals are power divided and mixed to provide seven analog outputs, FD1 (AC), FD1 (DC), FD2 (AC), FD2 (DC), REAR IF, FS1 IF, and FS2 IF. The AC signals are set to 60 millivolts RMS and represent the two Doppler frequencies to be used as video inject into the missile. The DC signals have a scale factor of five volts DC per 200 kHz and represent the values of FD1 and FD2 in DC. These are to be used for a strip chart recorder or for future expansion. The REAR IF, FS1 IF and FS2 IF are sent to the DSB modulators 84 in the microwave section, see FIG. 9.

The control section provides all the necessary modulations for the various types of illuminators. The appropriate modulations are selected as follows for the Air Sparrow and Sea Sparrow missiles. The air sparrow in the CW mode calls for the selection of CW and LOW INT. MODULATION and a PD mode calls for the selection of PD and INT. MODULATION OFF. The Sea Sparrow in the surface-to-air mode has the selection of CW and HIGH INT MODULATION and the surface-to-surface mode of operation calls for the selection of SUR only.

The above modulations are generated in boards, B-15, B-16, B-17, B-18 and B-19. Noting in particular FIG. 8 the simplified block diagram of how and where the modulations are generated becomes apparent. Board B-15 contains the ranging reference oscillator plus the phase shifting circuits. Board B-16 contains the sawtooth waveform generators for the Sea Sparrow mode. B-18 and B19 provide all the Doppler information on the internal modulations. Board B-17 provides the PD and M-code signals. The destination of the various modulations is also indicated in FIG. 8.

Figure 10:
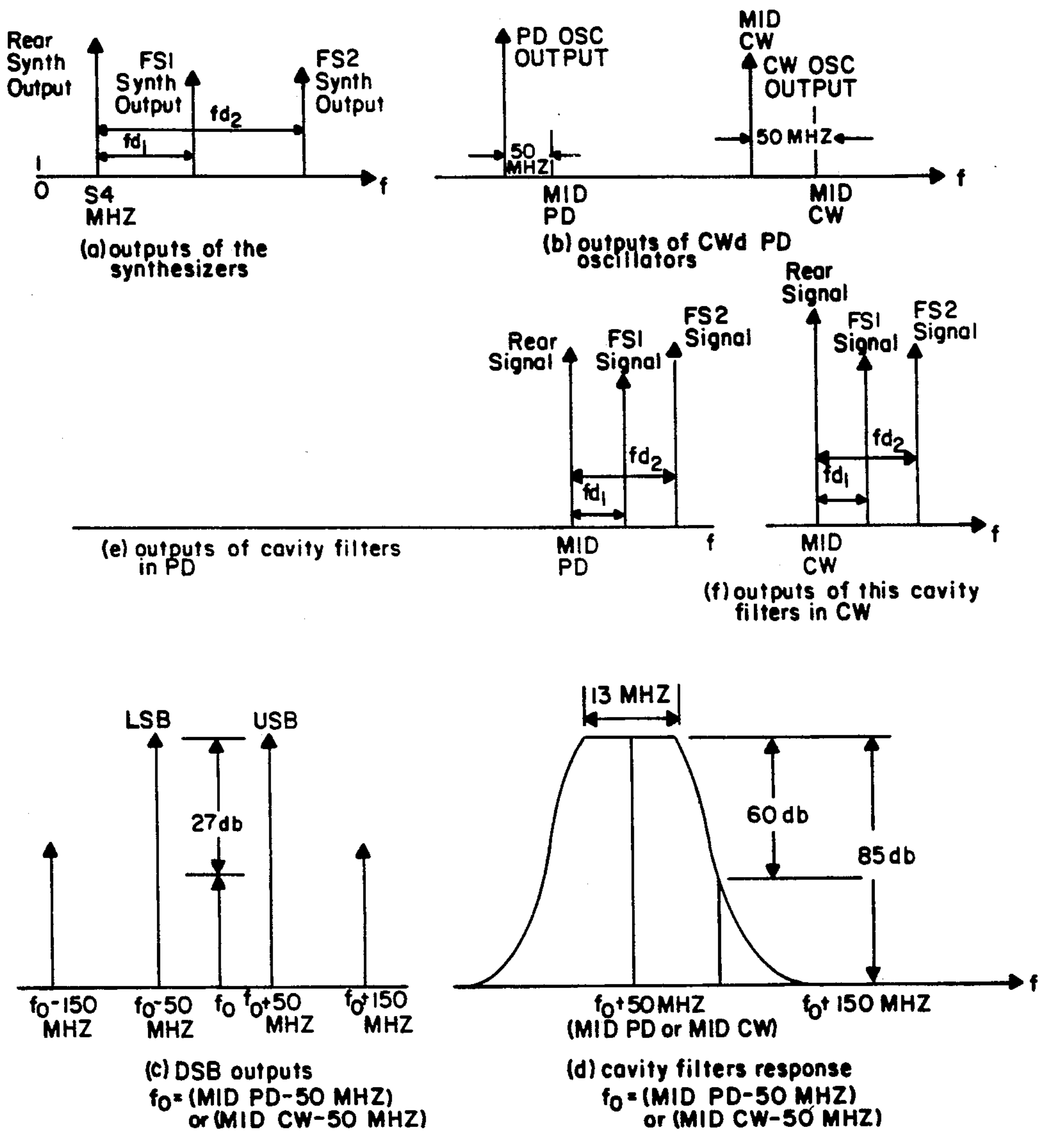
FIG. 10 shows the spectral components of the microwave section signals.

Looking to FIGS. 9 and 10, the microwave section functions to generate several microwave signals at two different frequencies, those being the MID PD and MID CW. The microwave signals incorporate all the various modulations generated by the control section. The interface of the microwave section to module subsection 30 of control section 20 and part of commands-subsection 22 of the control section and IF section 60 is shown in FIG. 9.

The operation of the microwave section is as follows. All the microwave signals originate from the CW and PD low noise microwave oscillators 86 and 87. The CW oscillator is operated at 50 MHz below the middle of the CW band while the PD oscillator is operated at 50 MHz below the middle of the PD band, see FIG. 10(*b*). The phase noise on the oscillator's output is better than −113 dB per Hz at 15 kHz away from the carrier. The CW signal is FM modulated by applying the coding signal (+DC bias) to the FM part of the CW oscillator. In the PD mode, all the microwave signals are derived from the PD oscillator; whereas in the CW mode all the microwave signals are derived from the CW oscillator.

The output of either microwave oscillator is divided by a 4-way power divider. One output of the 4-way divider is used as a reference while the other three are applied to the LO ports of three DSB mixers or modulators. Each of the DSB mixers is used as an up converter whose output frequency is equal to the sum of its LO port input and the IF port input. The outputs of the REAR, FS1 and FS2 synthesizers are applied to the IF ports of the DSB modulators. FIG. 10(*c*) shows the actual output of each of the DSB modulators. Note that the carrier is suppressed by 27 dB. The outputs of the DSB modulators are passed through cavity bandpassed filters which are centered at the MID PD or MID CW frequencies. The output of the cavity filters will be the upper sideband components which contains the Doppler information plus the various modulations. Thus, the cavity filters implement the single sideband technique which is employed in generating the various microwave signals.

The outputs of the cavity filters are then amplified and then passed through programmable attenuators and a switching matrix to provide six independent microwave output signals, REAR, FEEDTHROUGH, FS1, FS2, NARROWBAND FREQ and WIDEBAND FREQ signals. All the microwave switches used in the switching matrix are of the fail safe type with the fail safe positions selected to be the 50 ohm load. These switches employ open collector drivers which are located in the IF section.

The microwave section output power levels have the following relative range. For the REAR SIGNAL microwave has a minimum of −170 dB to a maximum of +10 dB within a programmable range of −110 to +10 in 1 dB steps. The FRONT SIGNAL No. 1 (FS1) has a minimum value of −175 dB to a maximum of +5 dB within a programmable range of −115 to +5 dB in 1 dB steps. The FRONT SIGNAL No. (FS2) has a range of −175 to +5 dB within a programmable range of −115 to +5 in 1 dB steps. The NARROWBAND FREQ (NBF) has a minimum of −b 170 dBm to +10 dB mm max. within a programmable range of −110 dBm to +10 dBm in 1 dB steps. The wideband frequency (WBF) from a −180 dB to a 0 dB maximum within a −120 to 0 programmable range in 1 dB steps. Lastly, the feedthrough signals (FT) has a minimum power level of −172 dBm and a maximum power level +8 dBm within a programmable range of −112 dBm to +8 dBm in 1 dB steps.

The microwave outputs can be expressed as mathematical representations for:

(a) REAR SIGNAL [$f_R(t)$]

(i) CW MODE:

$$f_R(t) = k\underbrace{(1 + 0.11\cos Ct/2)}_{\text{mother coding}}\cos[\underbrace{Xt}_{\text{X-band carrier}} + \underbrace{\Delta\omega_2\int \cos rt\,dt}_{\text{FM ranging}} + \underbrace{\Delta\omega_3\int \underbrace{(1 + m\sin rt)}_{\text{AM range reference}}\cos ct\,dt}_{\text{FM coding}}]$$

Where the modulation indices are as follows:

$$\left\{\begin{matrix}\text{FM Ranging}\\ \text{Modulation}\\ \text{Index}\end{matrix}\right\} = \frac{\Delta\omega_2}{r} = 23.53 \pm 5\% \text{ (Adjustable)}$$

$$\left\{\begin{matrix}\text{Coding}\\ \text{Modulation}\\ \text{Index}\end{matrix}\right\} = \frac{\Delta\omega_3}{c} = 0.22 \pm 5\% \text{ (Adjustable)}$$

-continued $$\left.\begin{array}{l}\text{AM Range}\\ \text{Reference}\\ \text{Percent}\\ \text{Modulation}\end{array}\right\} = m = 0.2 \pm 5\% \text{ (Adjustable)}$$

Figure 11A:
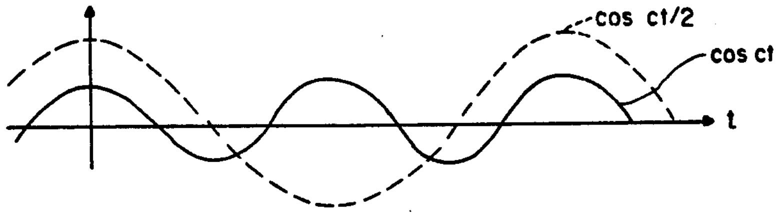
FIG. 11(*a*) depicts synchronization of CW Mother Coding.

$k$ = Power level as specified as set out in the preceding complete paragraph. The signals cos $ct/2$ and cos $ct$ aresynchronized as shown in FIG. 11a.

(ii) PD MODE:

$$f_R(t) = \underbrace{k[1 + 0.1\, f_m(t)]}_{\text{mother coding}}\ \underbrace{[\cos xt]}_{\text{X-band carrier}}\ \underbrace{f_p(t)}_{\text{PRF pulse waveform}}$$

Figure 11B:
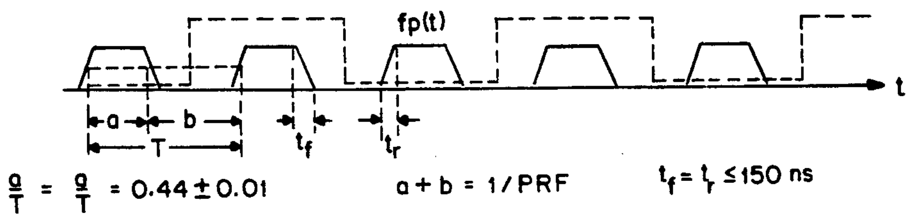

The signals $f_p(t)$ and $f_m(t)$ are synchronized as shown in FIG. 11*b*.

(iii) SURFACE-TO-AIR MODE:

$$f_R(t) = k\cos[\underbrace{xt}_{\text{X-band carrier}} + \underbrace{\Delta\omega_1 \int \cos rt\, dt}_{\text{FM ranging}} + \underbrace{\Delta\omega_3 \int \underbrace{(1 + m\sin rt)}_{\text{AM range Reference}} \cos ct\, dt}_{\text{FM coding}}]$$

$$\text{where } \frac{\Delta\omega_1}{r} = 58.22 \pm 5\%.$$

Figure 11C:
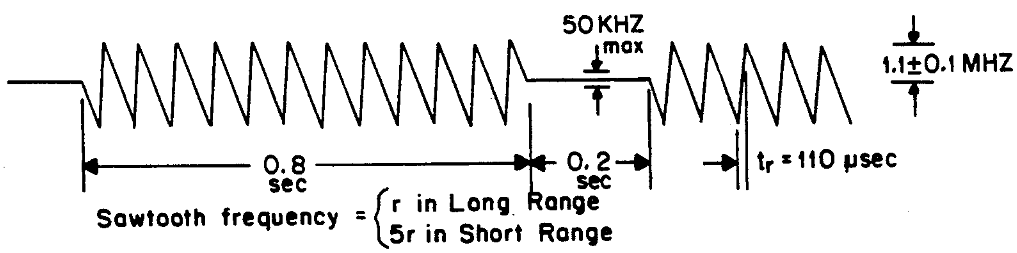

(iv) SURFACE-TO-SURFACE MODE:

$$f_R(t) = k\cos[\underbrace{xt}_{\text{X-band carrier}} + \underbrace{\Delta\omega_s \int f_s(t)dt}_{\text{sawtooth ranging}} + \underbrace{\Delta\omega_3 \int \cos ct\, dt}_{\text{FM coding}}]$$

where $\Delta\omega_s = 1.1 \pm 0.1$ MHZ and $f_s(t)$ as shown in FIG. 11*c*. Note: The simulator provides a continuous sawtooth at r frequency only and no 0.2 esc pause.

(b) FEEDTHROUGH SIGNAL. This is the same as the REAR SIGNAL without the mother coding.

(c) FRONT SIGNAL #1 (FS1)

(i) CW MODE $$FS1(t) = k_1[\cos xt + f_{d1}(t) + \Delta\omega_2 \int \cos(rt - \phi)dt + \Delta\omega_3 \int (1 + m\sin rt)\cos ct\, dt]$$

(ii) PD MODE $$FS1(t) = K_1 \cos[xt + f_{d1}(t)]f_p(t)$$

(iii) SURFACE-TO-AIR MODE:

$$FS1(t) = k_1 \cos[xt + f_{d1}(t) + \Delta\omega_1 \int \cos(rt - \phi)dt + \Delta\omega_3 \int (1 + m\sin rt)\cos ct\, dt]$$

(iv) SURFACE-TO-SURFACE MODE:

$$FS1(t) = K_1 \cos[xt + f_{d1}(t) + \Delta\omega_s \int f_s(t - T_d)dt + \Delta\omega_3 \int \cos ct\, dt]$$

where $f_{d1}$ = FS1 Doppler frequency.

$\phi$ = Range phase delay (0.189°/nmi)

$T_d$ = Range time delay (0.378°/nmi in long range and 1.89°/nmi in short range)

(d) FRONT SIGNAL #2 (FS2). This is the same as FS1 except $F_{d1}$ is replaced by $F_{d2}$.

(e) NARROW BAND FUZE (NBF). This is the same as FS2 with the addition of an external Narrowband Noise of bandwidth 10 to 20 kHZ centered on $F_{d2}$.

(f) WIDE BAND FUZE (WBF). This is the same as FS1 with the addition of an external Wideband Noise with 400 kHz bandwidth centered on $F_{d2}$.

Further microwave section outputs in addition to the above are identified as:

(1) FRONT SIGNALS DOPPLERS: Two independently controlled Doppler frequencies ($f_{d1}$ and $f_{d2}$) are provided internally on FS1 and FS2. Each Doppler has three modes of operation.

(a) FIXED MODE: Here the Doppler can be varied from −500 kHz to +500 kHz in 0.5 kHz steps.

(b) SWEPT MODE: The Doppler can be ramped in frequency at rates from 1 kHz/sec to 10 MHz/sec in 1 kHz/sec steps. The sweep lengths can vary from 10 ms to 99.99 seconds in 10 msec steps. The sweep start frequency is controlled as in the fixed mode.

(c) SWEEP/HOLD MODE: This mode permits the synthesis of complex Doppler waveforms. The presence of the hold command causes the Doppler frequency to be held at its value at the end of the sweep.

(2) EXTERNAL MODULATIONS: Connectors are provided for applying external modulations on $F_{d1}$ and $f_{d2}$.

(3) MICROWAVE OUTPUT SWITCHING: Upon command, FS1 and/or FS2 can be sent to antenna 1; and FS1 and/or FS2 or FT can be sent to antenna 2.

(4) SIMULATOR OPERATING MODES (a) Fully programmable: digital commands are applied by external computer 40.

(b) Fully manual: commands are entered by the operator through the Front Panel Switches 50.

(c) Semi-automatic: Operator can modify computer commands.

(d) Reset: The simulator parameters are set to specific known values.

(5) POWER MEASUREMENT: Upon command, the power level of each of the microwave aoutput signals can be measured by digital power meter 98.

(6) FREQUENCY MEASUREMENT: Upon command, the frequency of the REAR, FS1 and FS2 signals can be independently measured by a digital microwave frequency counter of meter 96.

Figure 11D:
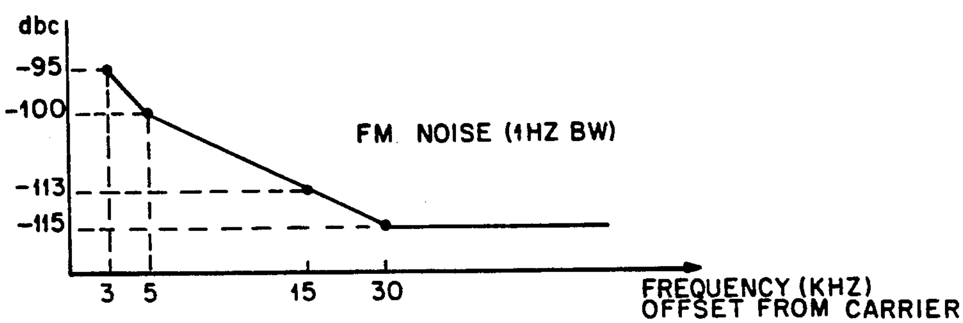
Figure 12A:
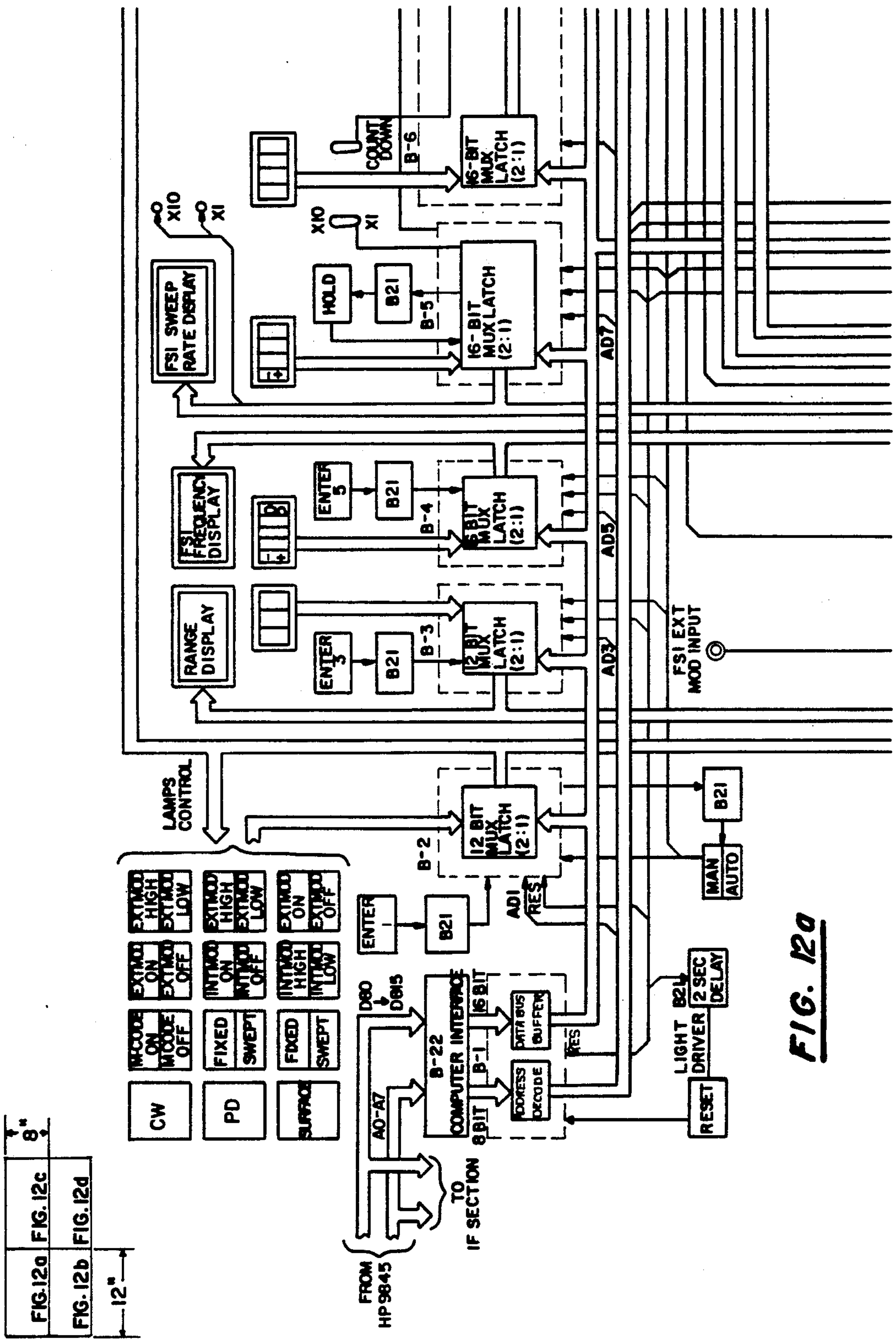
FIGS. 12*a*, 12*b*, 12*c* and 12*d* illustrate in greater detail the constituents of the control section.
Figure 12B:
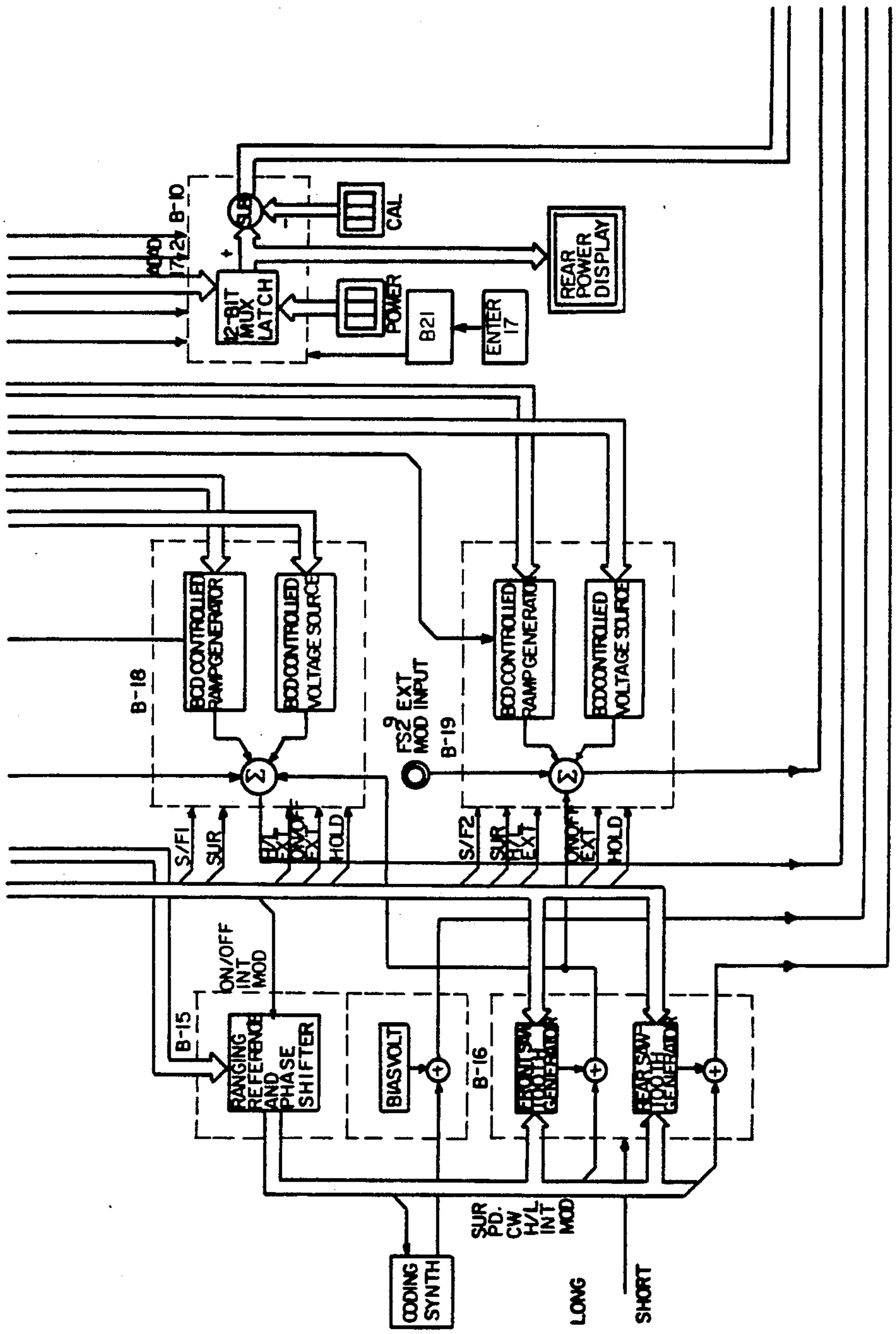
Figure 12C:
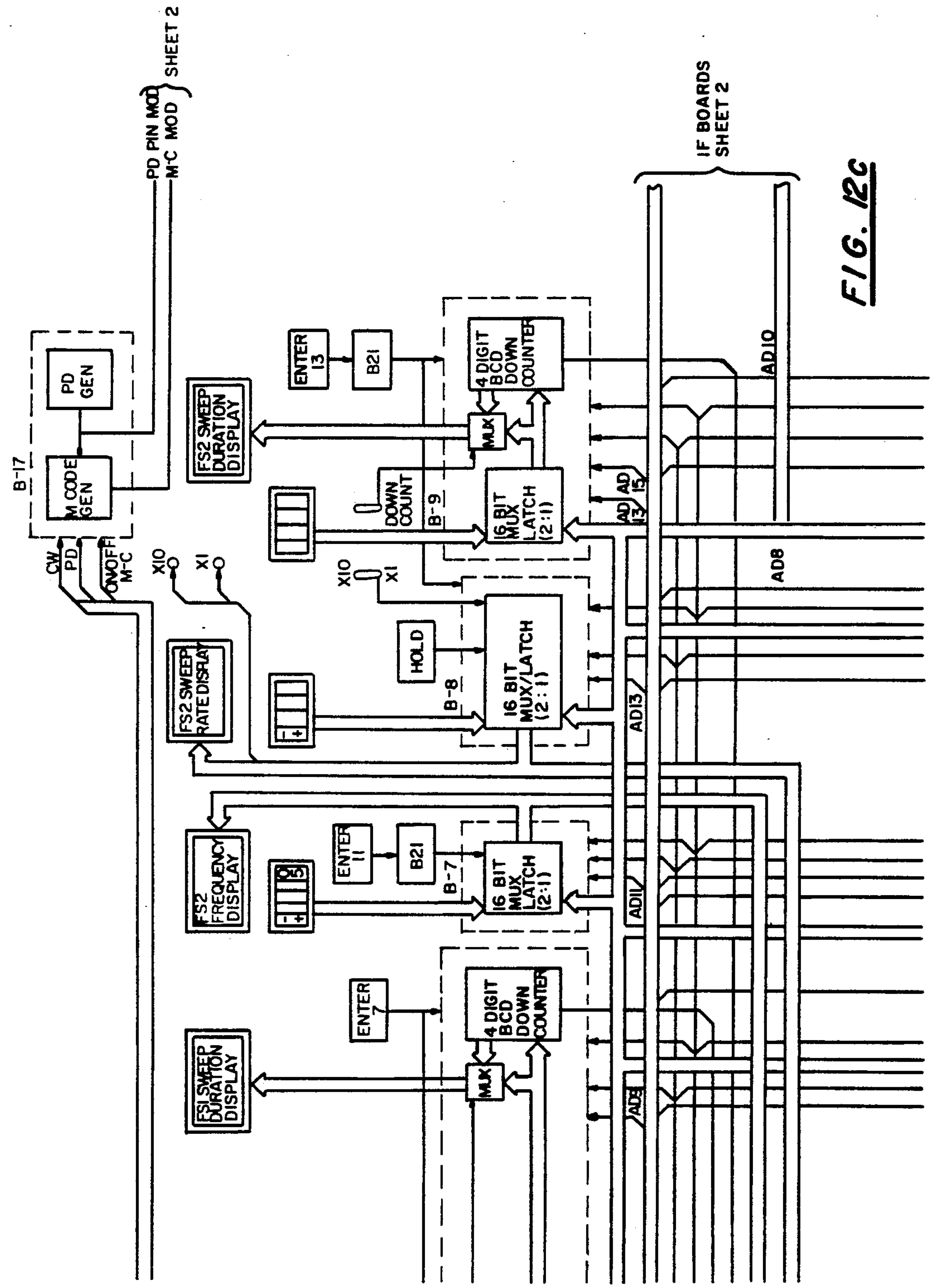
Figure 12D:
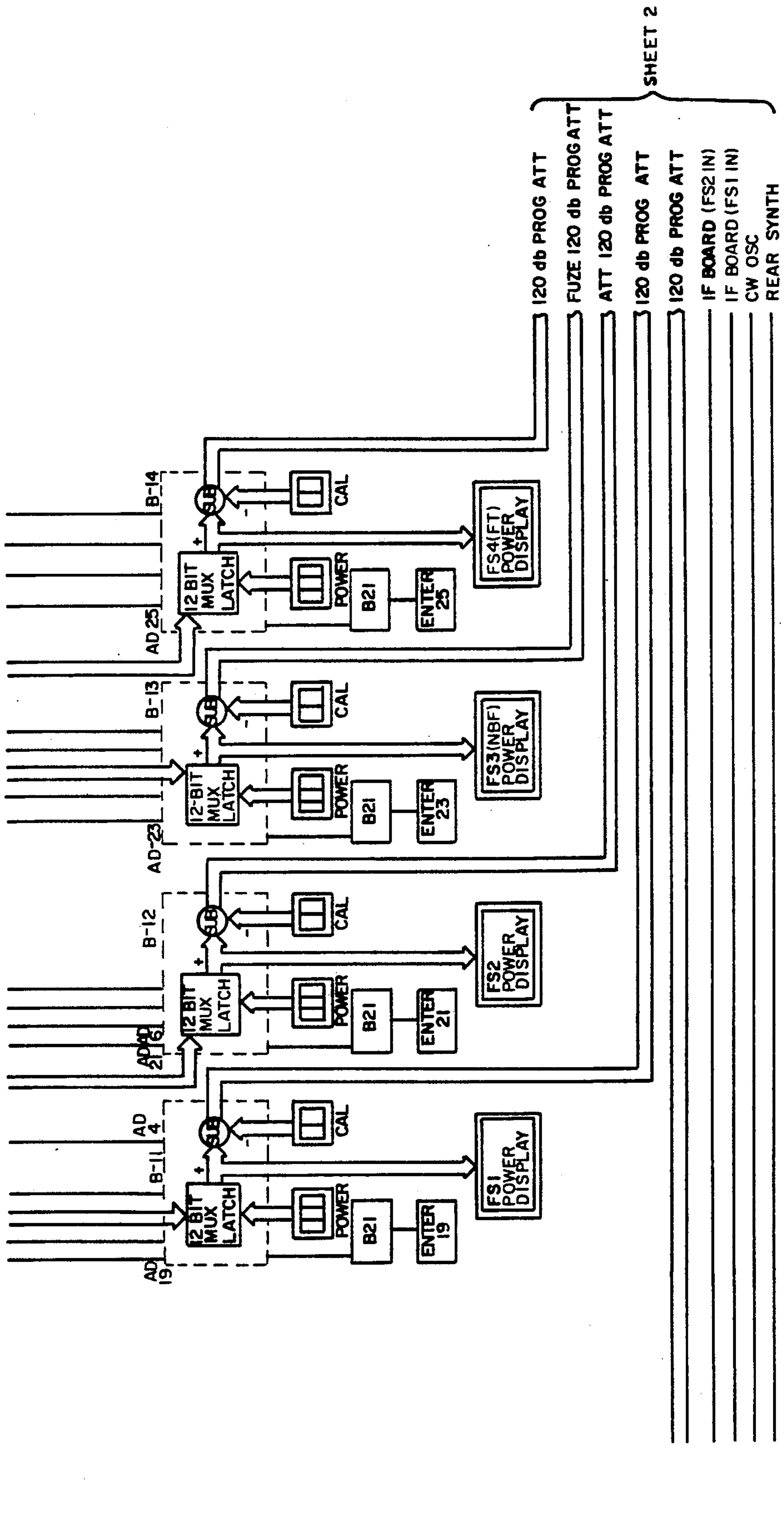
Figure 13A:
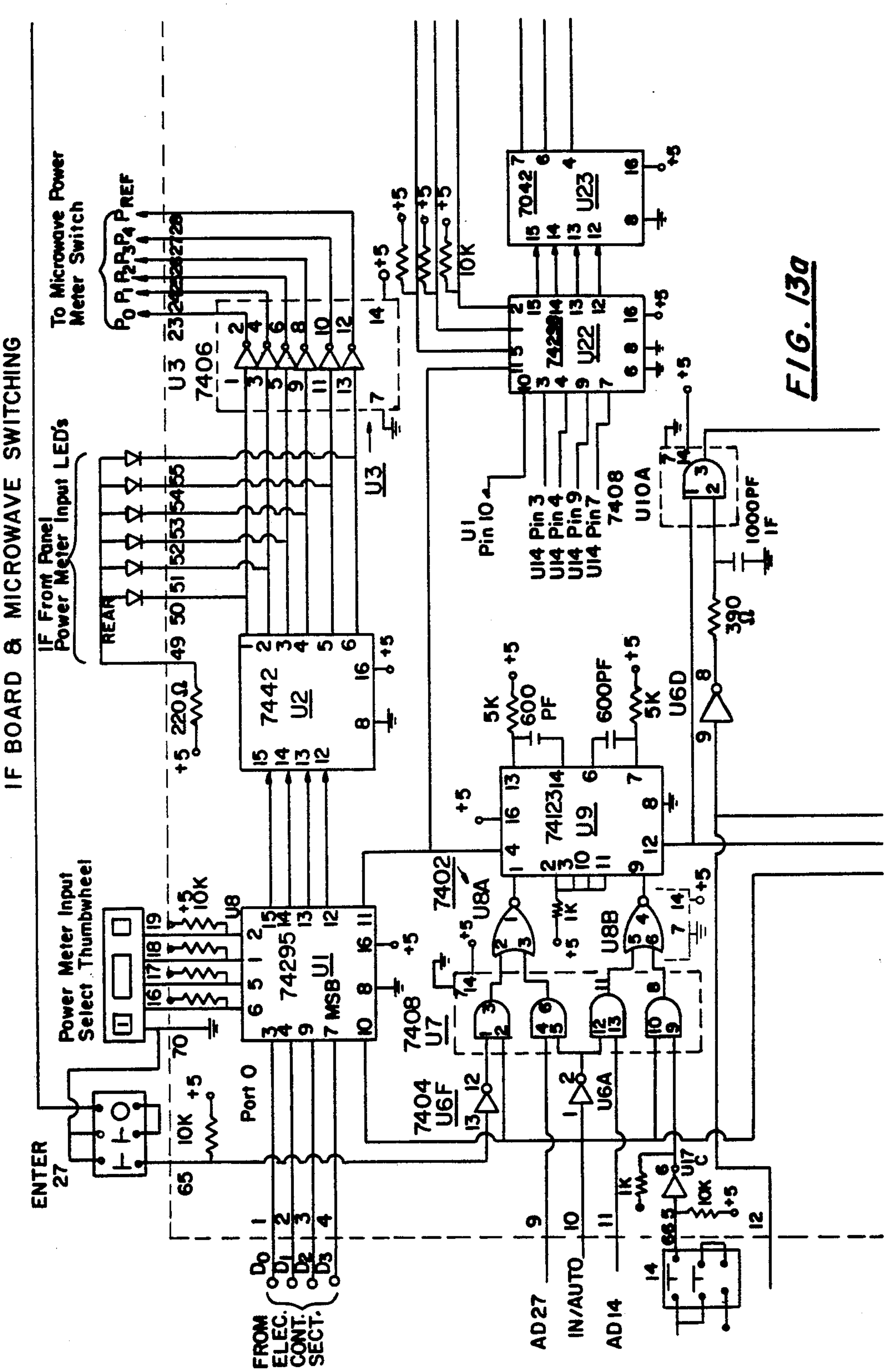
FIGS. 13*a*, 13*b*, 13*c* and 13*d* show in greater detail details of the IF Board and Microwave Switching.
Figure 13B:
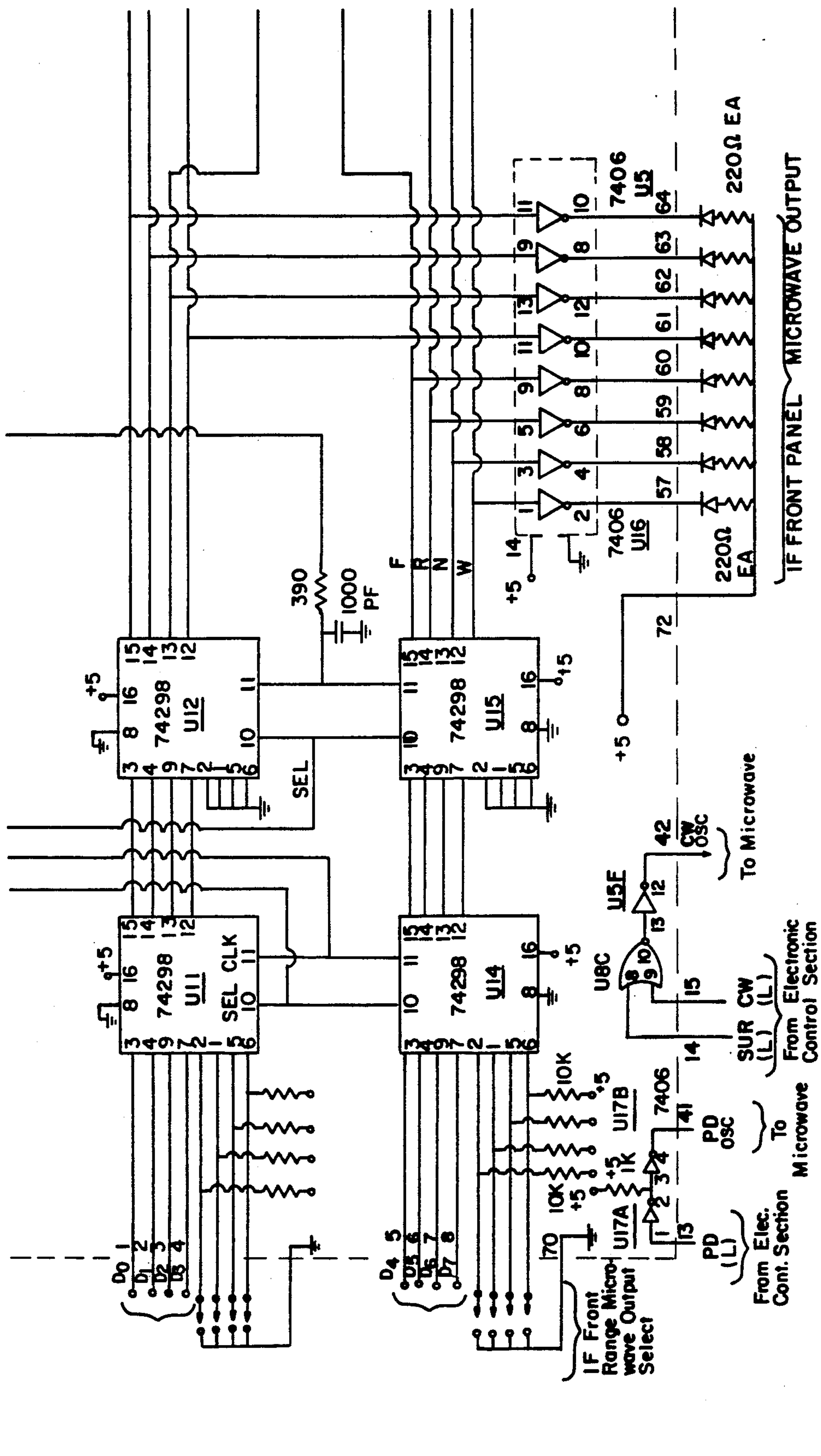
Figure 13C:
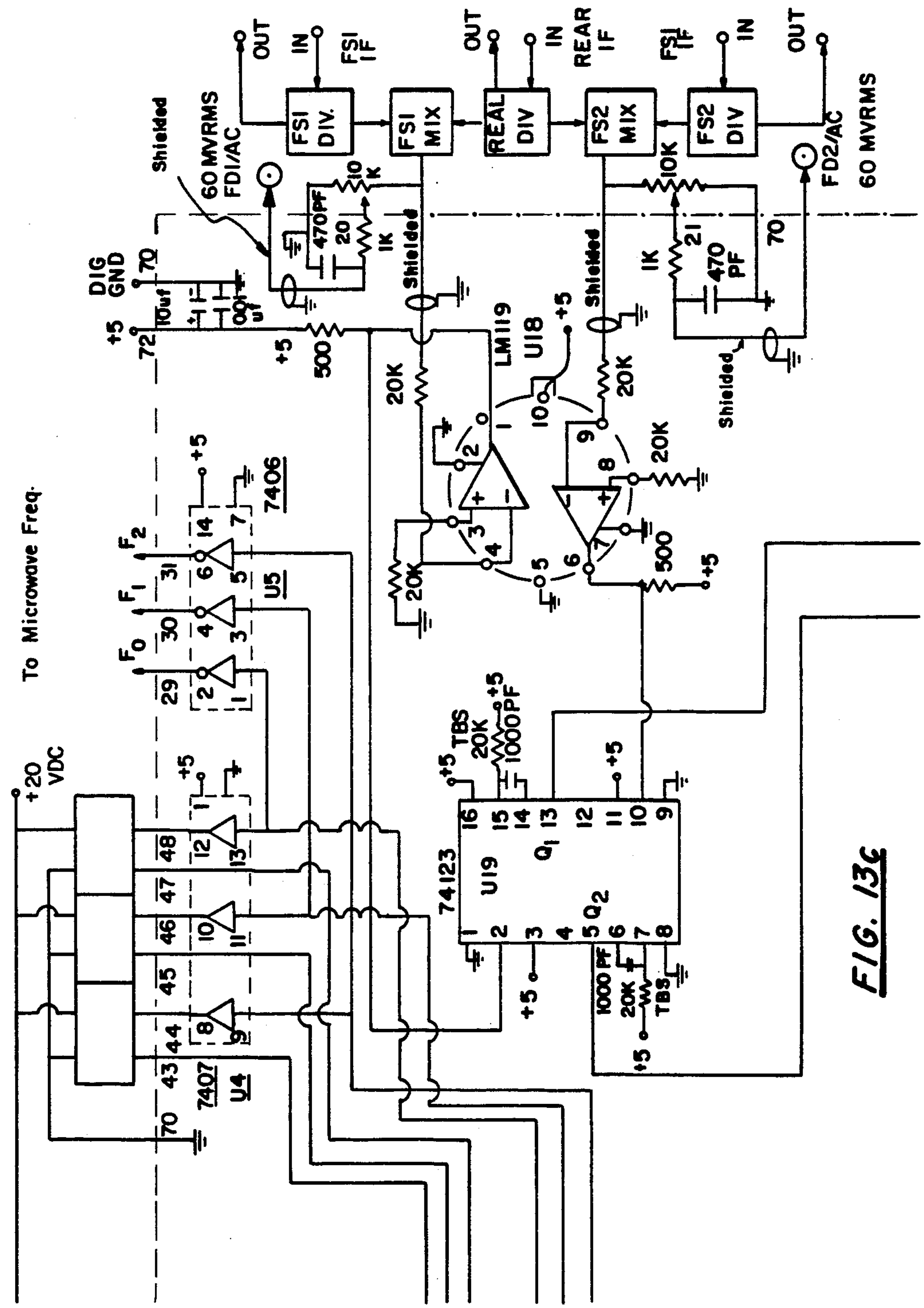
Figure 13D:
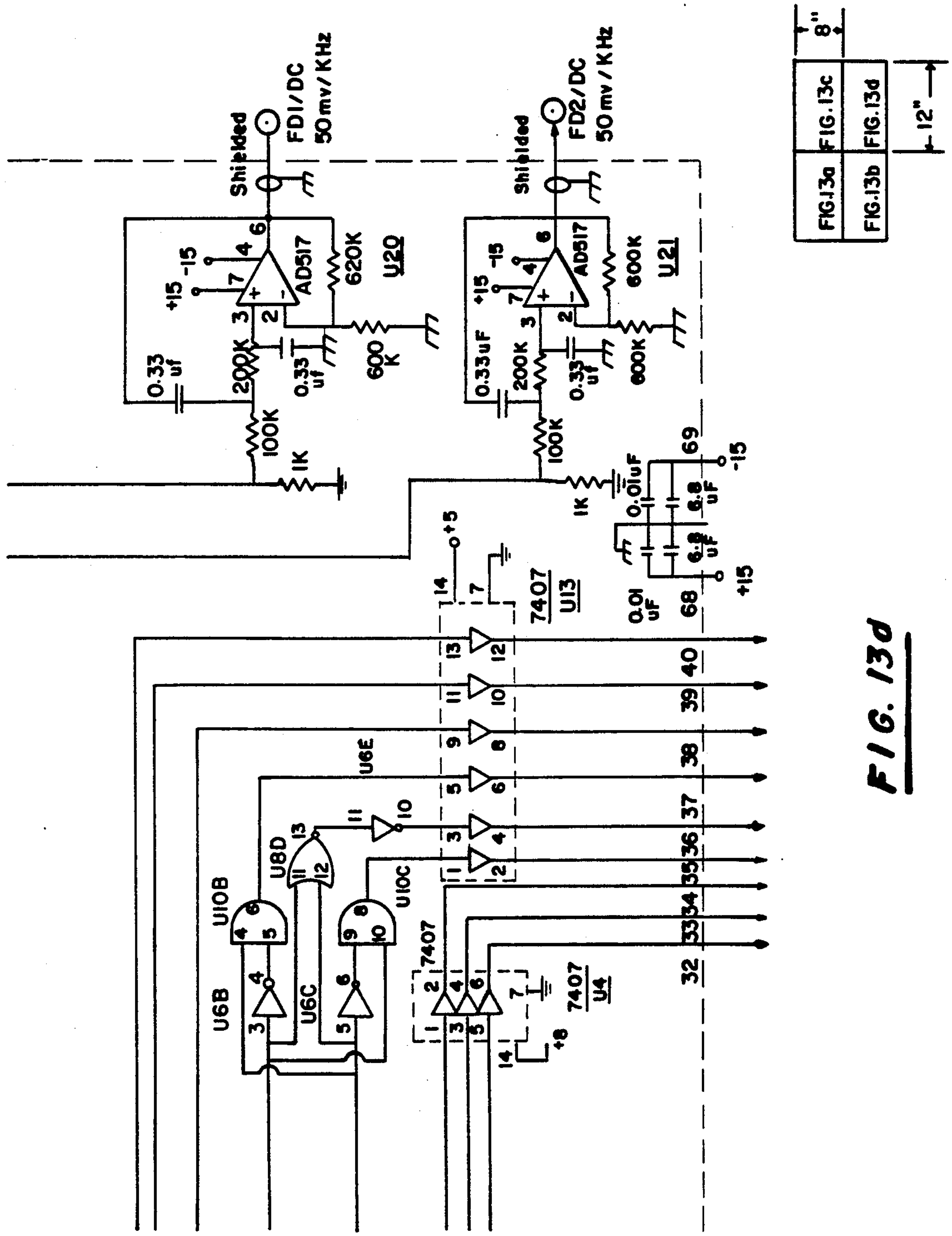
Figure 15A:
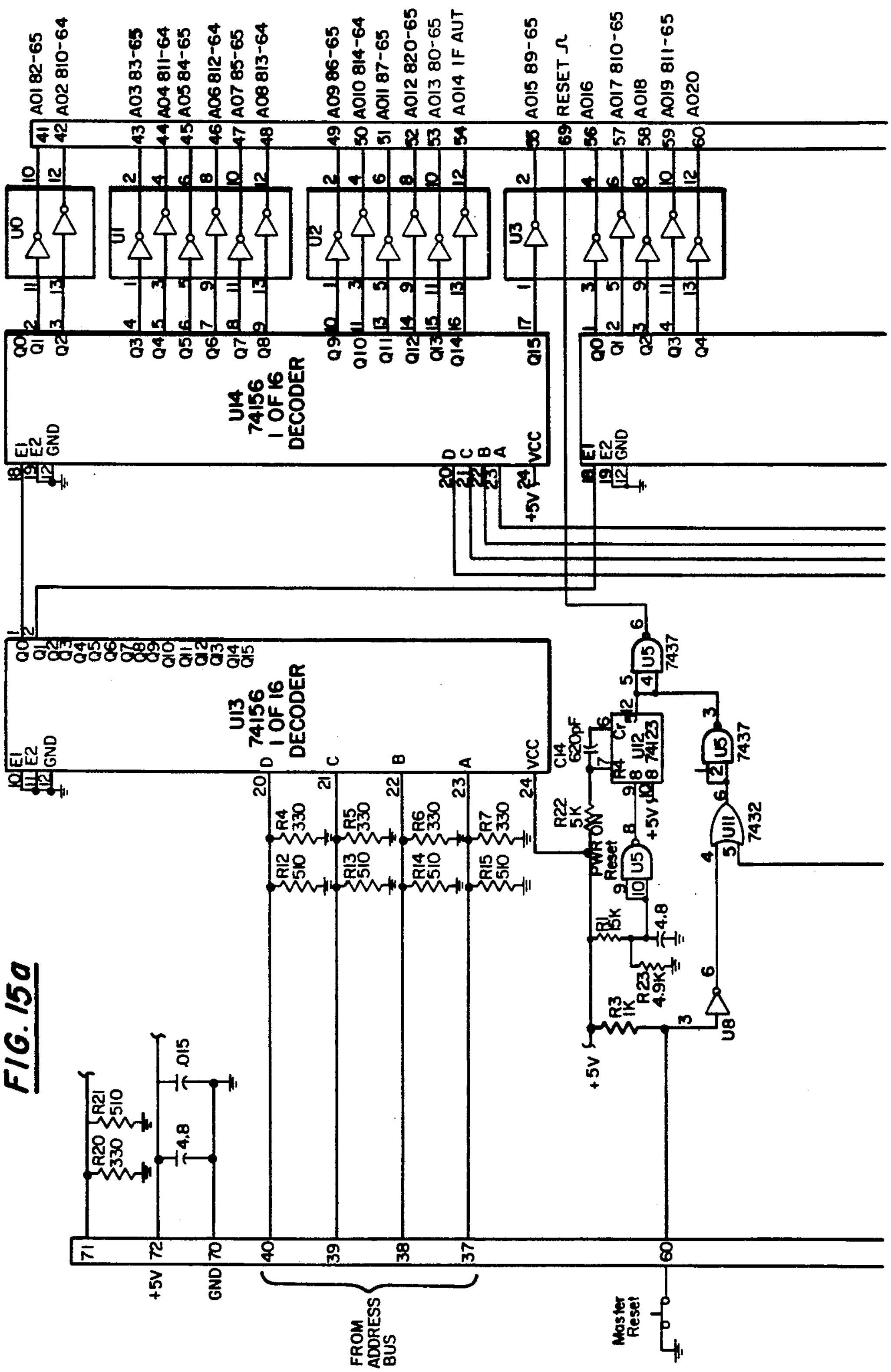
FIGS. 15a and 15b show details of B-1 of the control section.
Figure 15B:
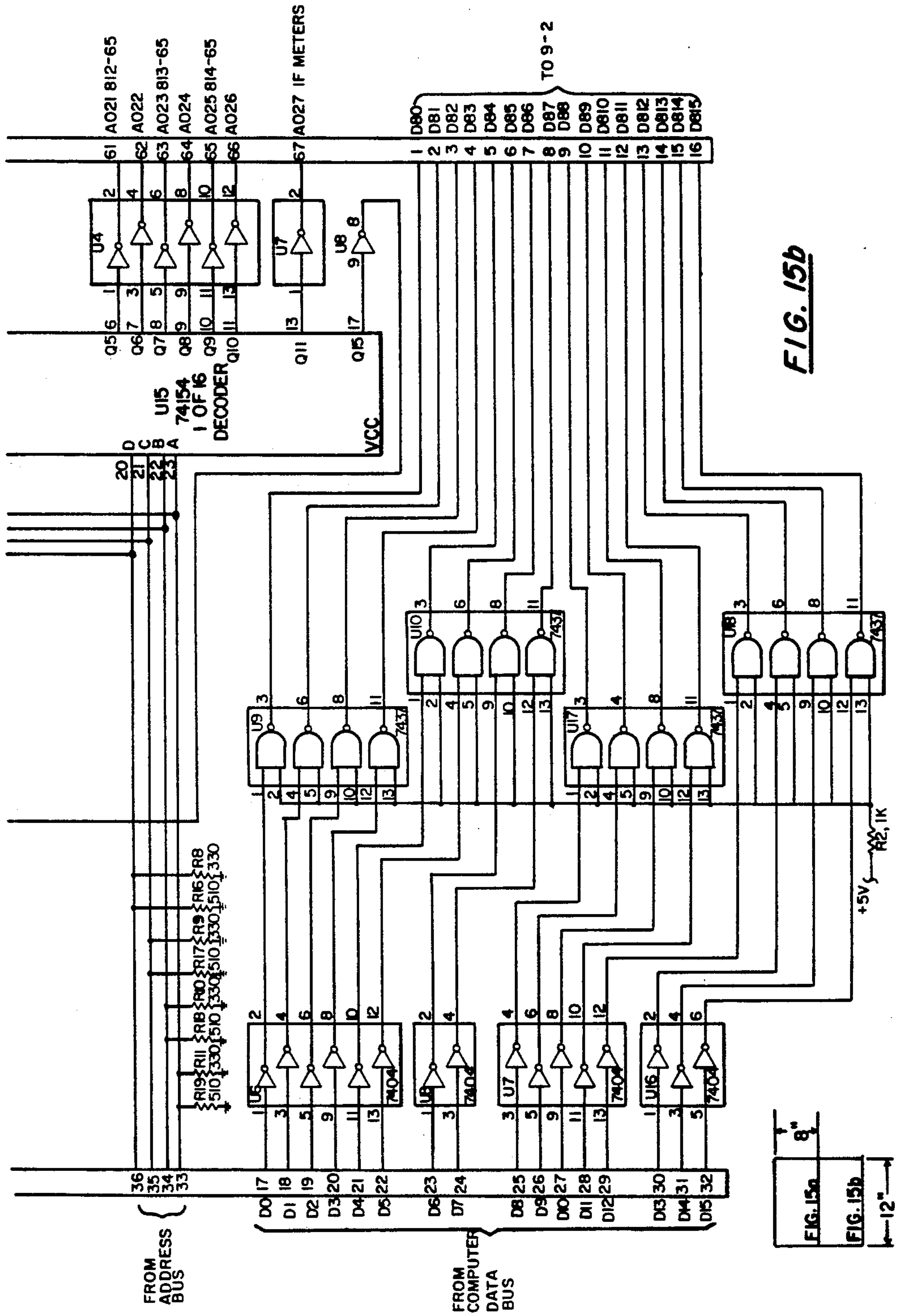
Figure 16:
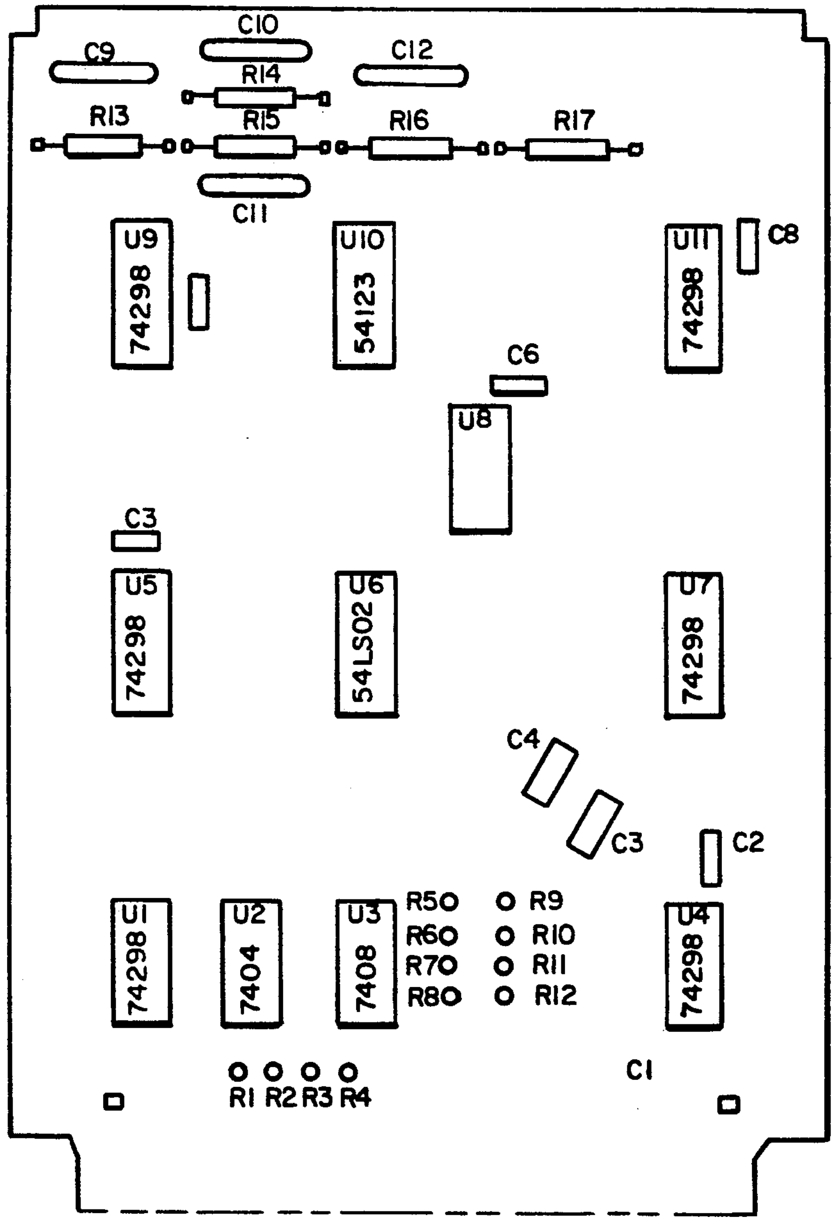
FIG. 16 is the RF mode control board B-2 of the control section.
Figure 17A:
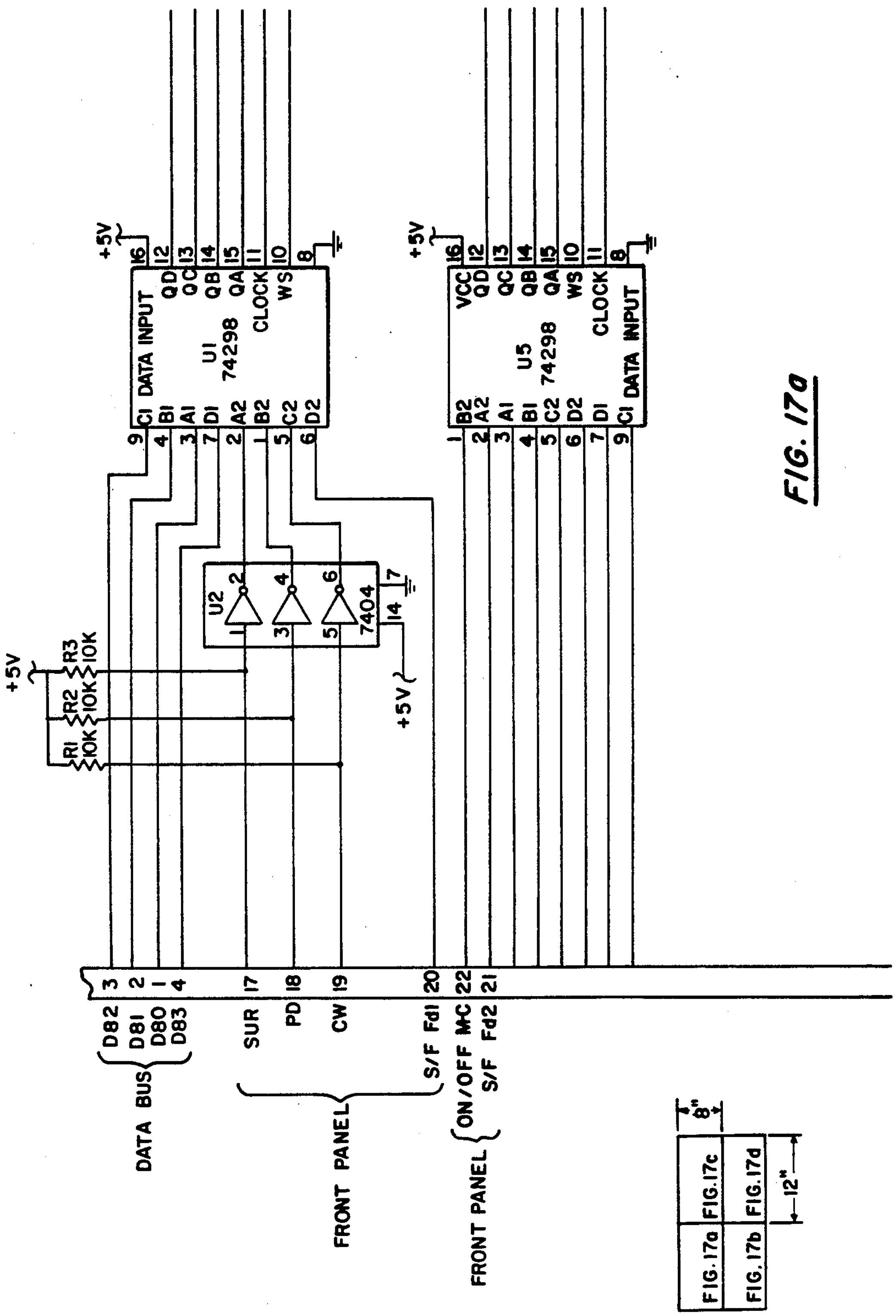
FIGS. 17a, 17b, 17c and 17d dhow details of board B-2.
Figure 17B:
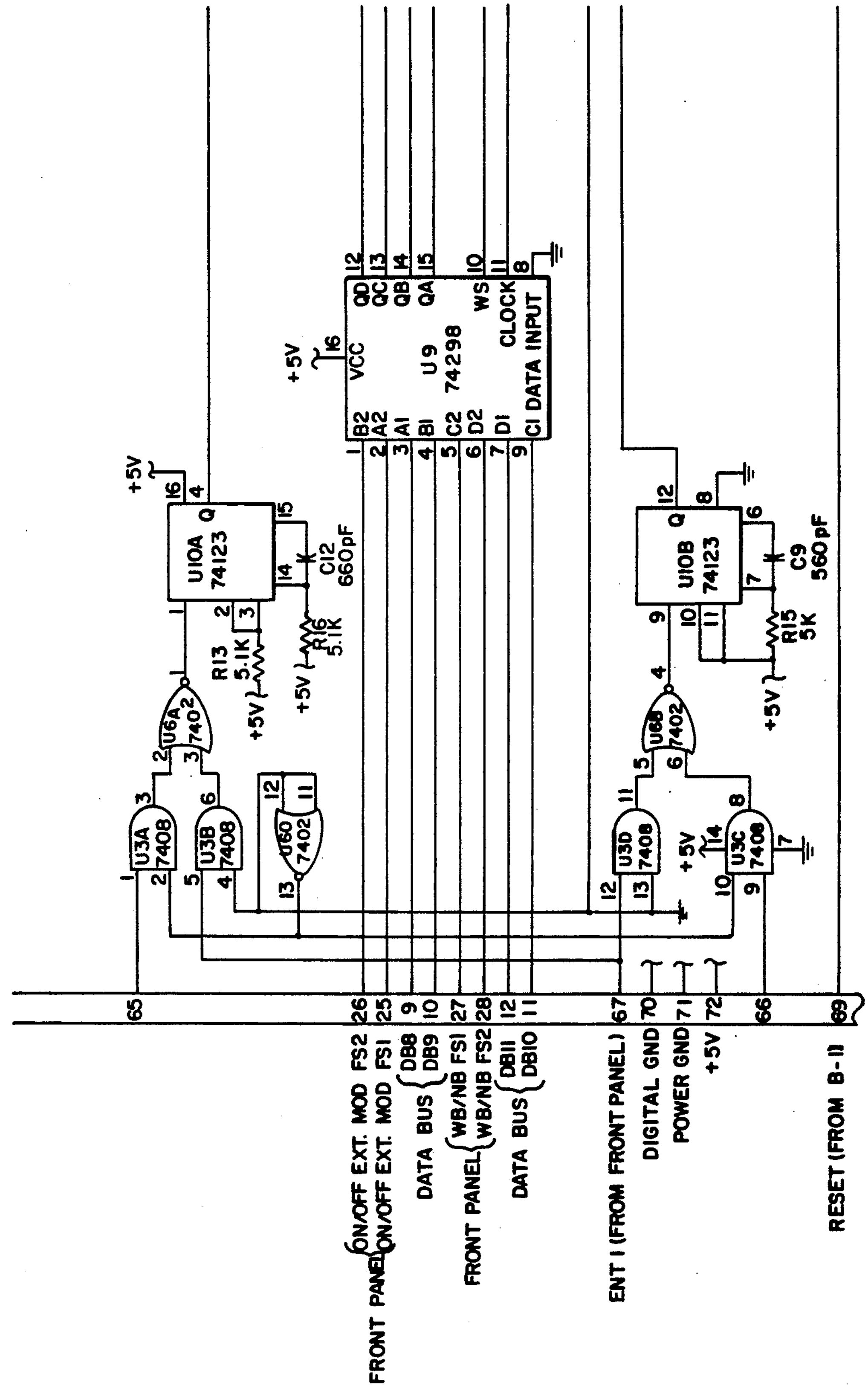
Figure 17C:
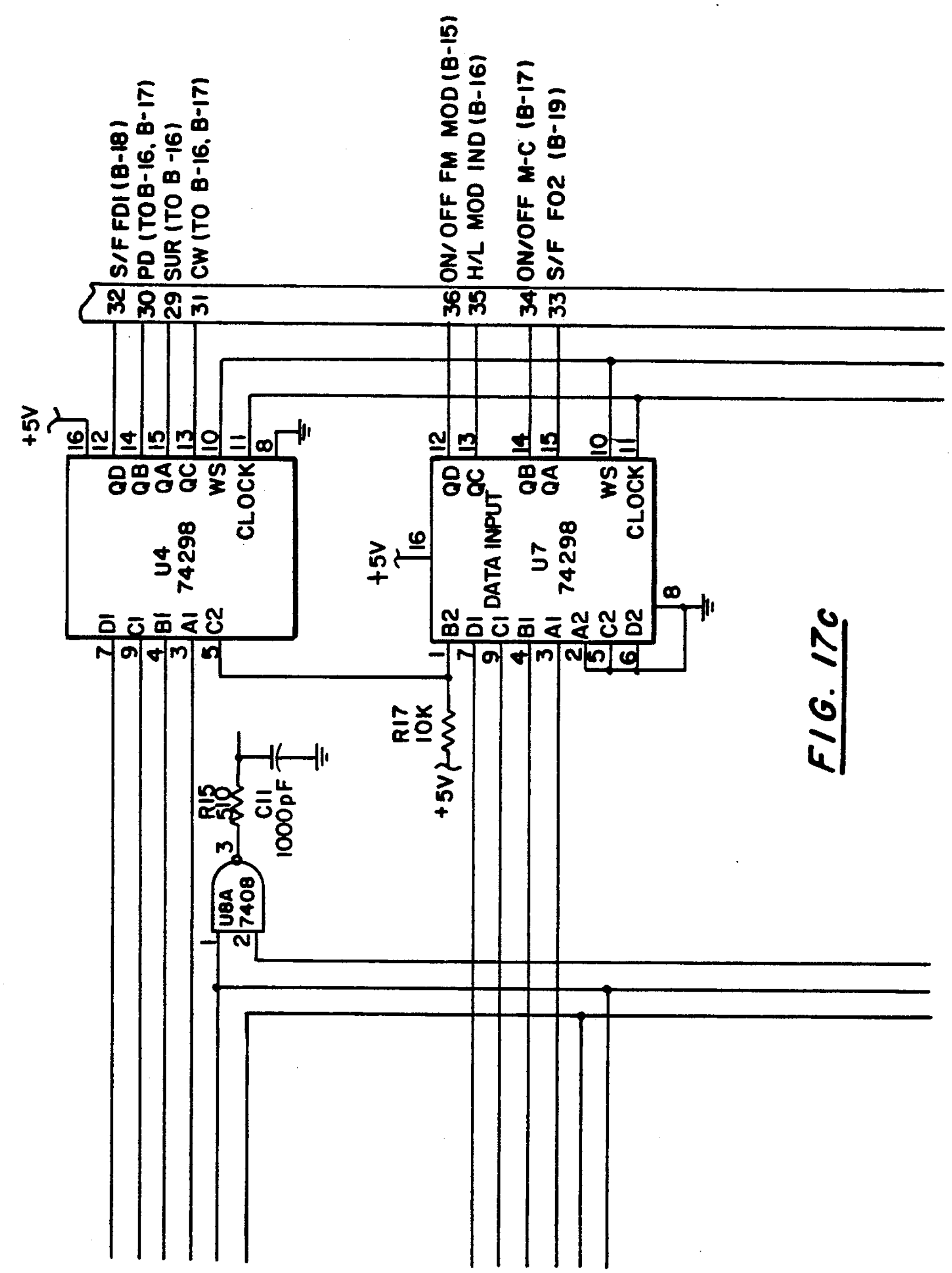
Figure 17D:
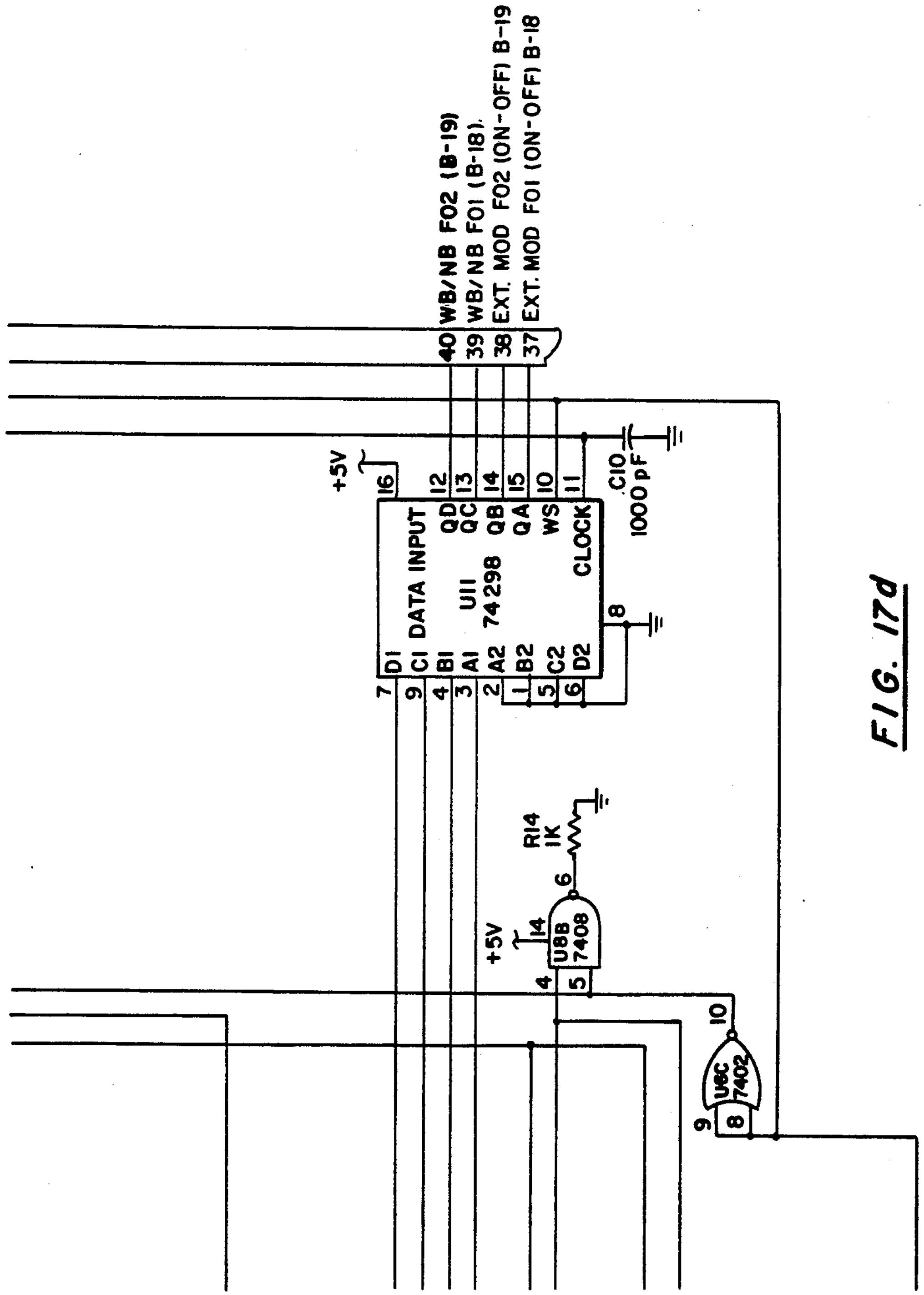
Figure 18:
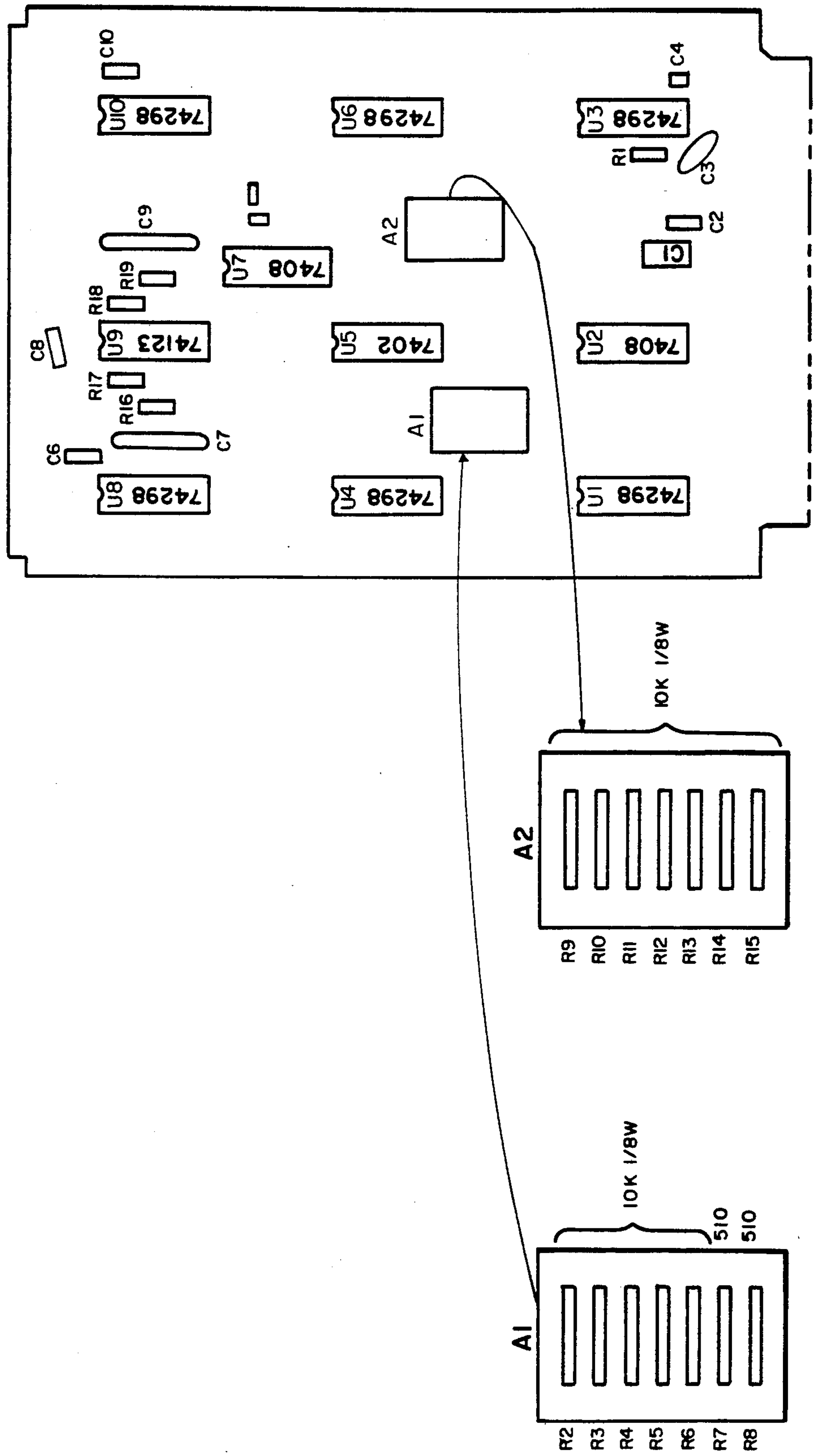
FIG. 18 is the range control board B-3.
Figure 19A:
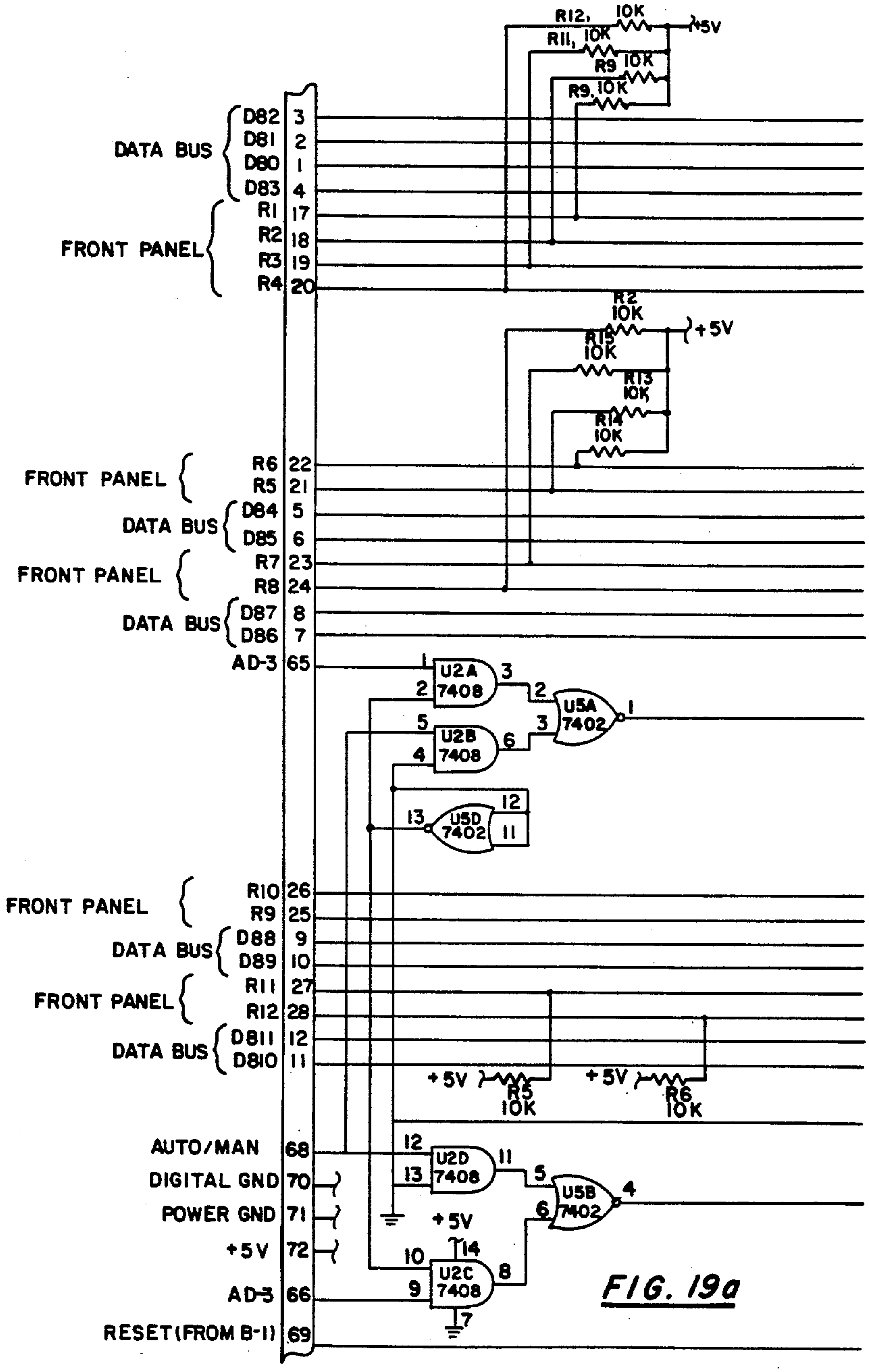
FIGS. 19a, 19b and 19c show details of B-3.
Figure 19B:
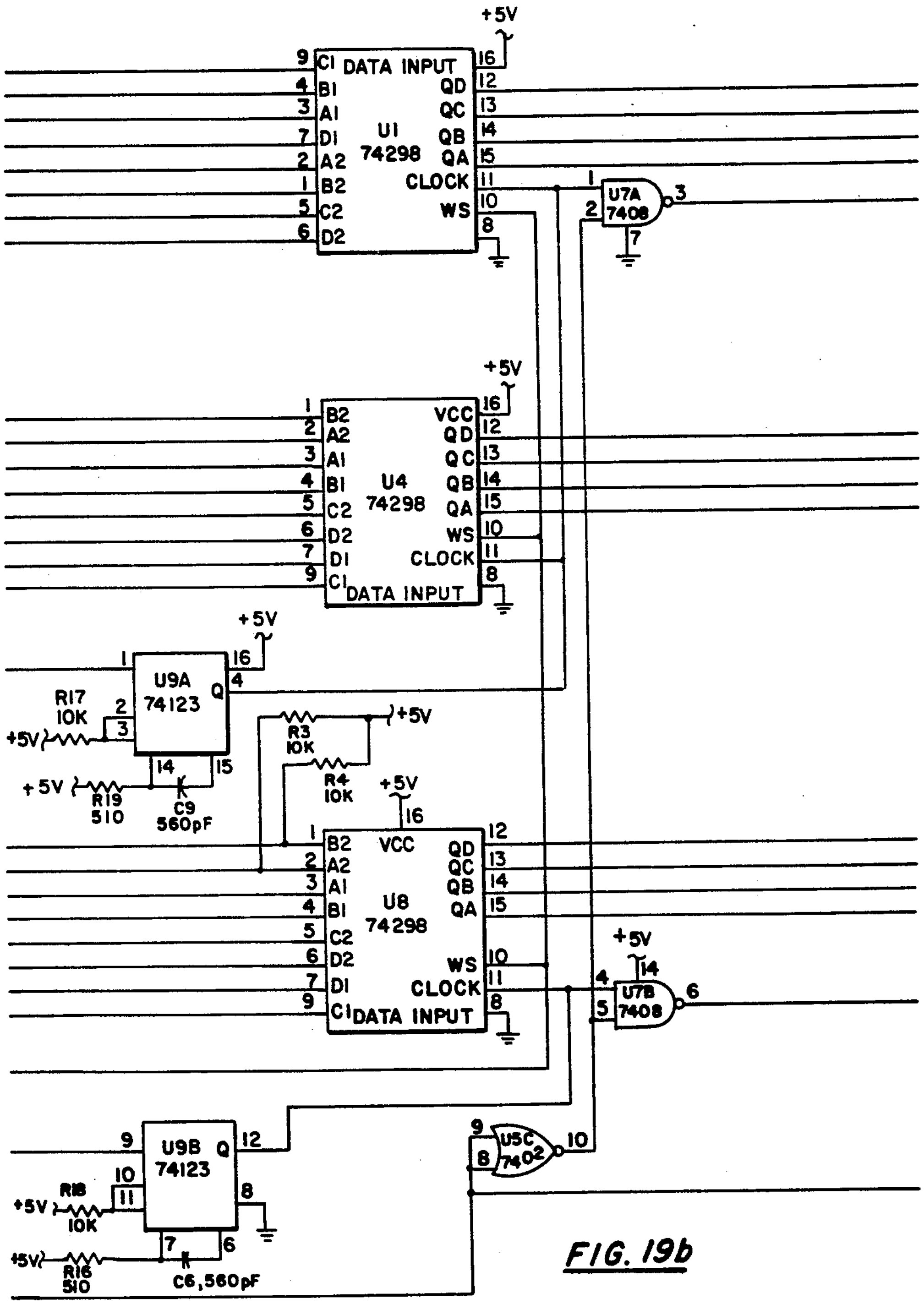
Figure 19C:
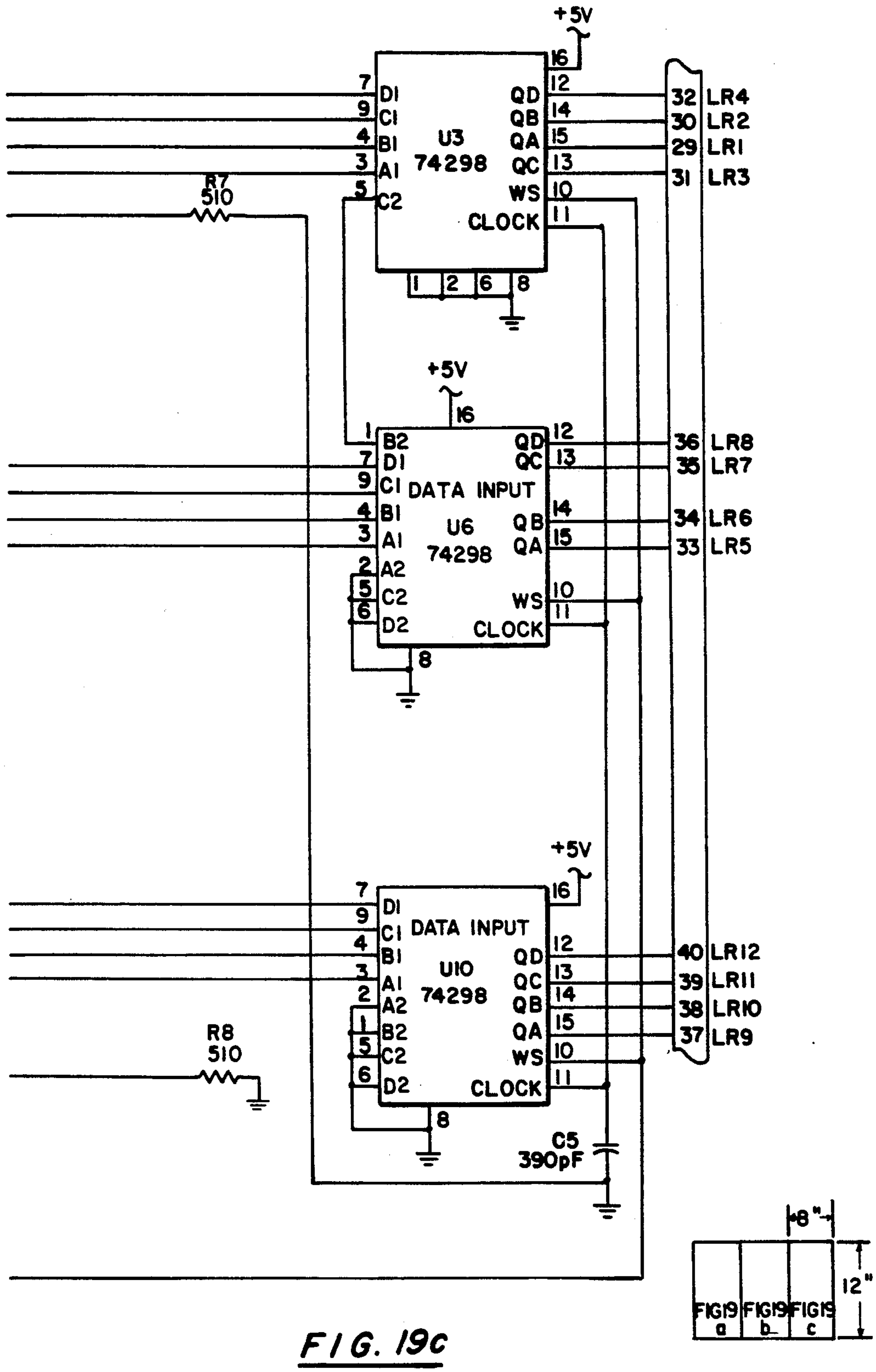
Figure 20:
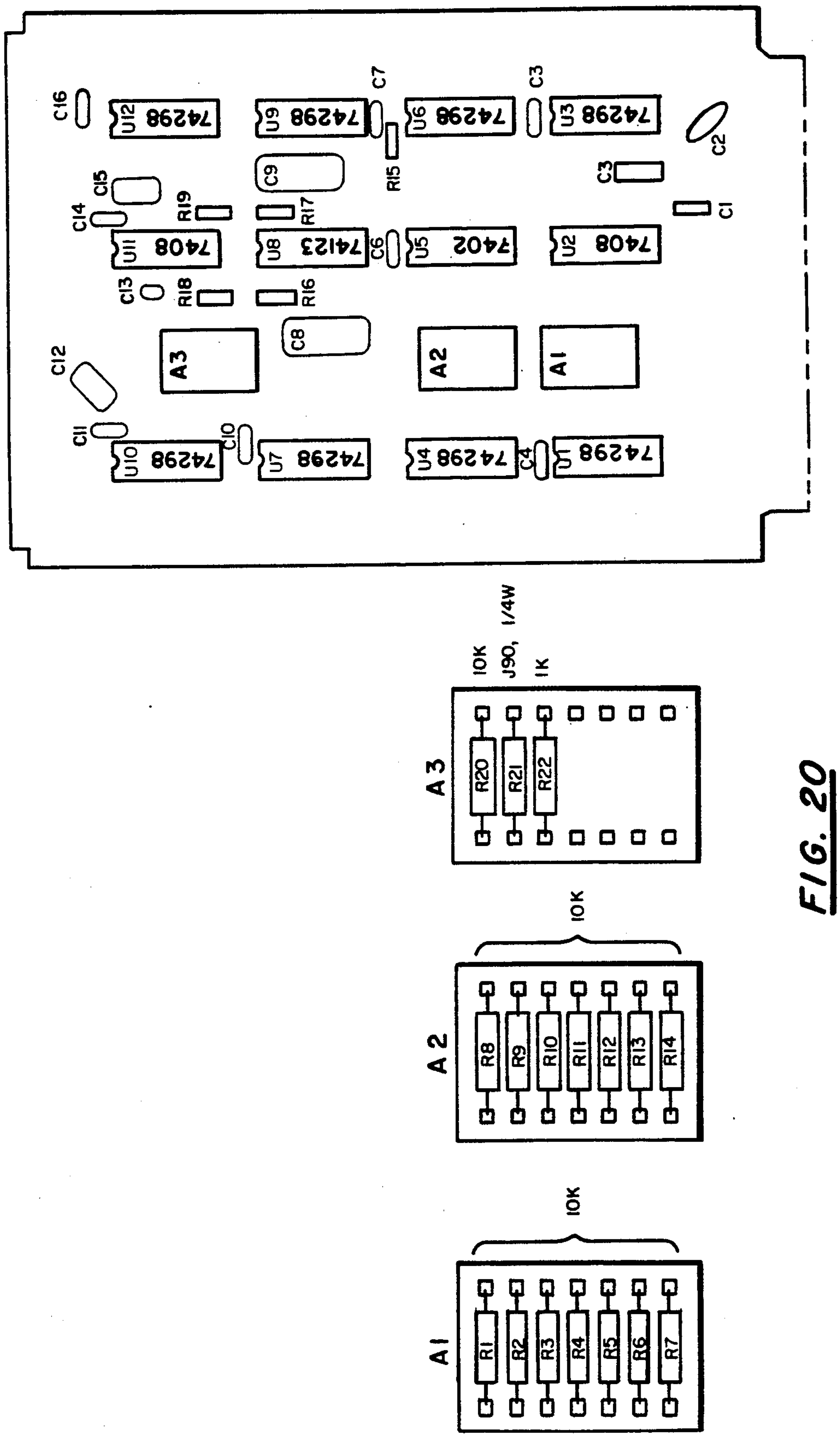
FIG. 20 is the fixed Doppler and sweeprate board B-4.
Figure 21A:
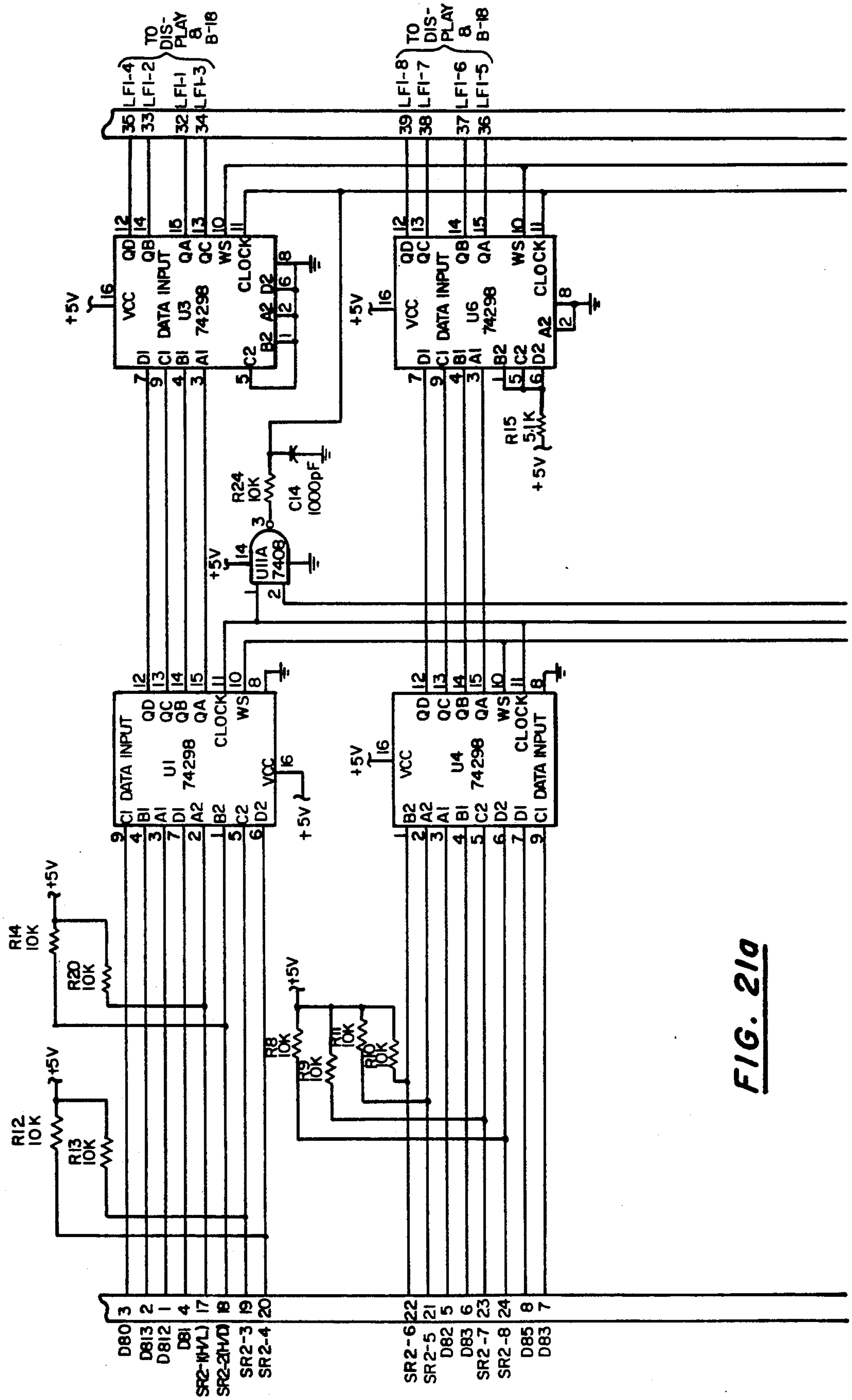
FIGS. 21a, 21b and 21c depict details of board B-4.
Figure 21B:
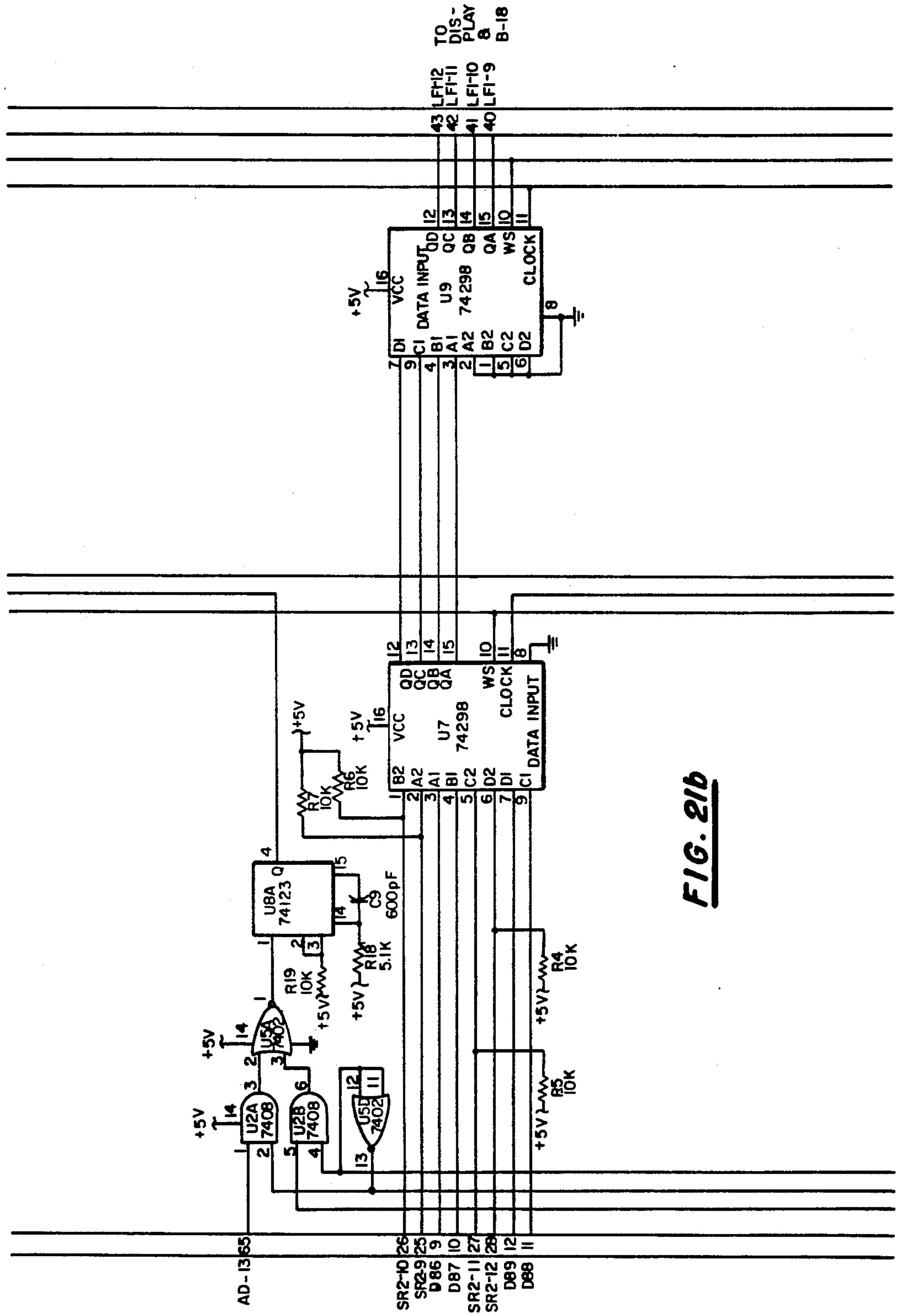
Figure 21C:
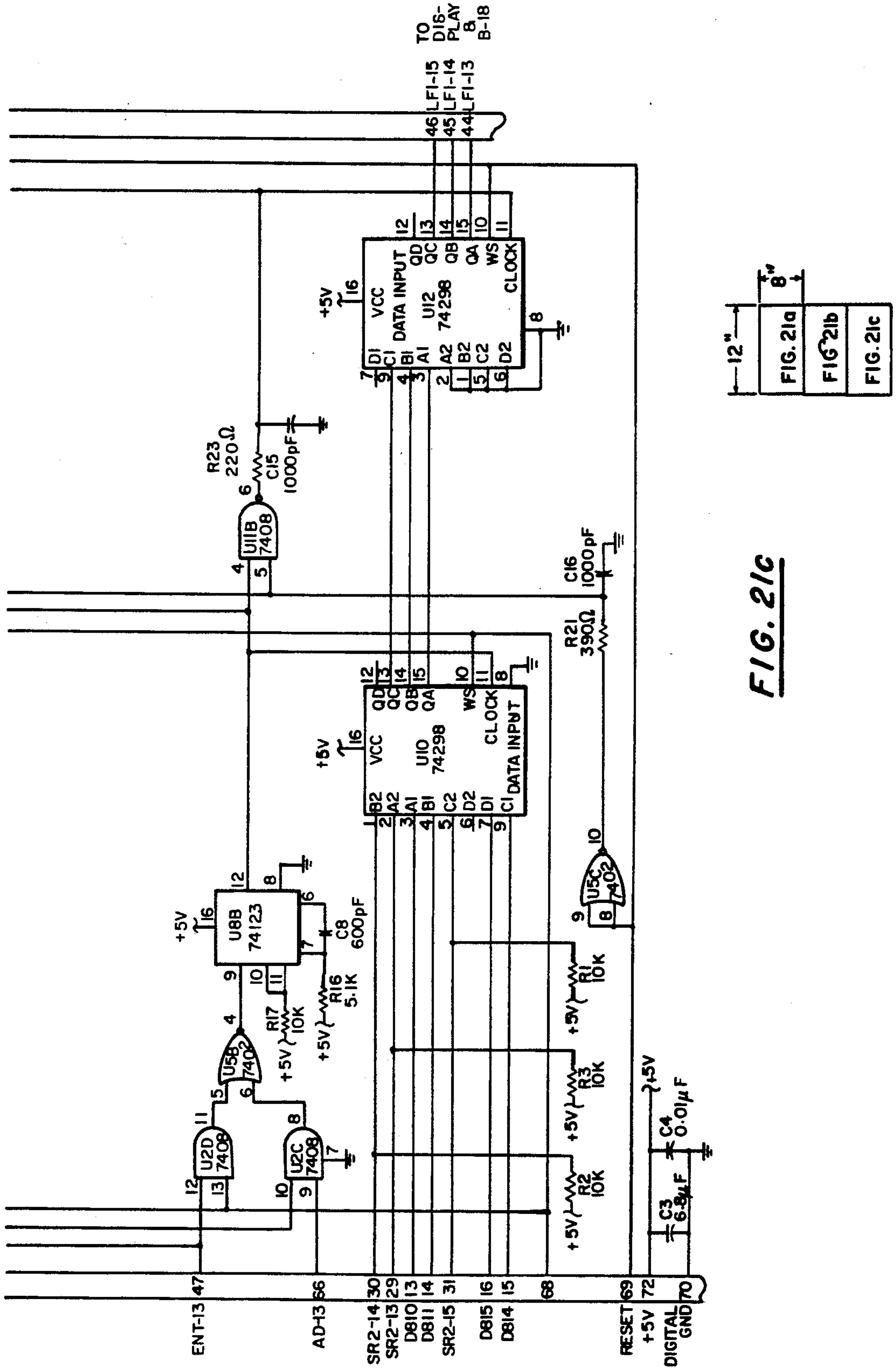
Figure 23A:
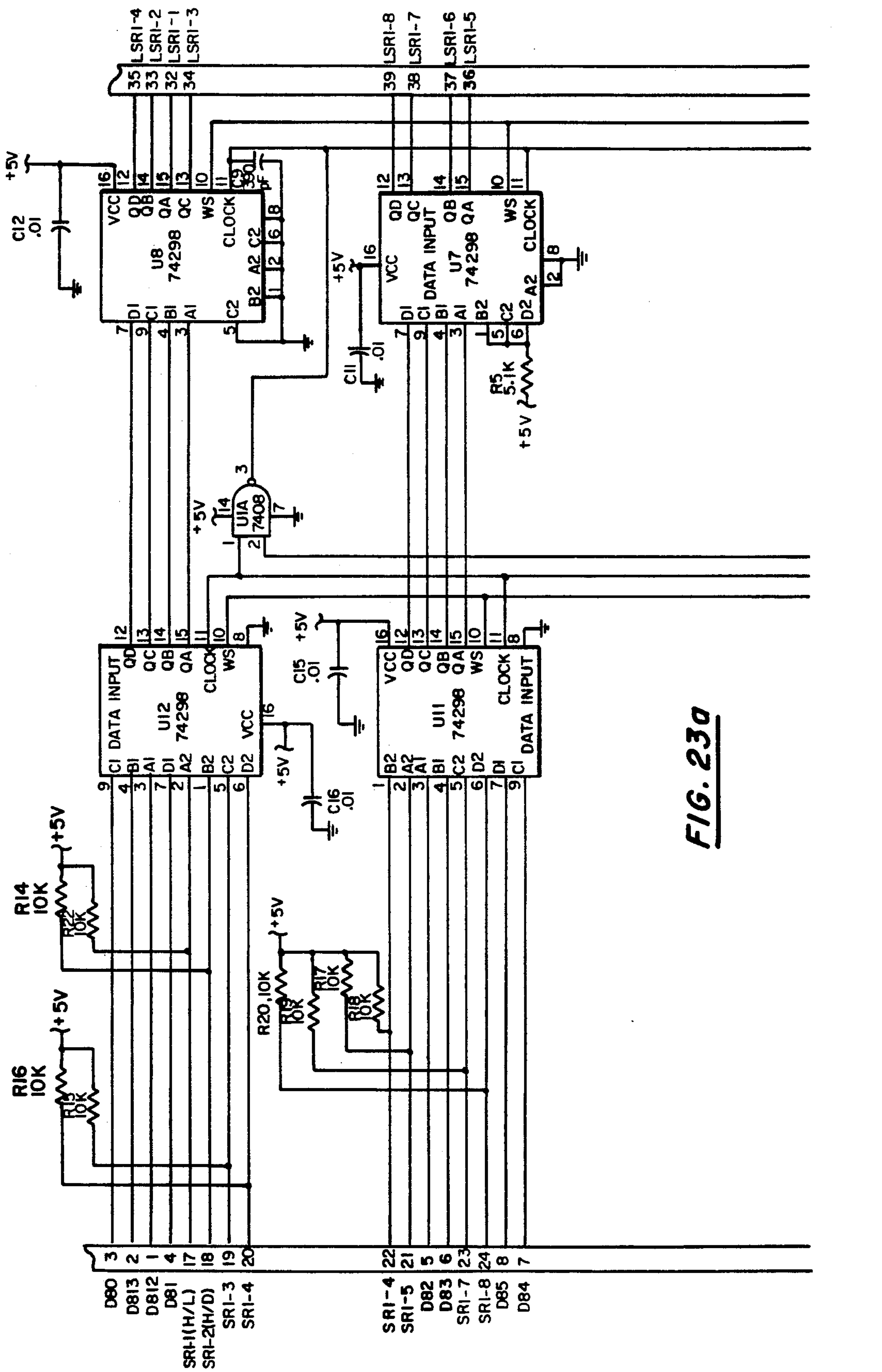
FIGS. 23a, 23b and 23c depict details of board B-5.
Figure 23B:
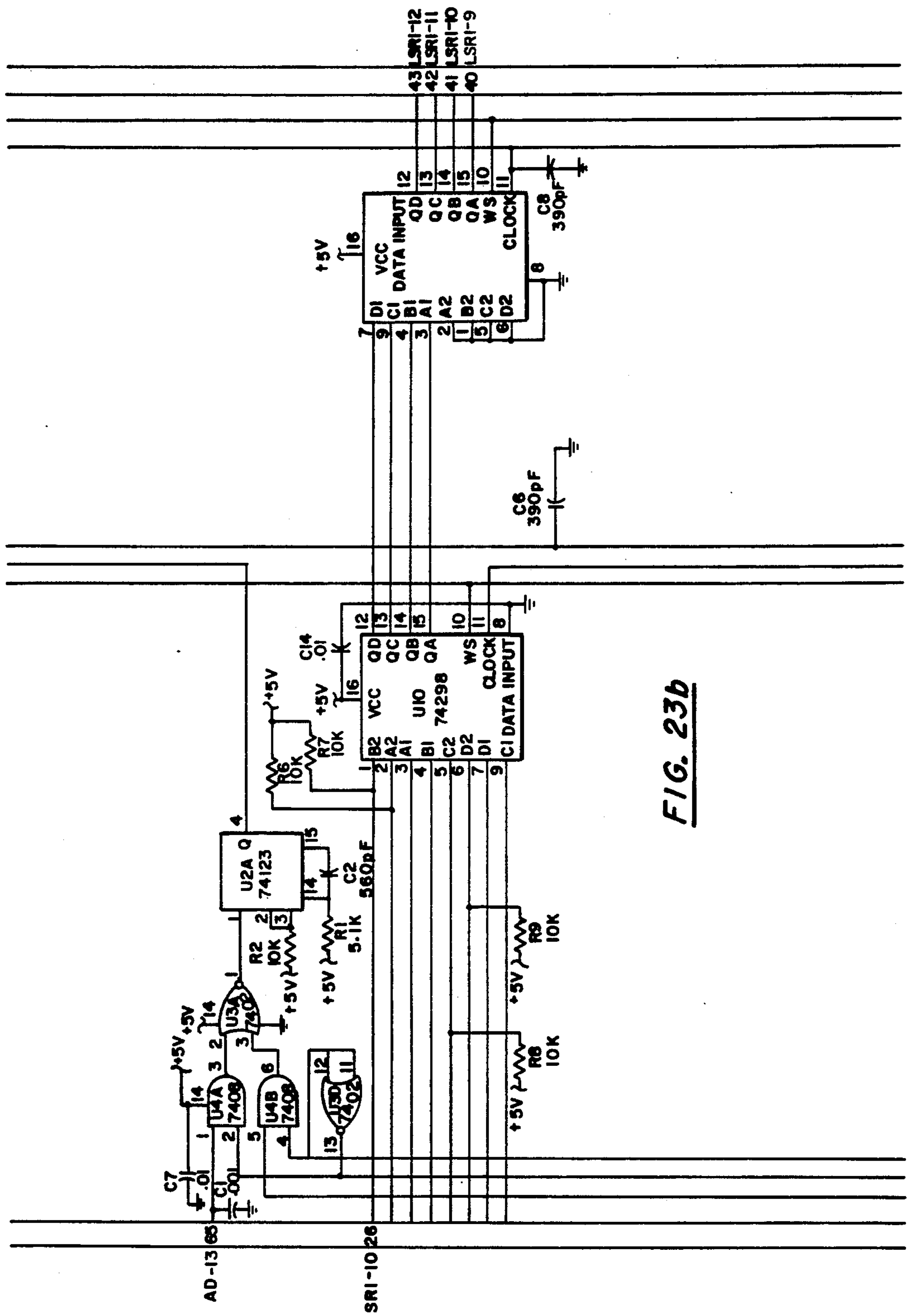
Figure 23C:
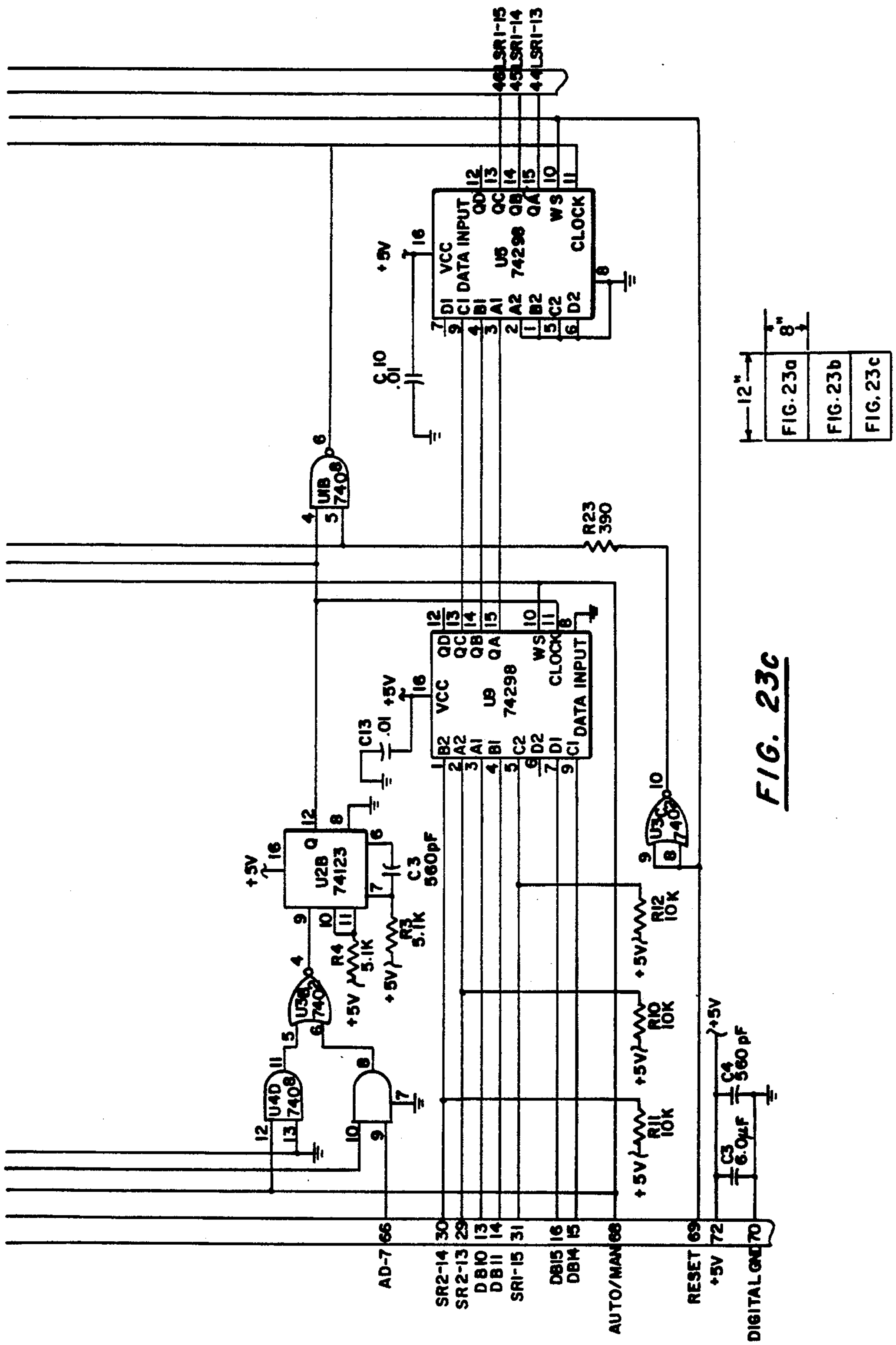
Figure 24A:
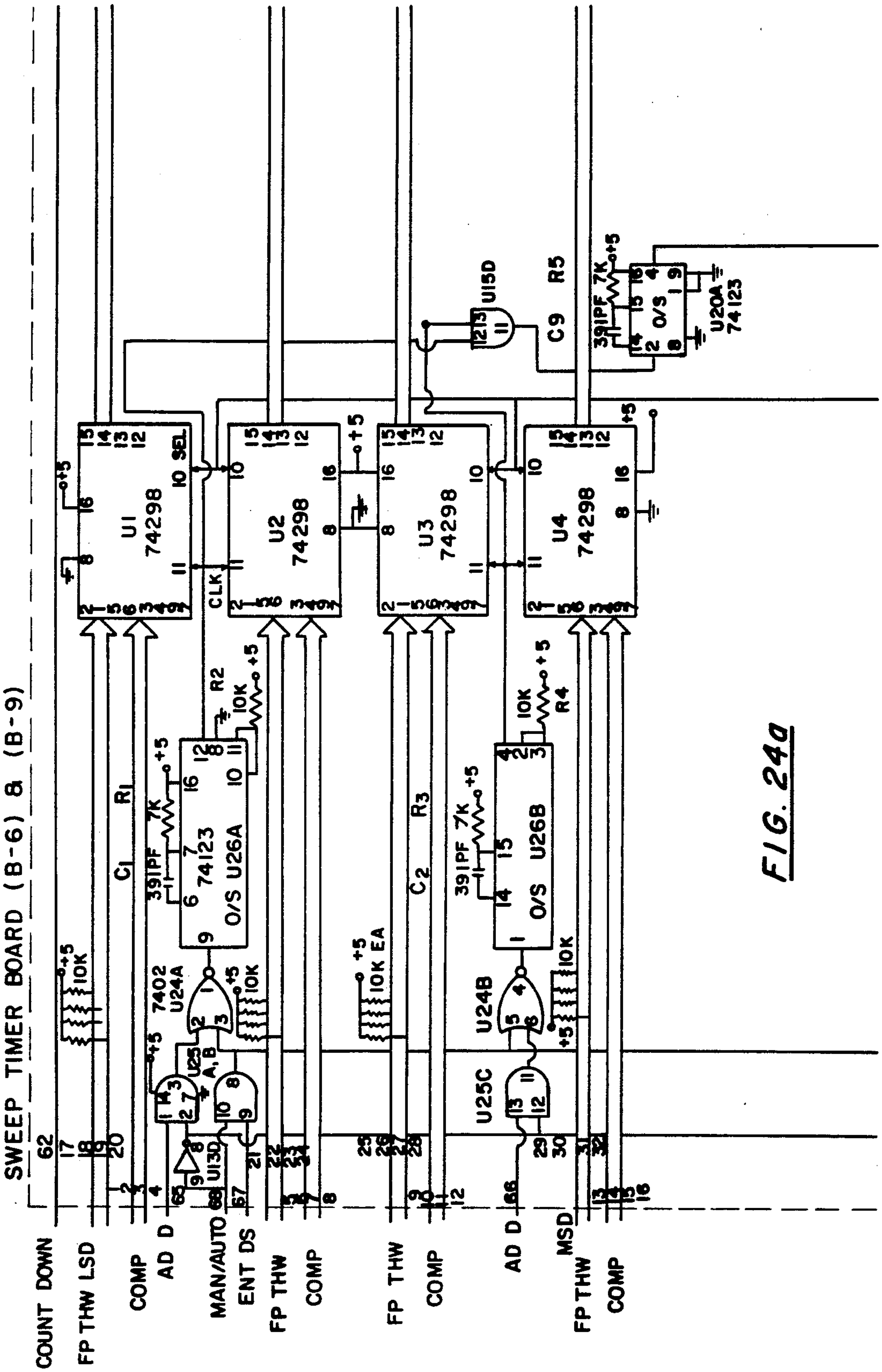
FIGS. 24a, 24b, 24c and 24d are the sweep timer boards B-6 and B-9 of the control section.
Figure 24B:
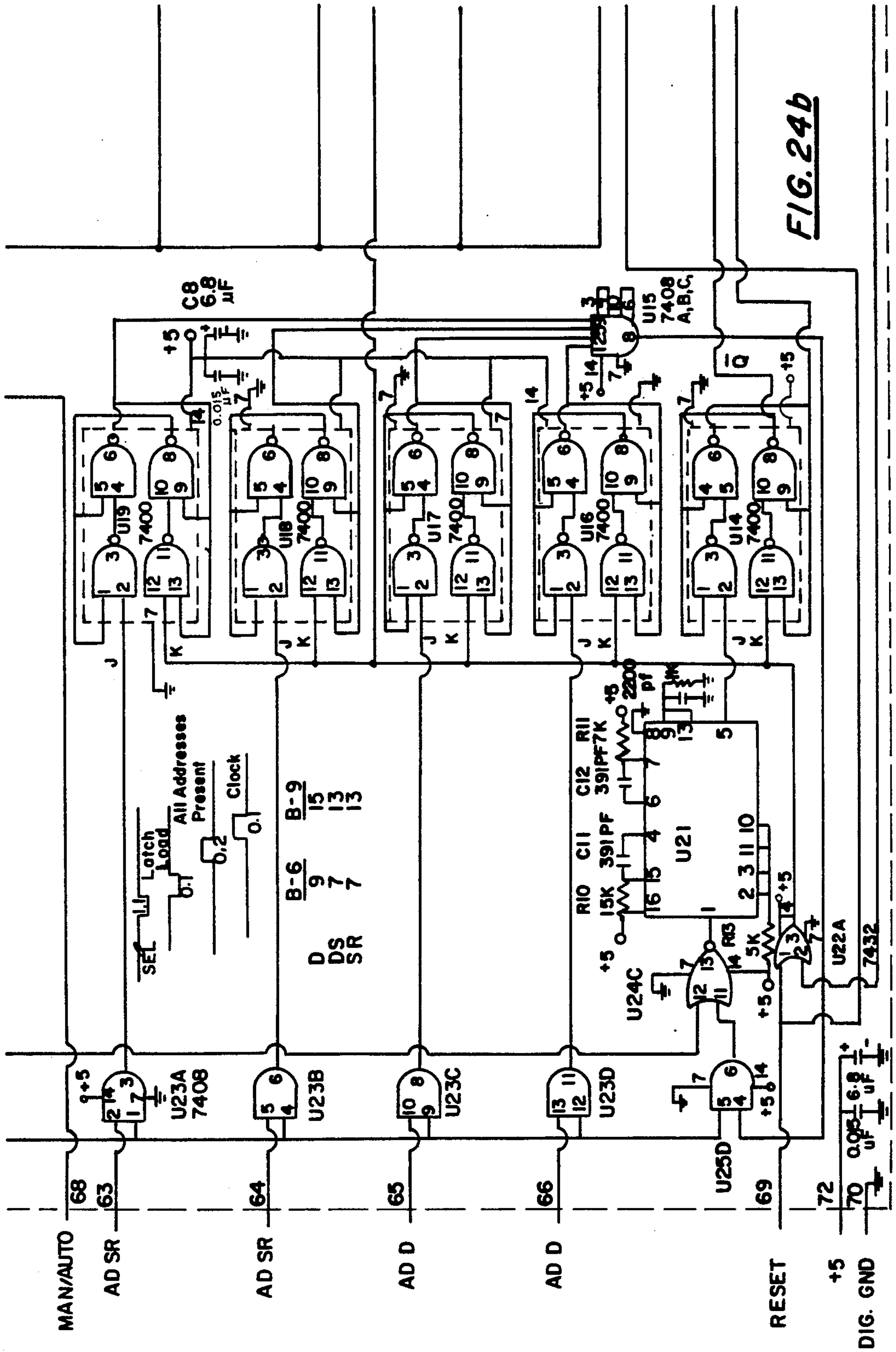
Figure 24C:
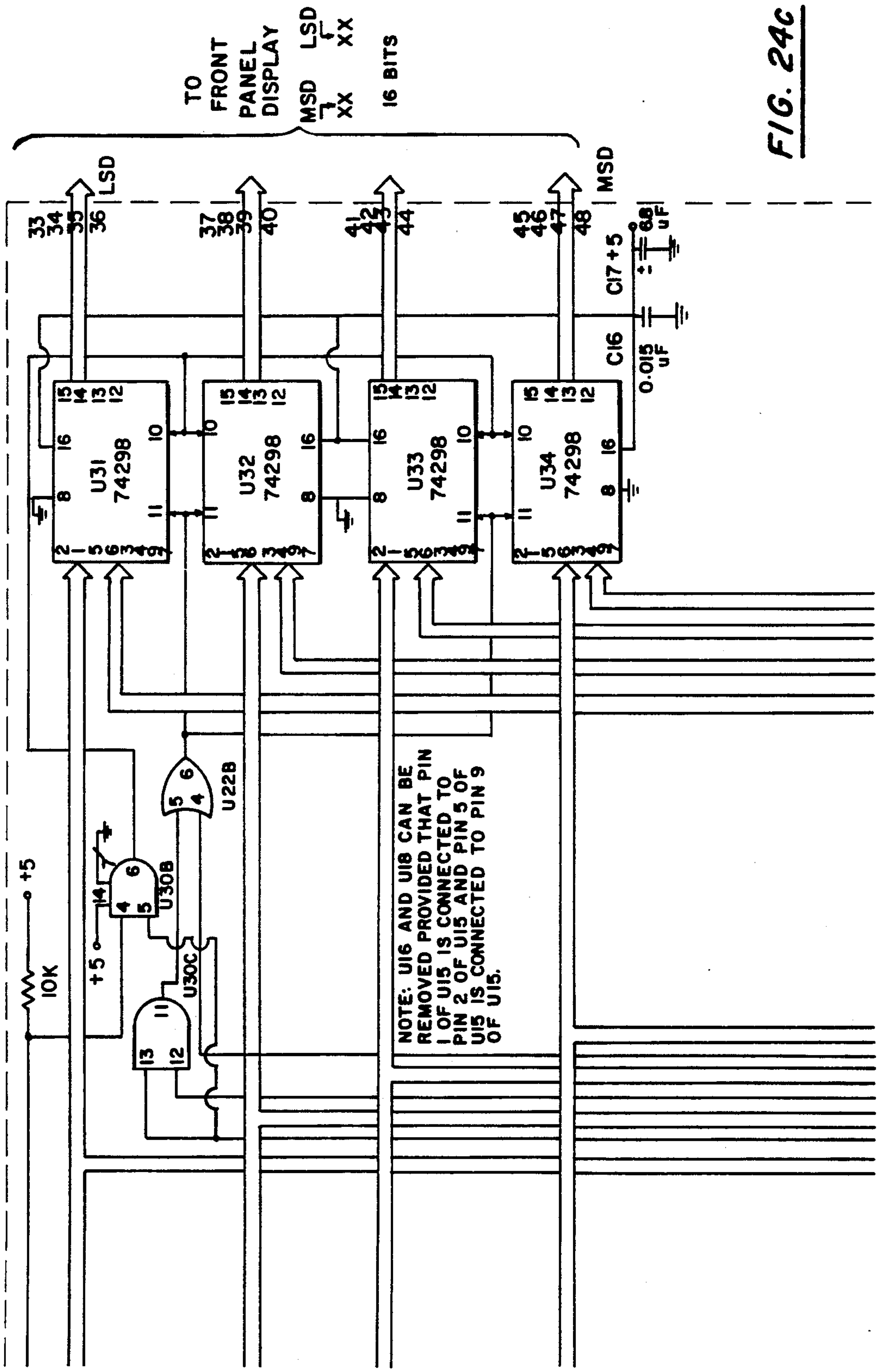
Figure 24D:
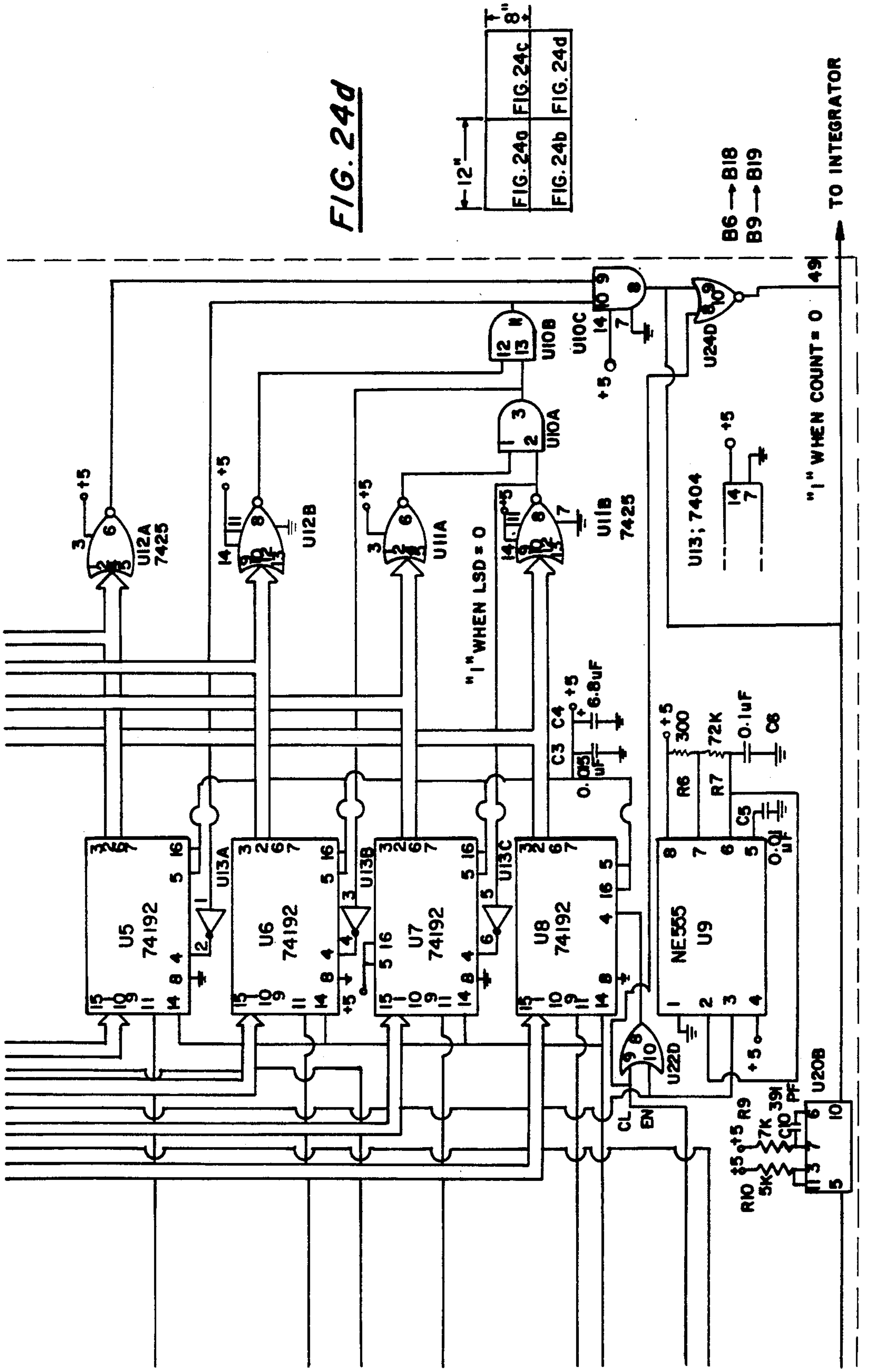
Figure 25:
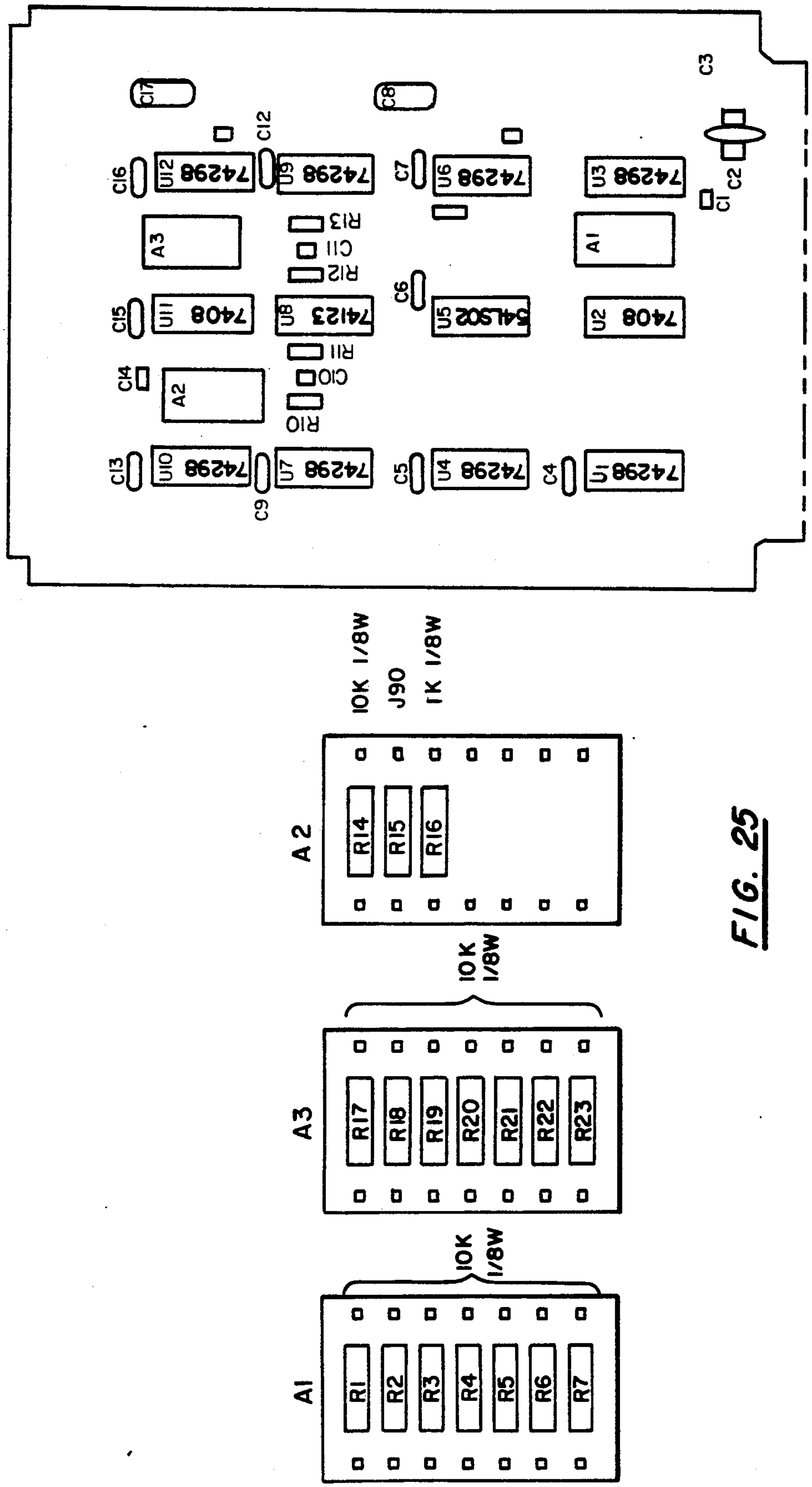
FIG. 25 is board B-7 and B-8 of the control section.
Figure 26A:
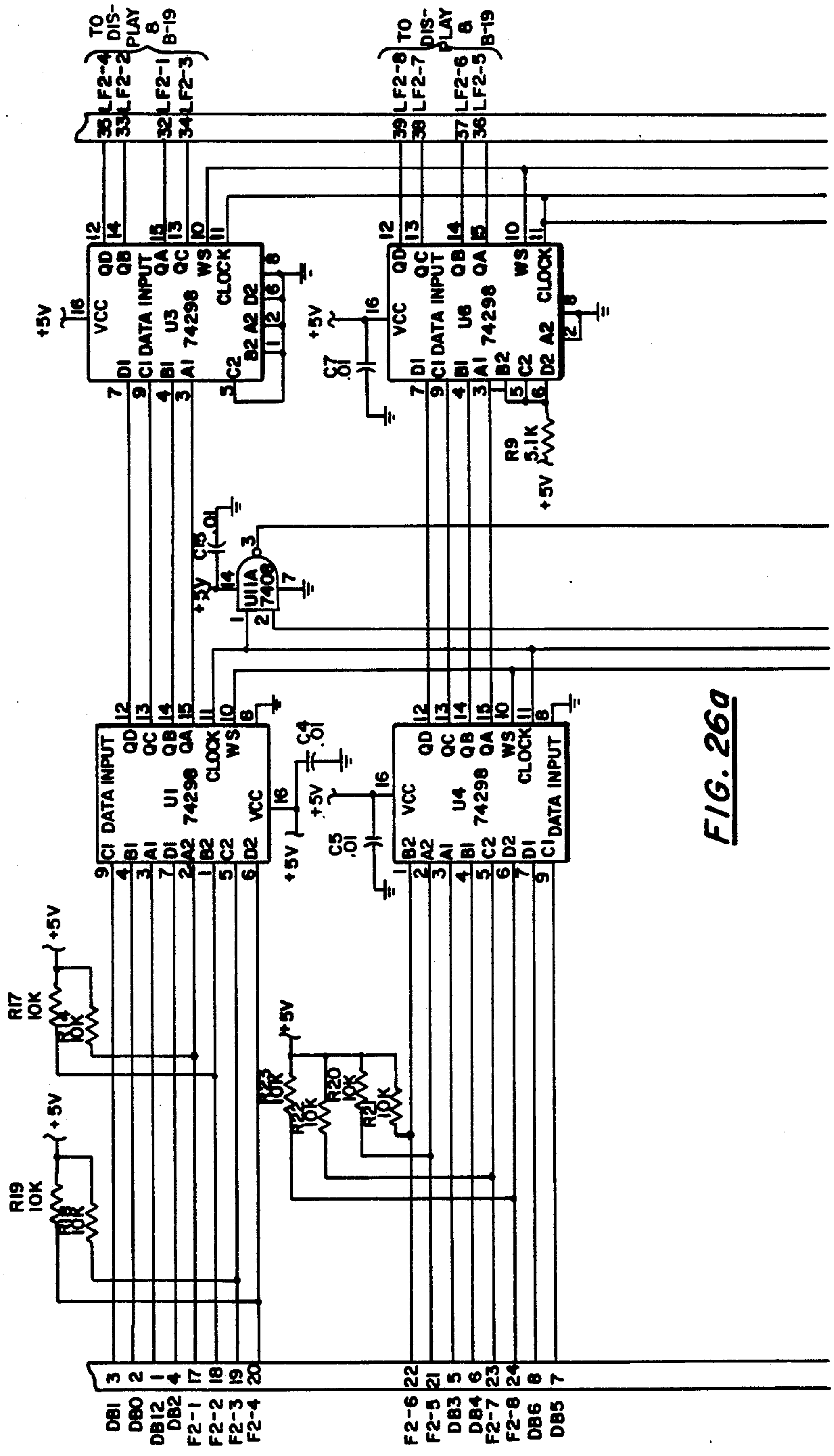
FIGS. 26a, 26b and 26c are details of the fixed Doppler rate sweep boards B-7 and B-8.
Figure 26B:
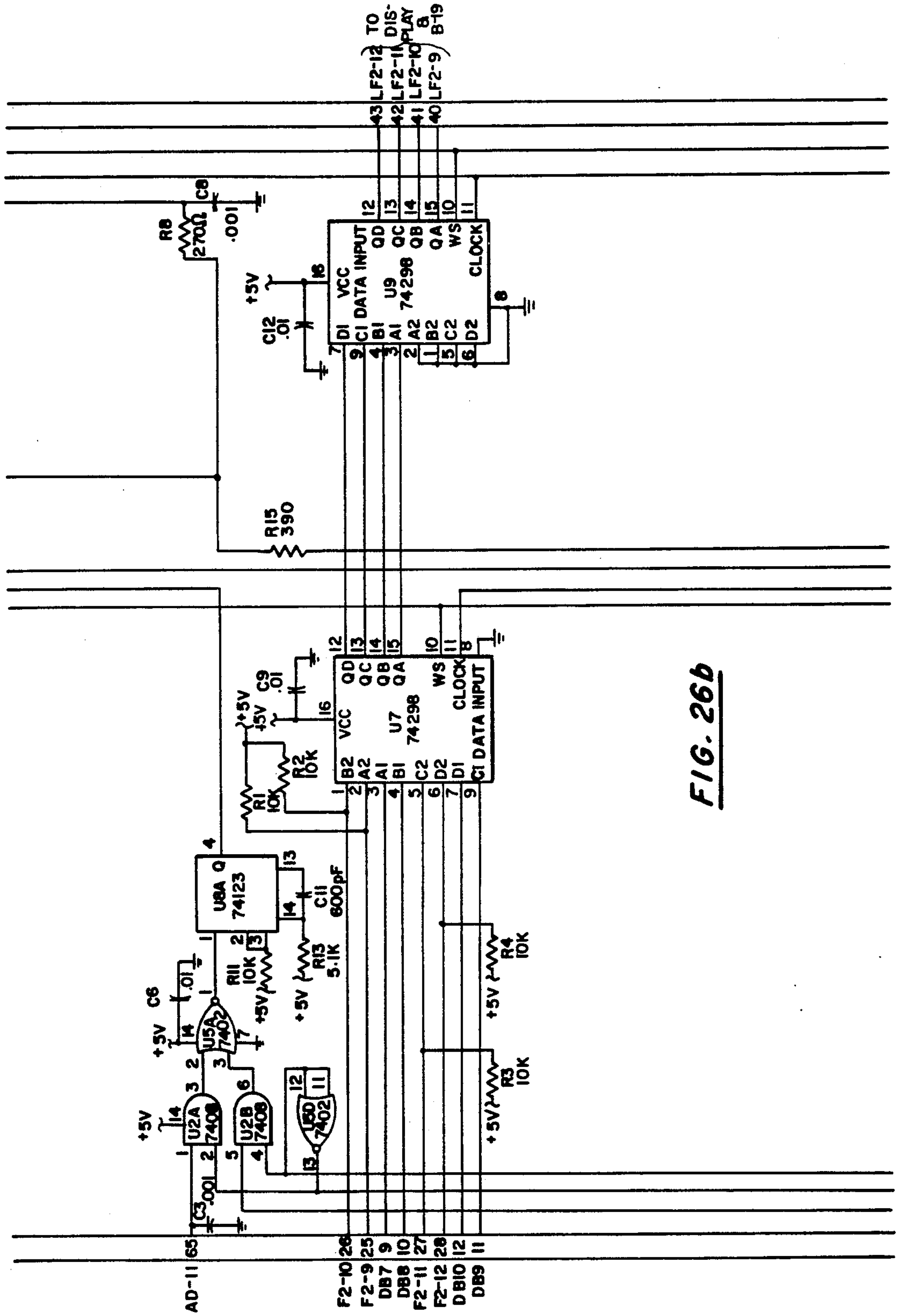
Figure 26C:
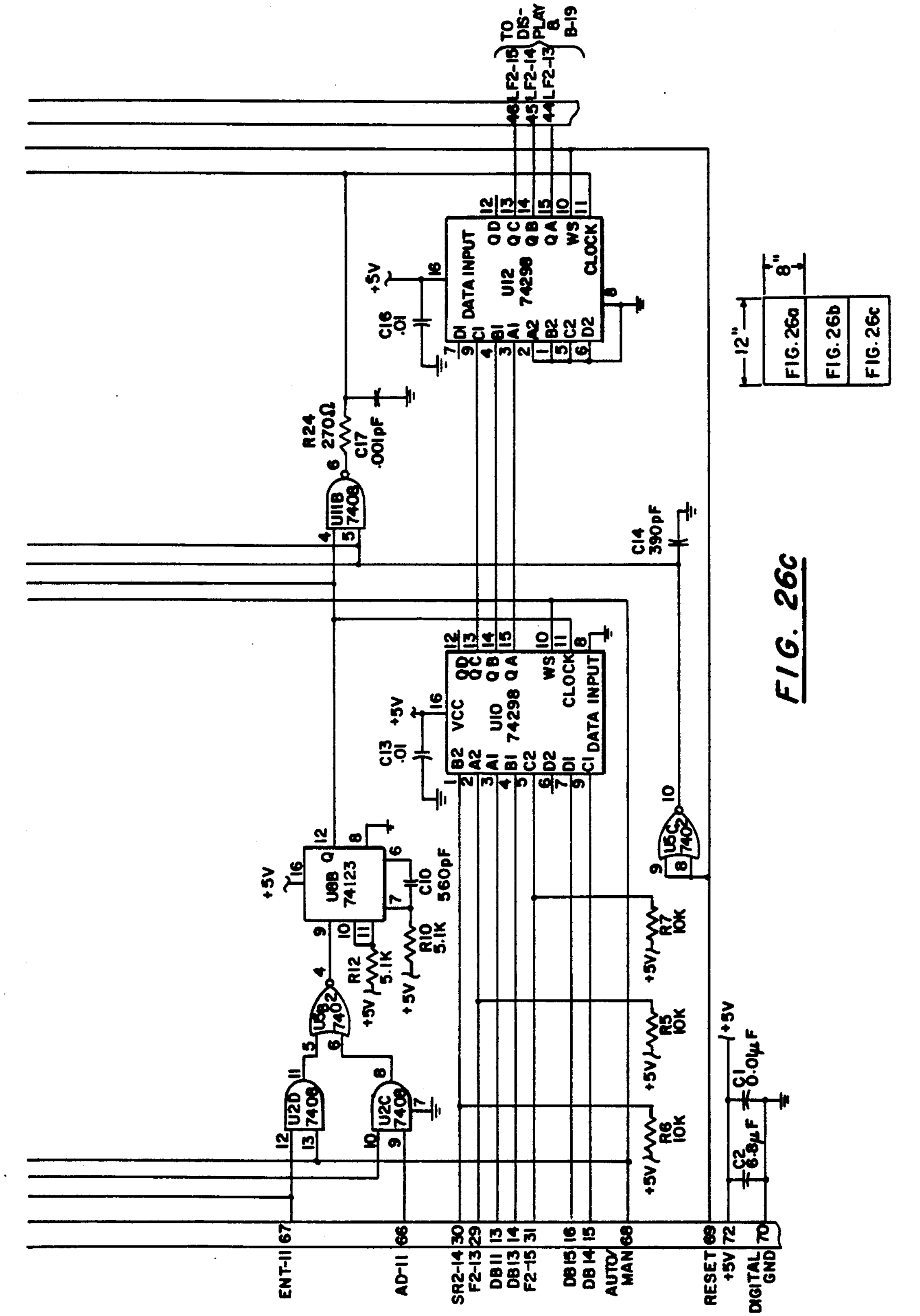
Figure 27A:
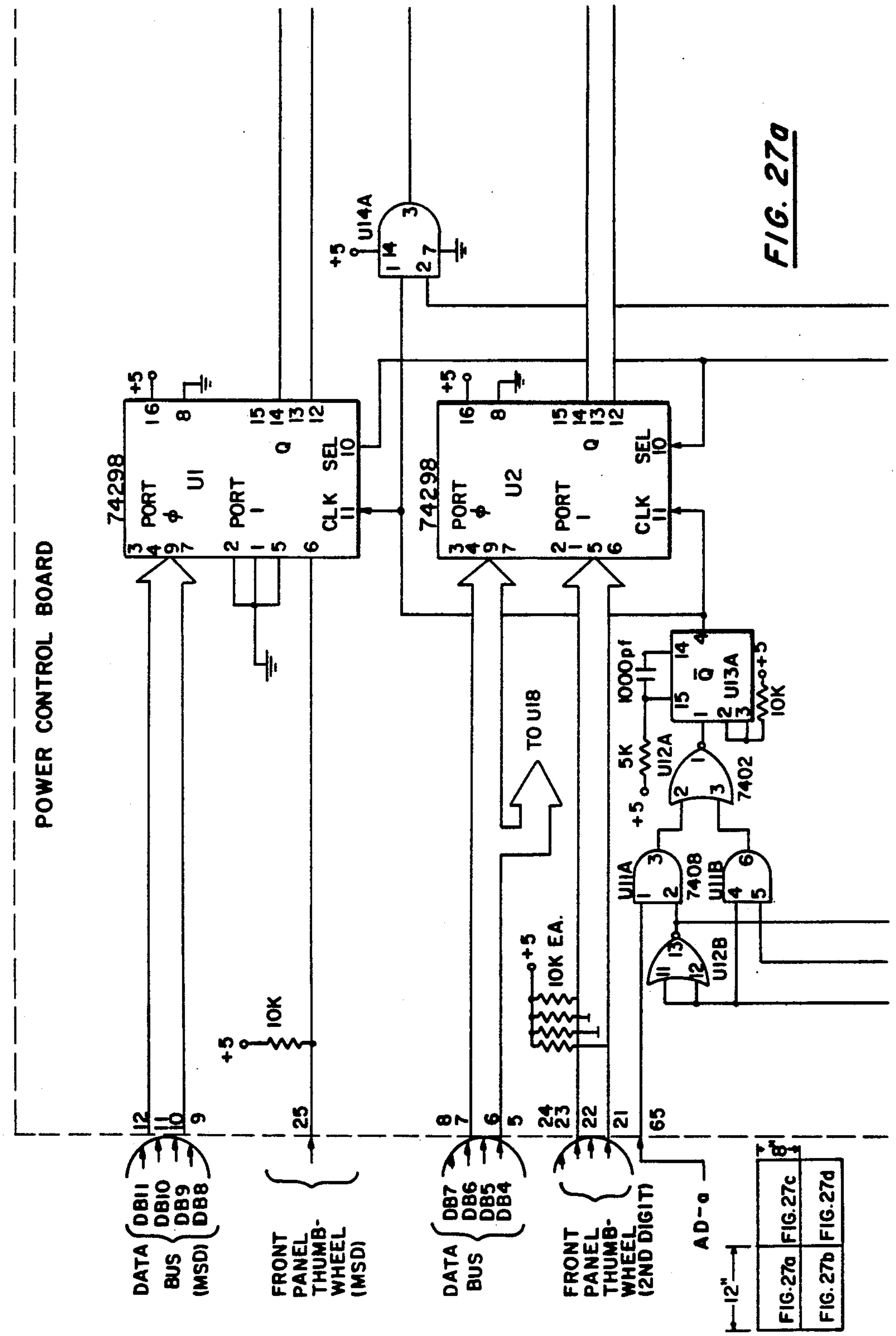
FIGS. 27a, 27b, 27c and 27d show the details of the power control board containing B-10, B-11, B-12, B-13 and B-14.
Figure 27B:
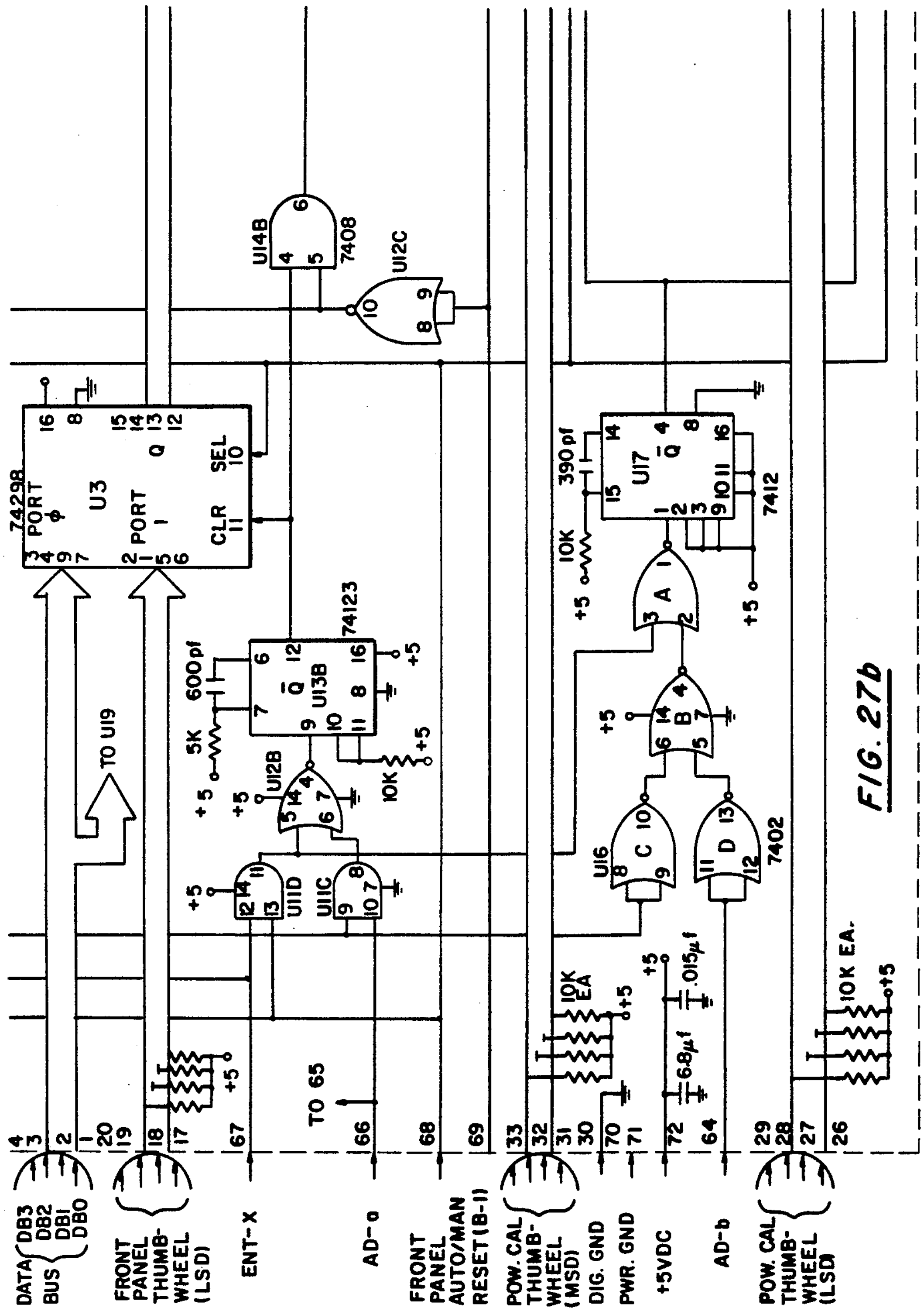
Figure 27C:
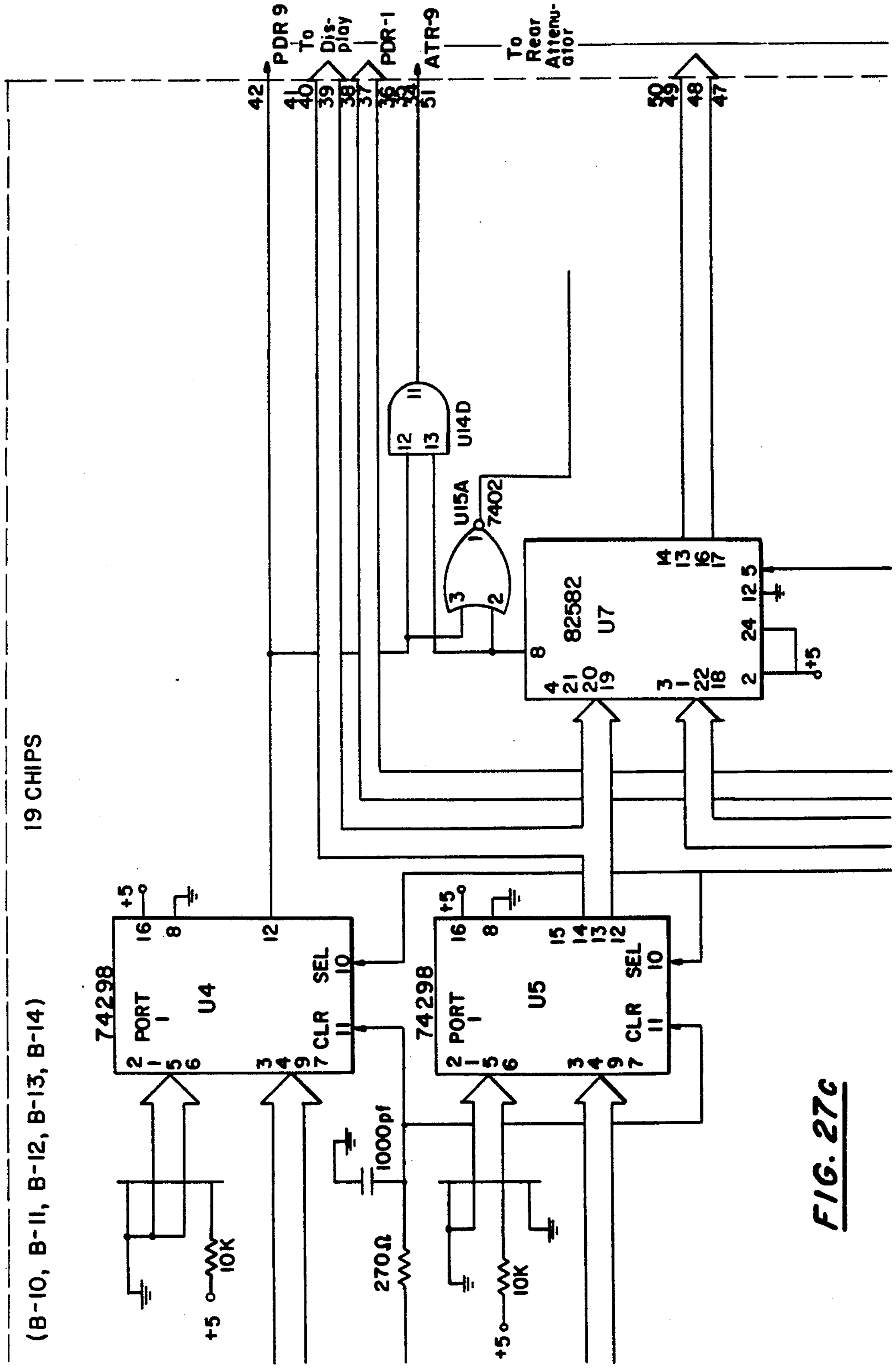
Figure 27D:
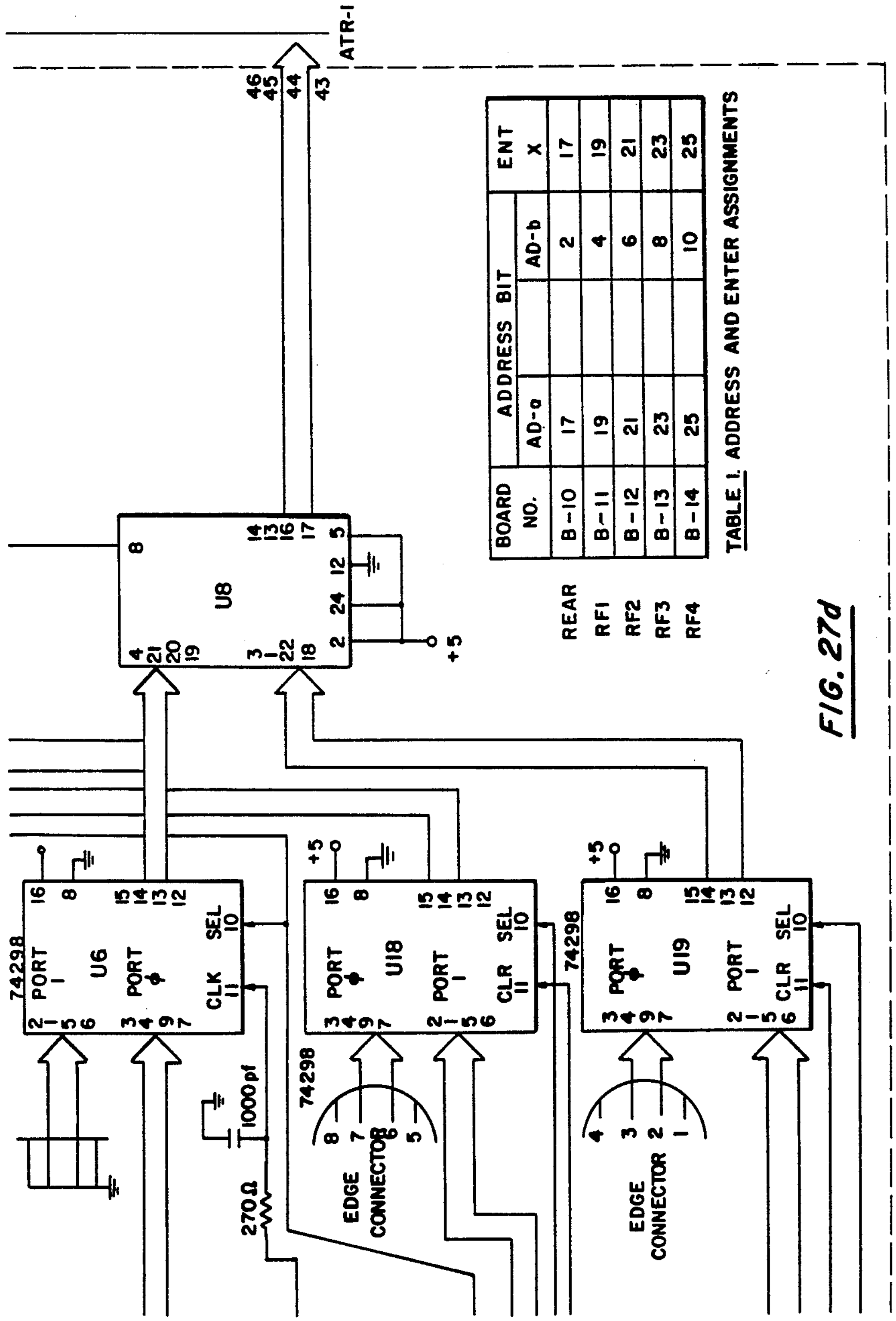
Figure 28A:
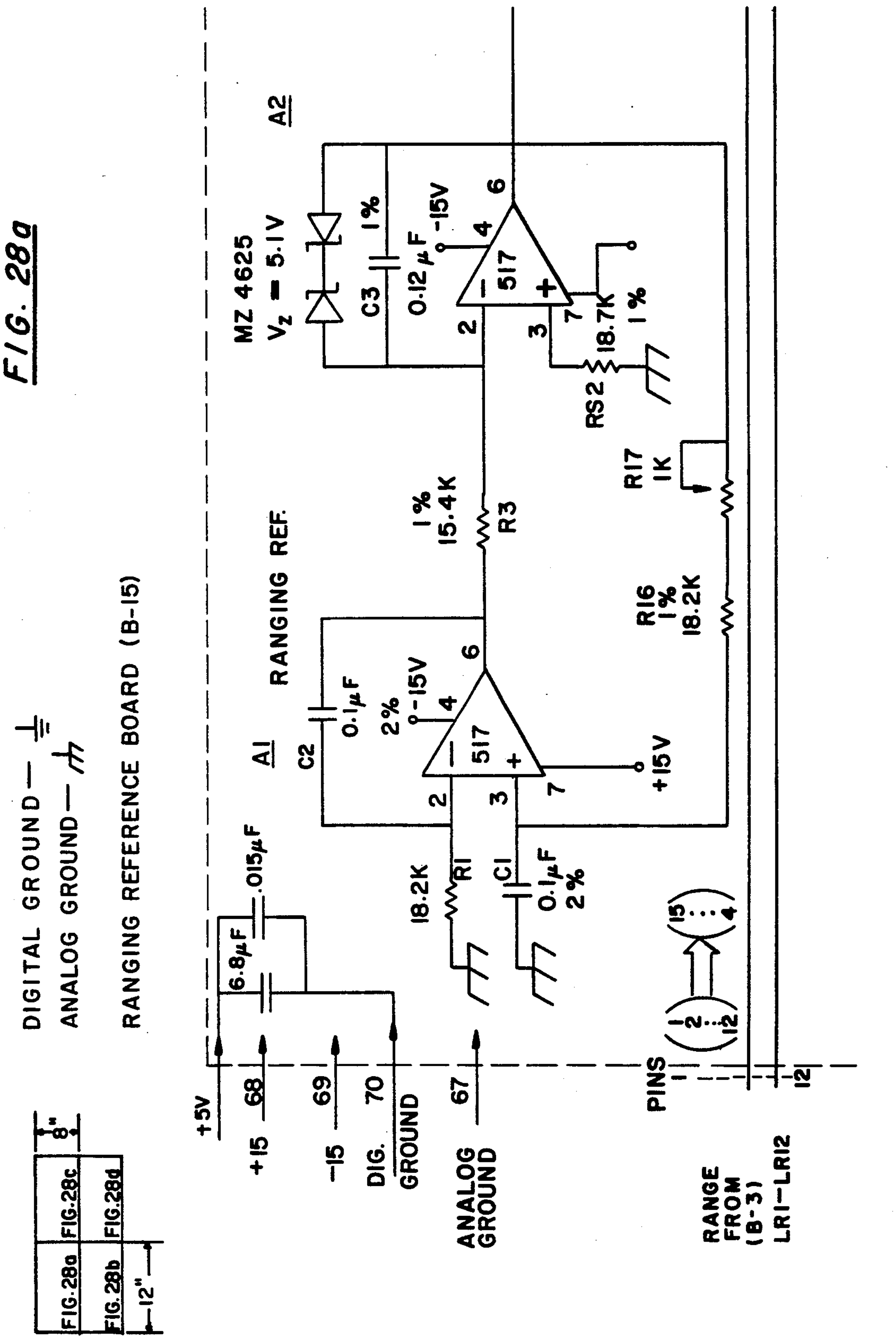
FIGS. 28a, 28b, 28c and 28d dhow the constituents of the range reference board B-15.
Figure 28B:
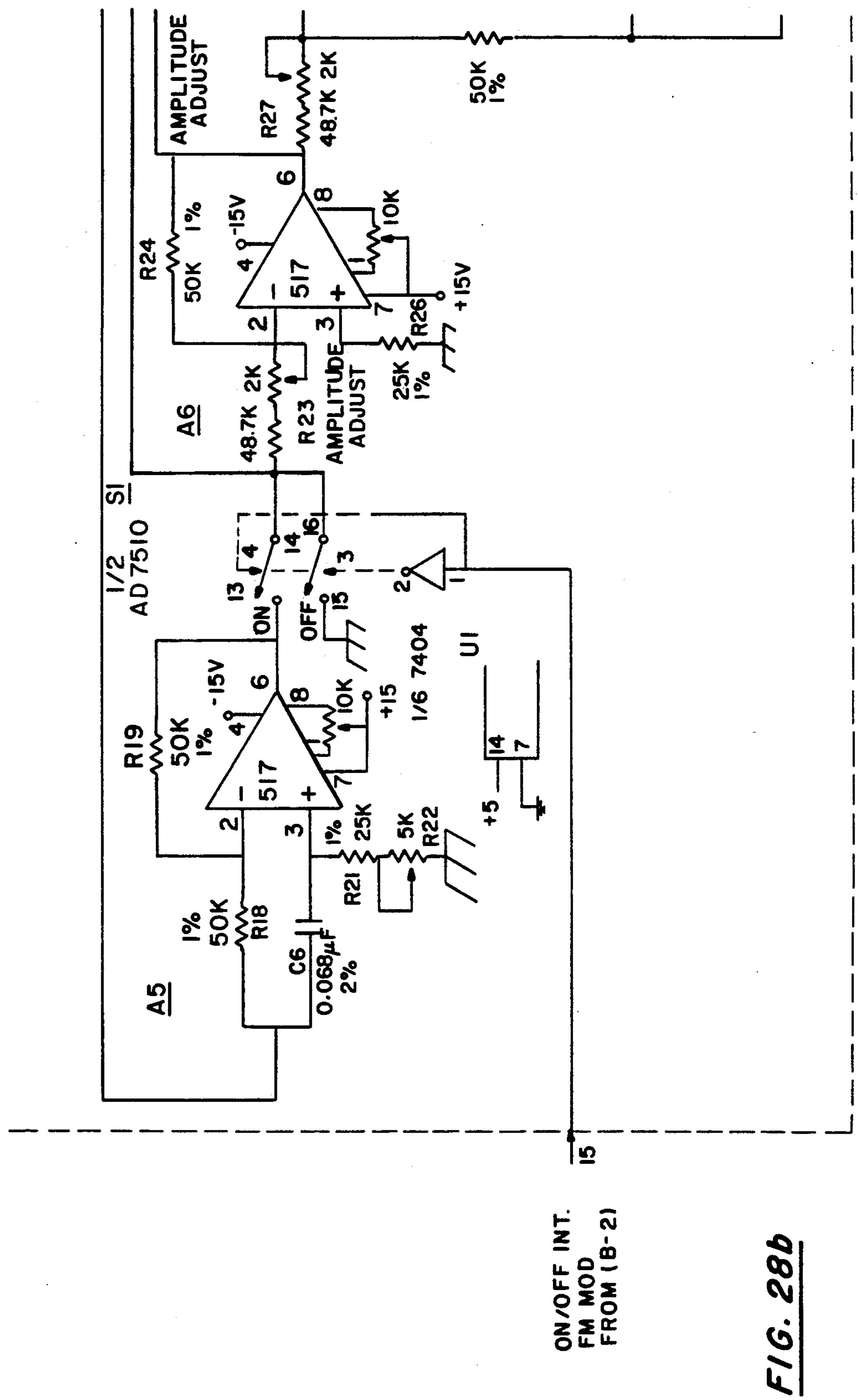
Figure 28C:
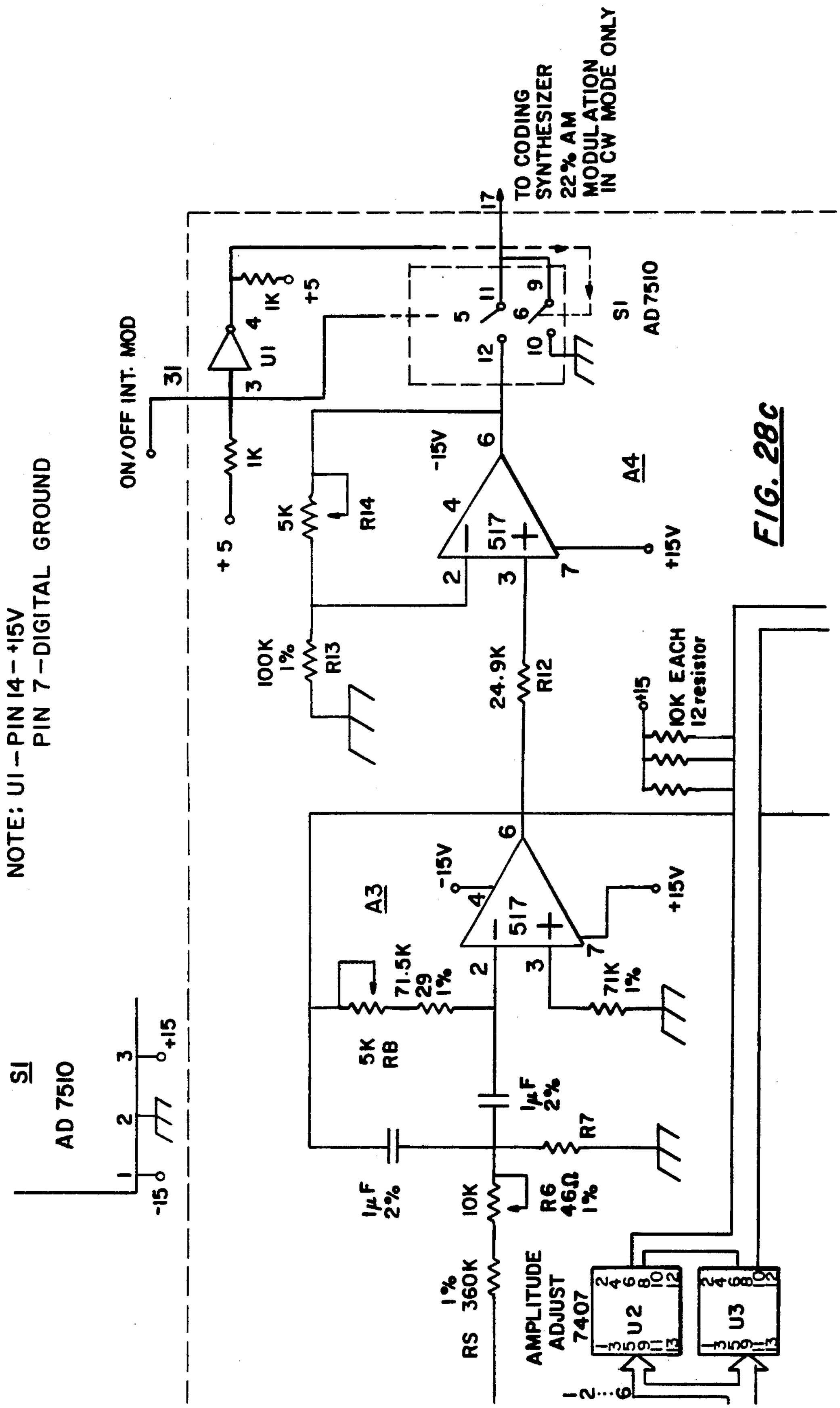
Figure 28D:
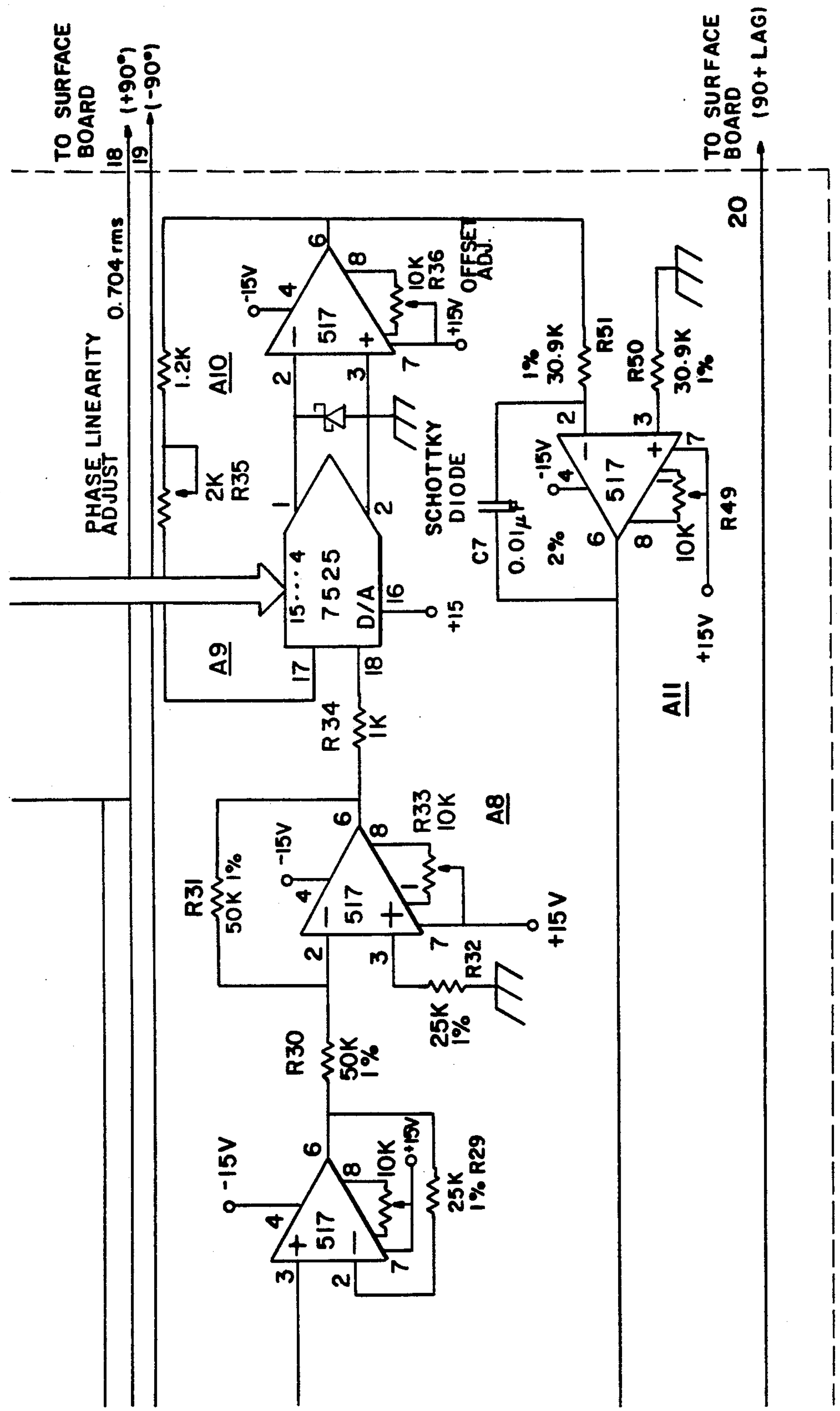
Figure 29A:
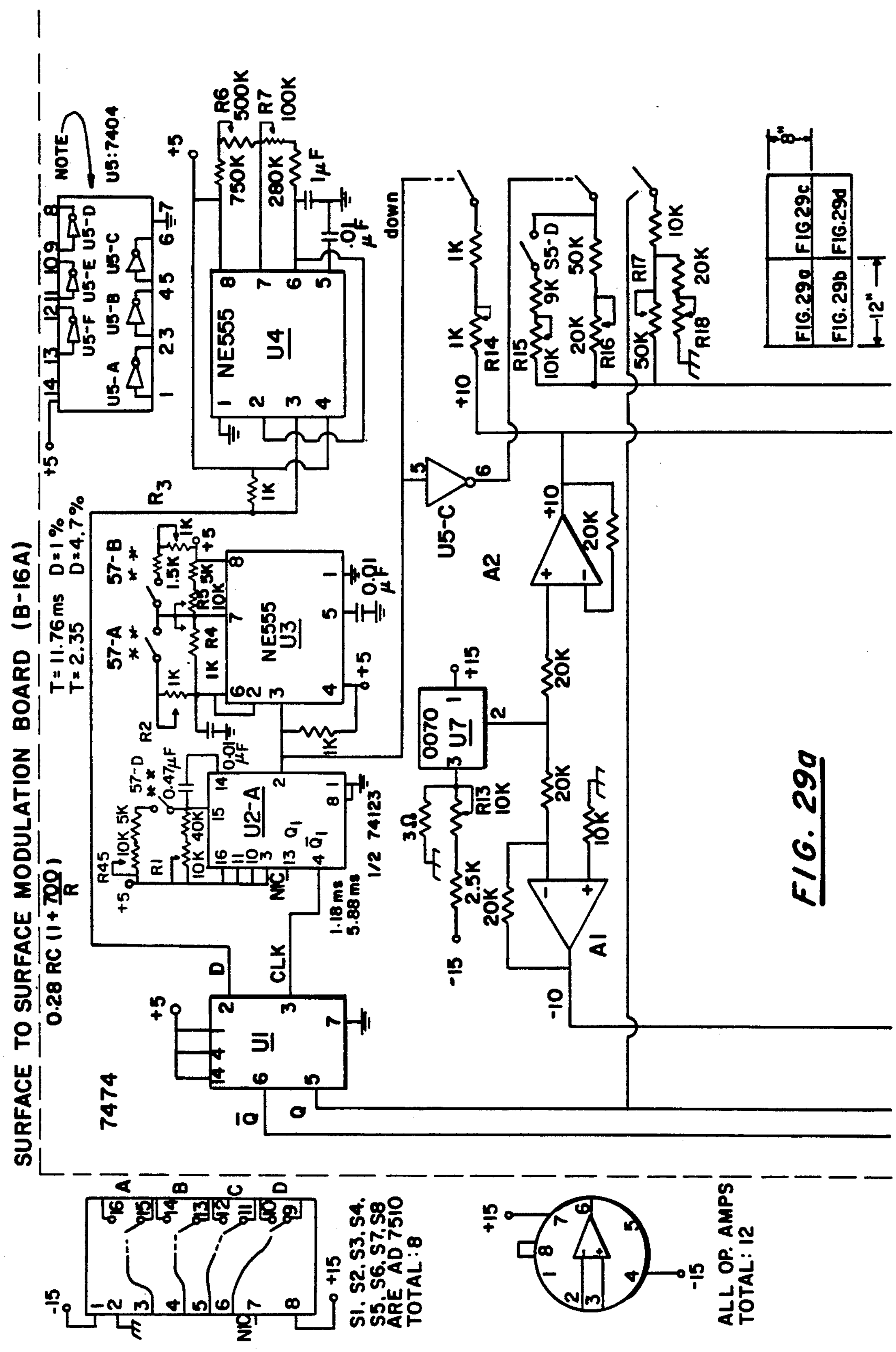
FIGS. 29a, 29b, 29c and 29d depict the surface-to-surface modulation board B-16A.
Figure 29B:
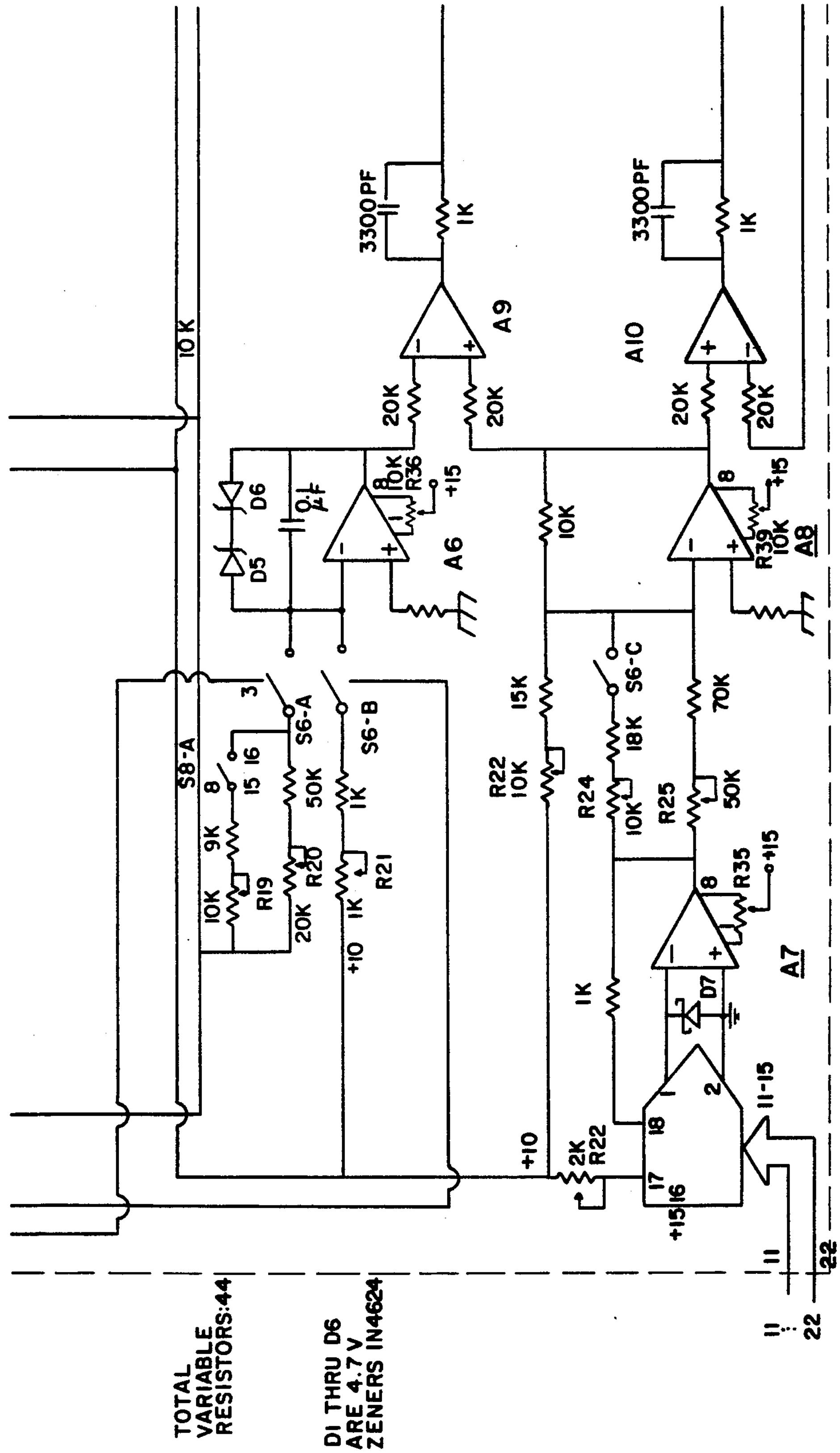
Figure 29C:
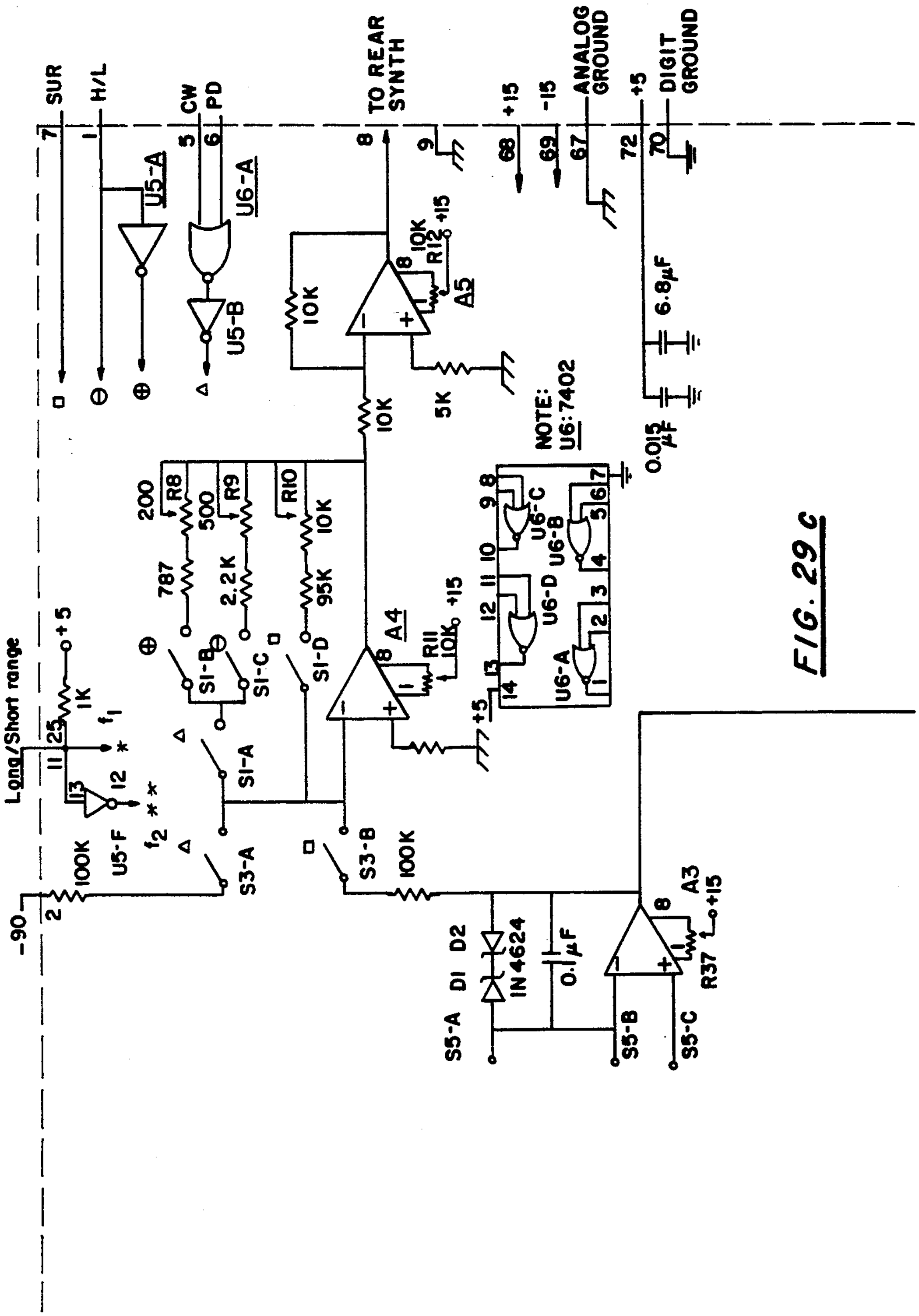
Figure 29D:
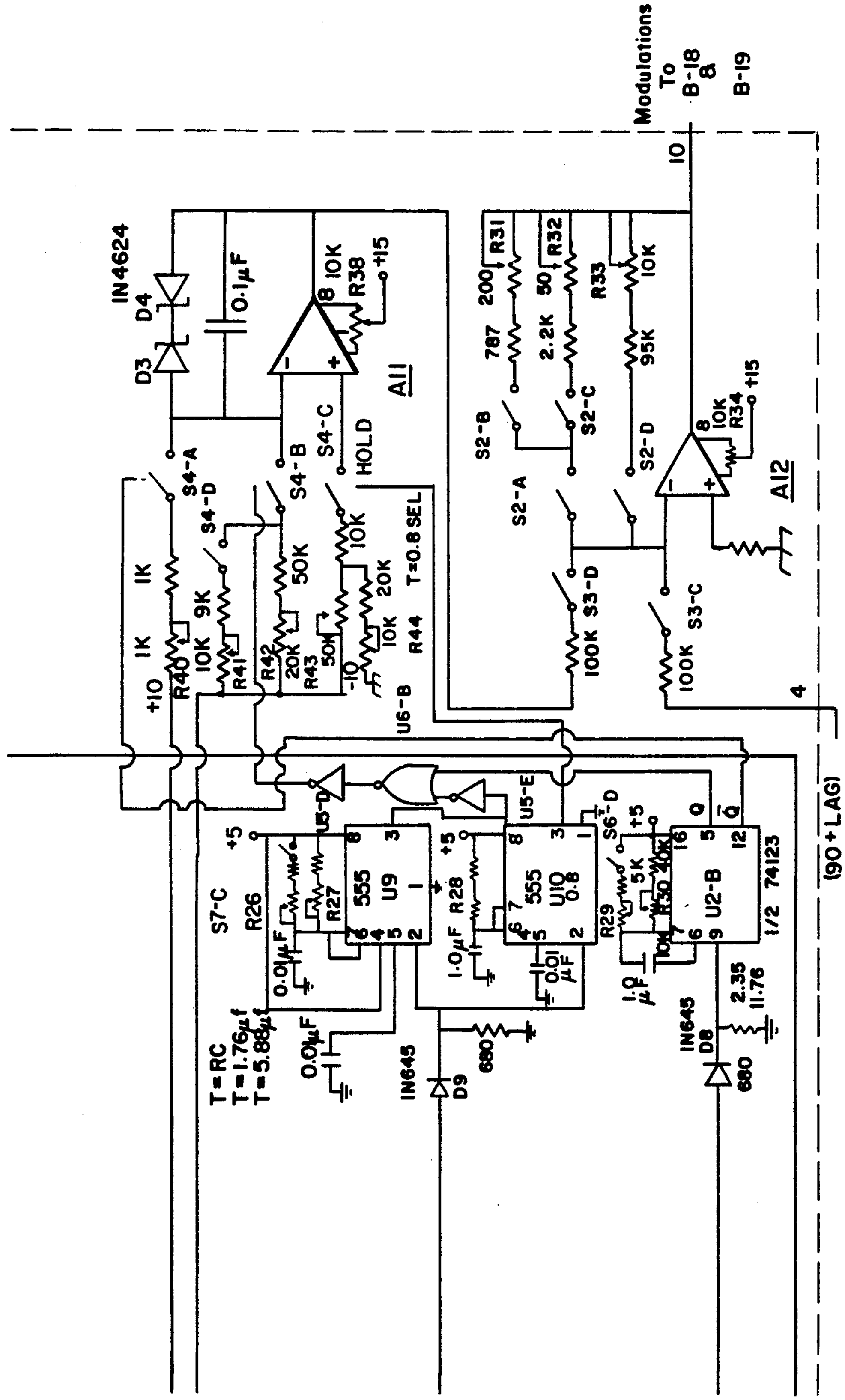
Figure 30A:
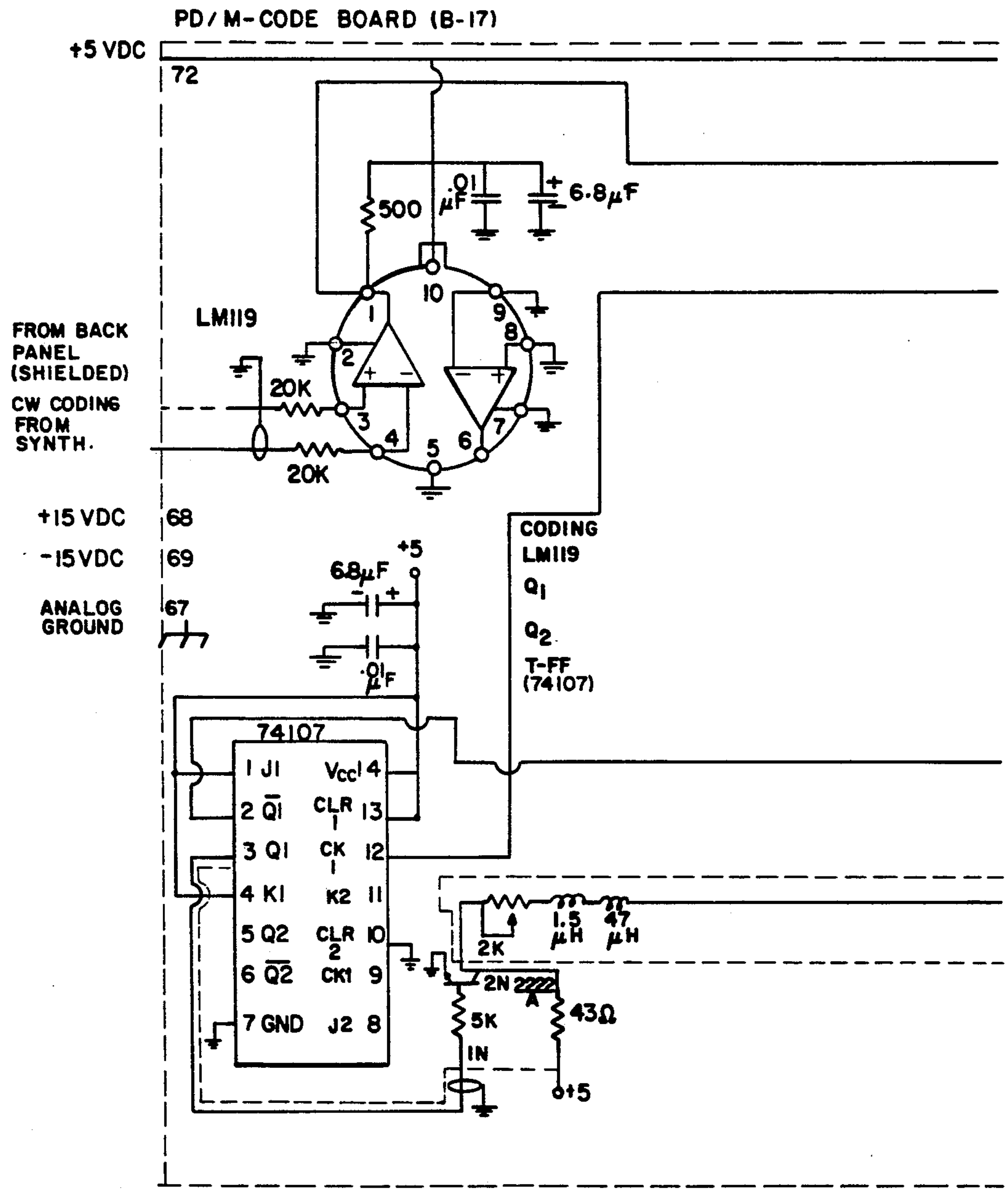
FIGS. 30a, 30b and 30c show the PD/M-code board B-17.
Figure 30B:
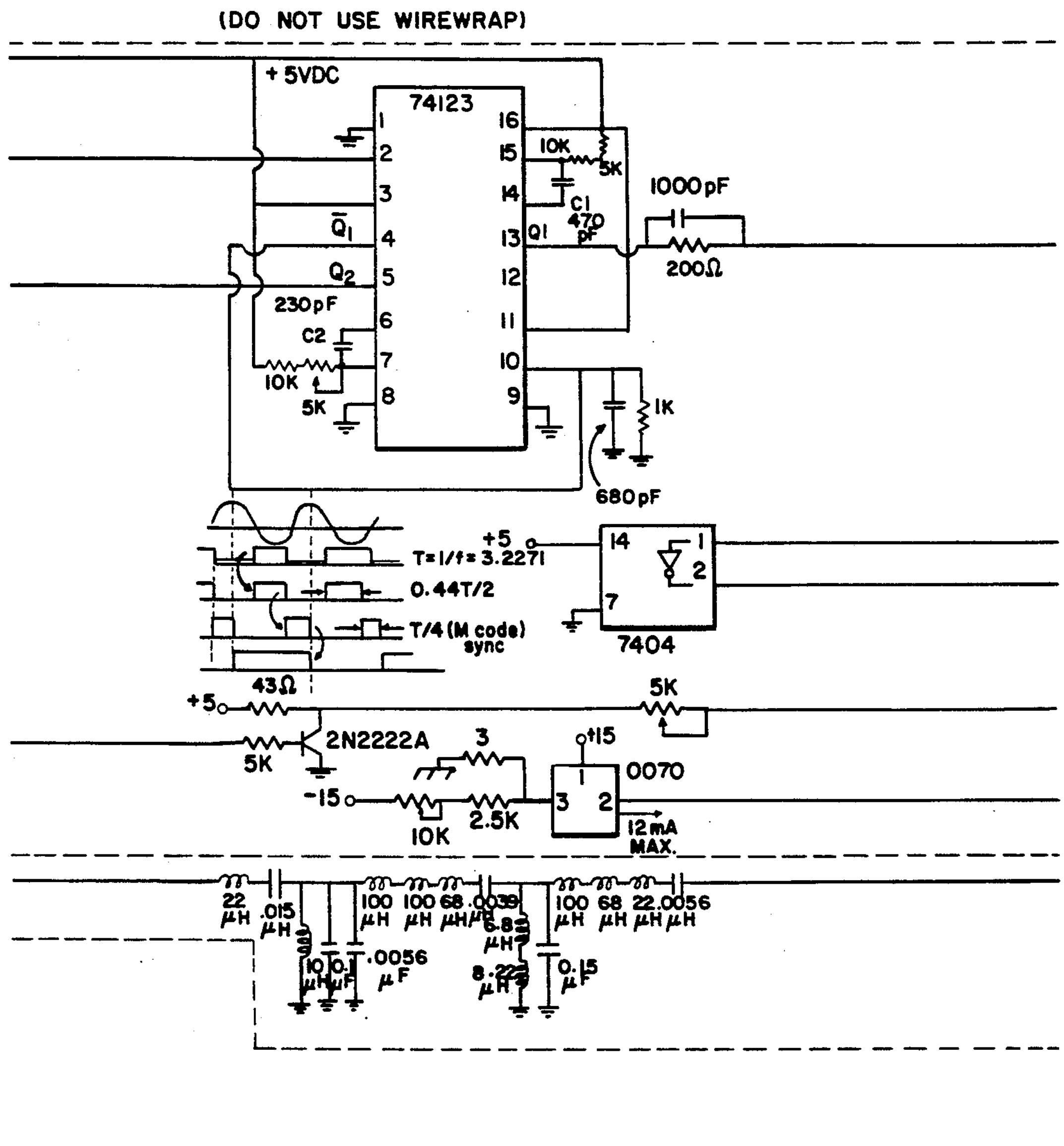
Figure 30C:
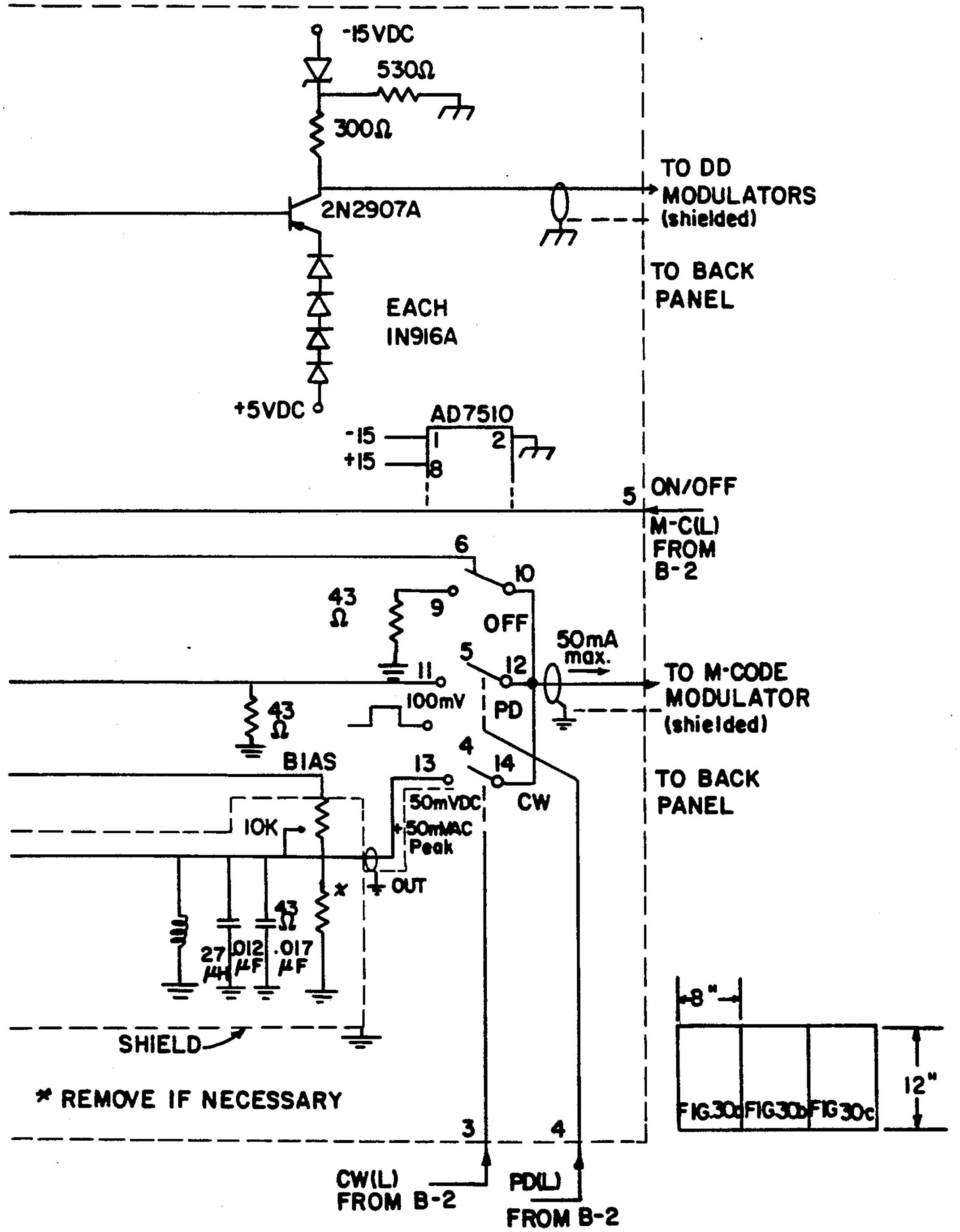
Figure 31A:
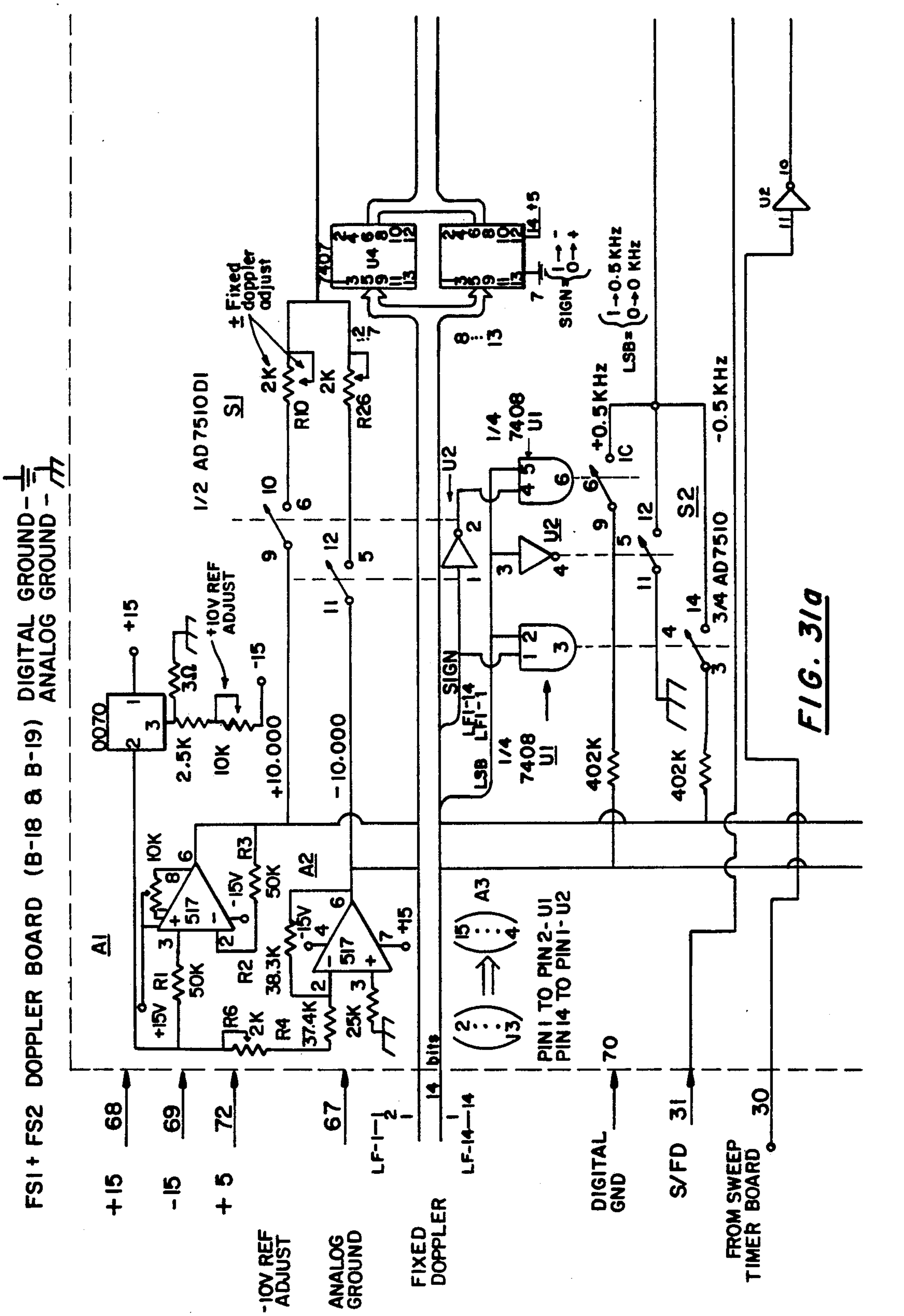
FIGS. 31a, 31b, 31c and 31d are the FS1 and FS2 Doppler boards B-18 and B-19.
Figure 31B:
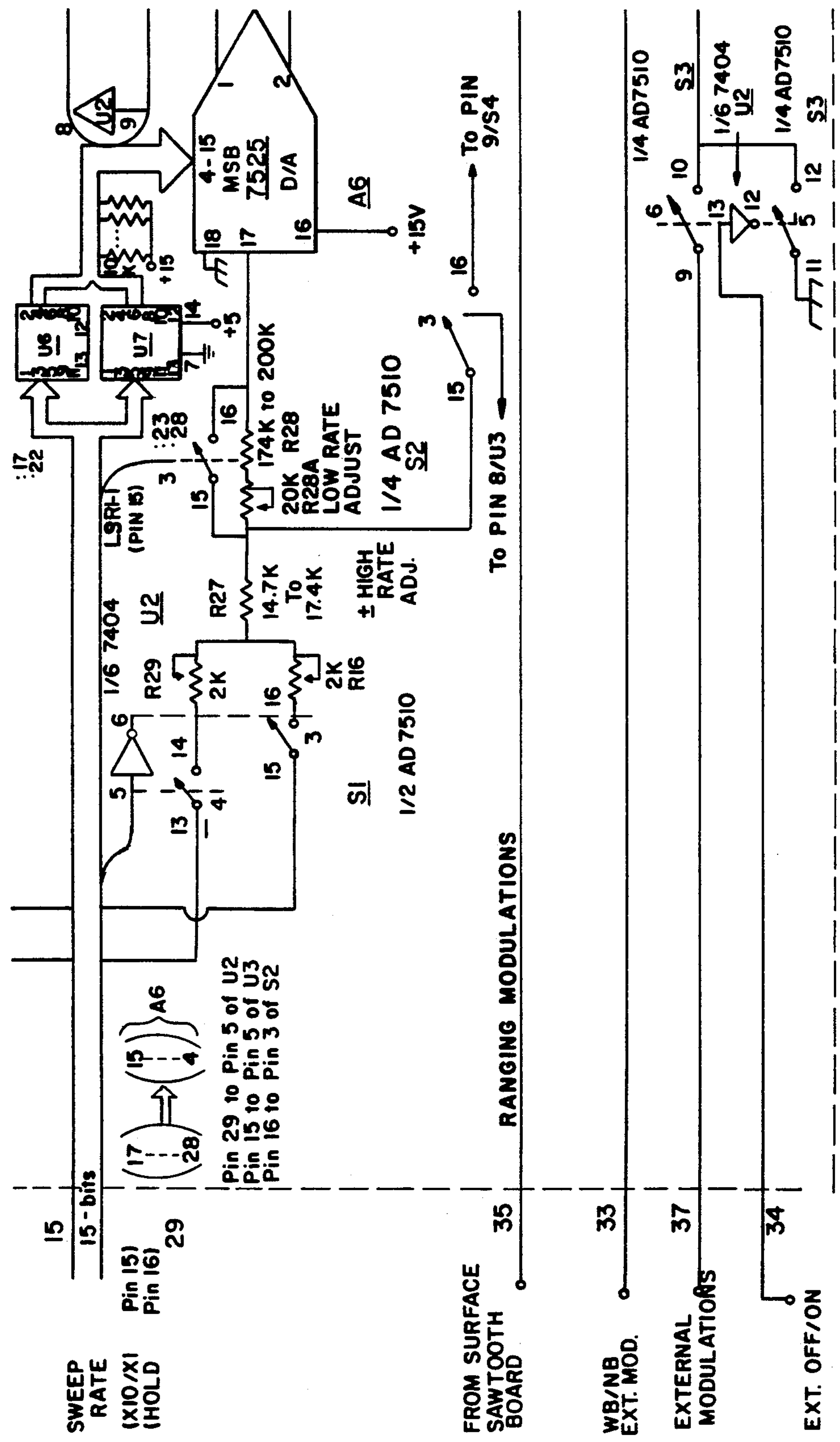
Figure 31C:
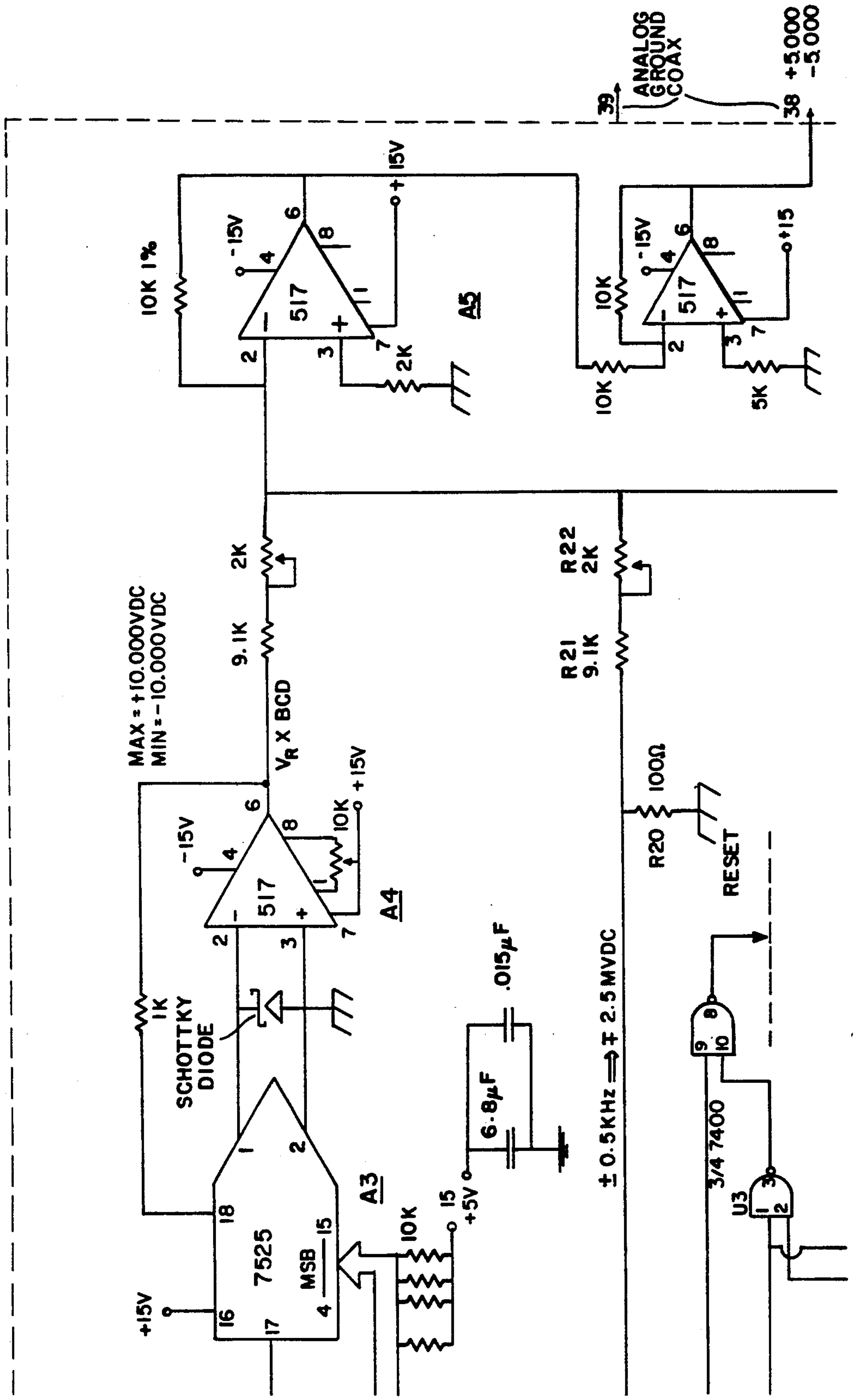
Figure 31D:
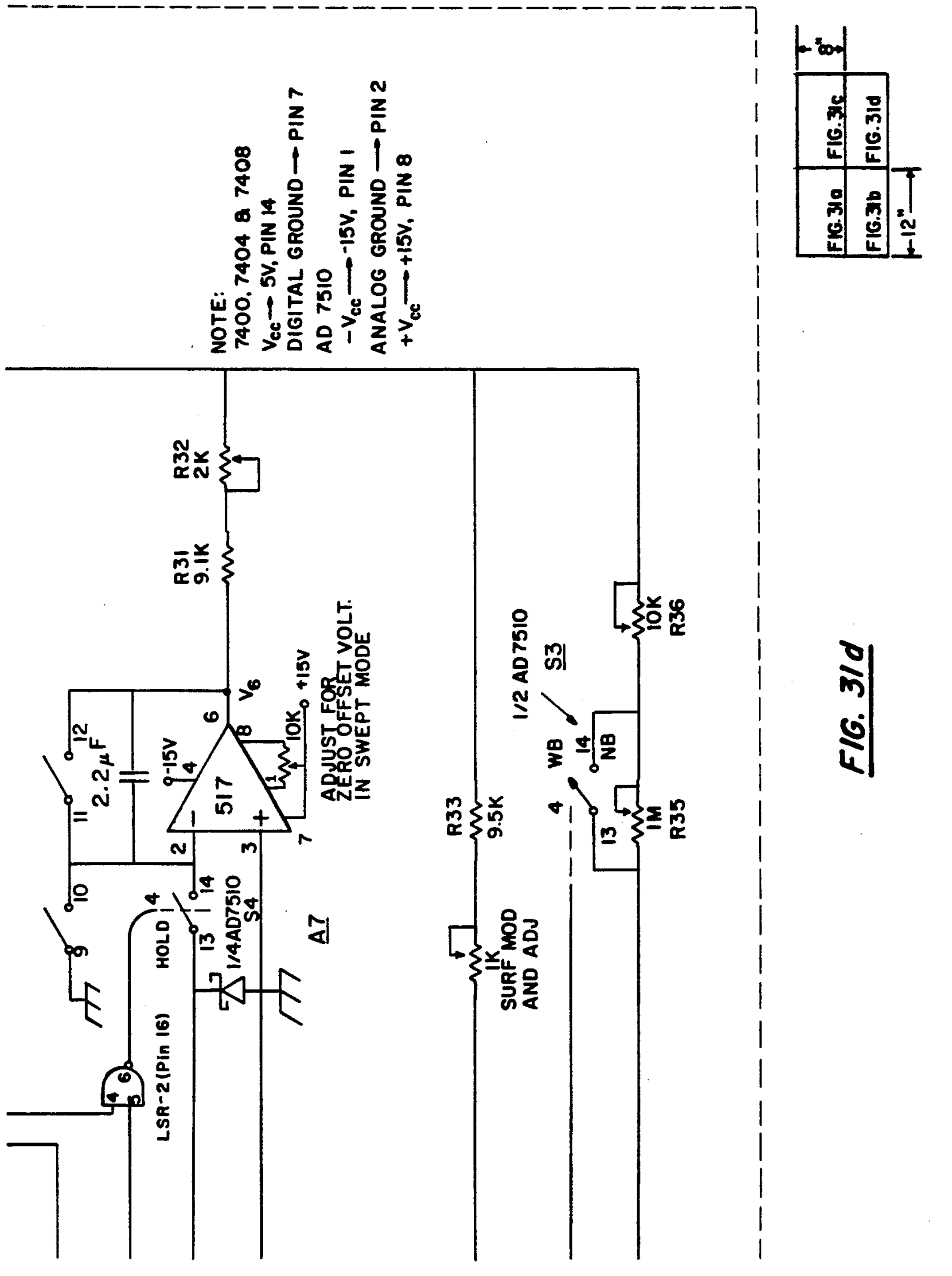
Figure 32A:
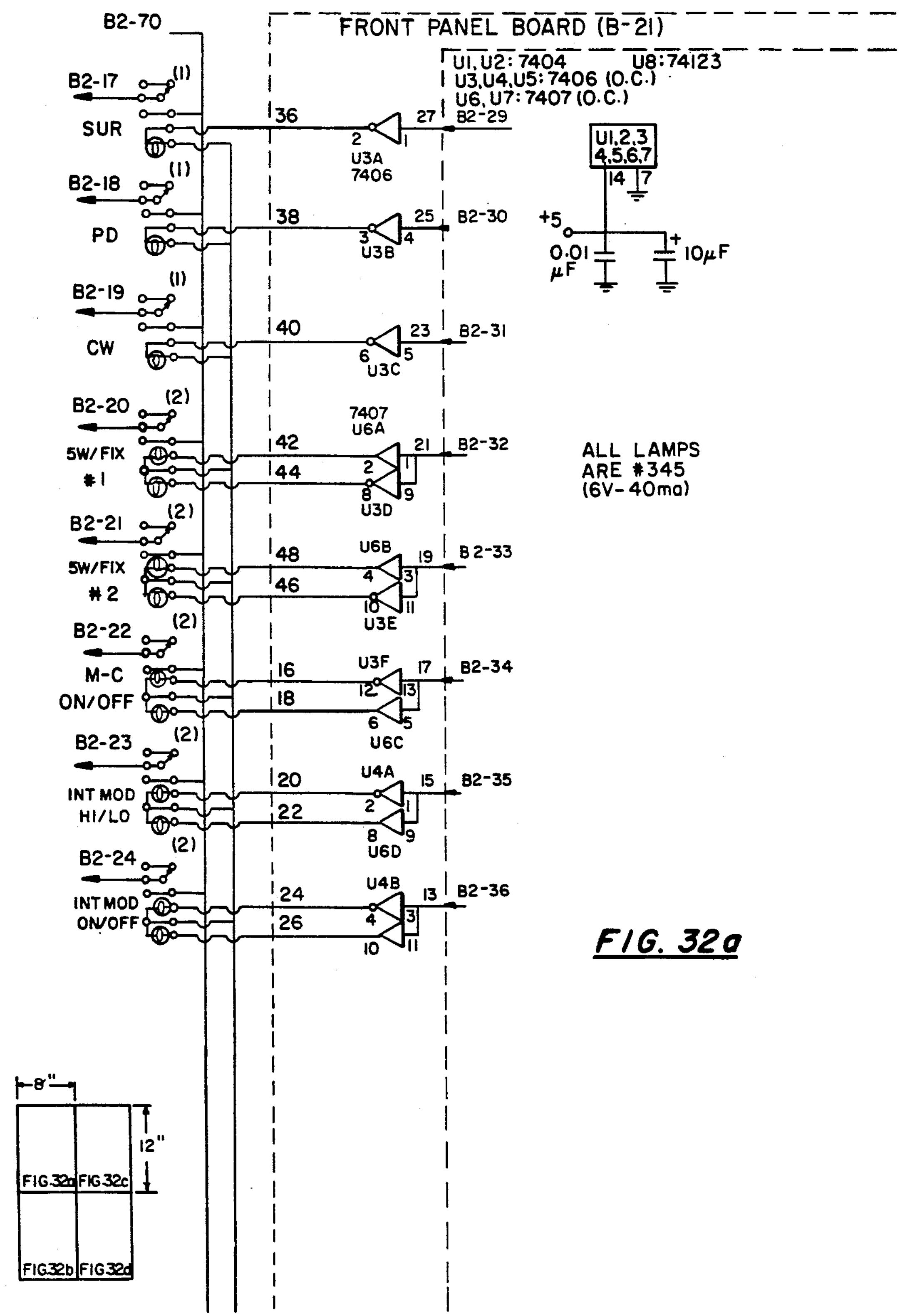
FIGS. 32a, 32b, 32c and 32d are details of front panel board B-21.
Figure 32B:
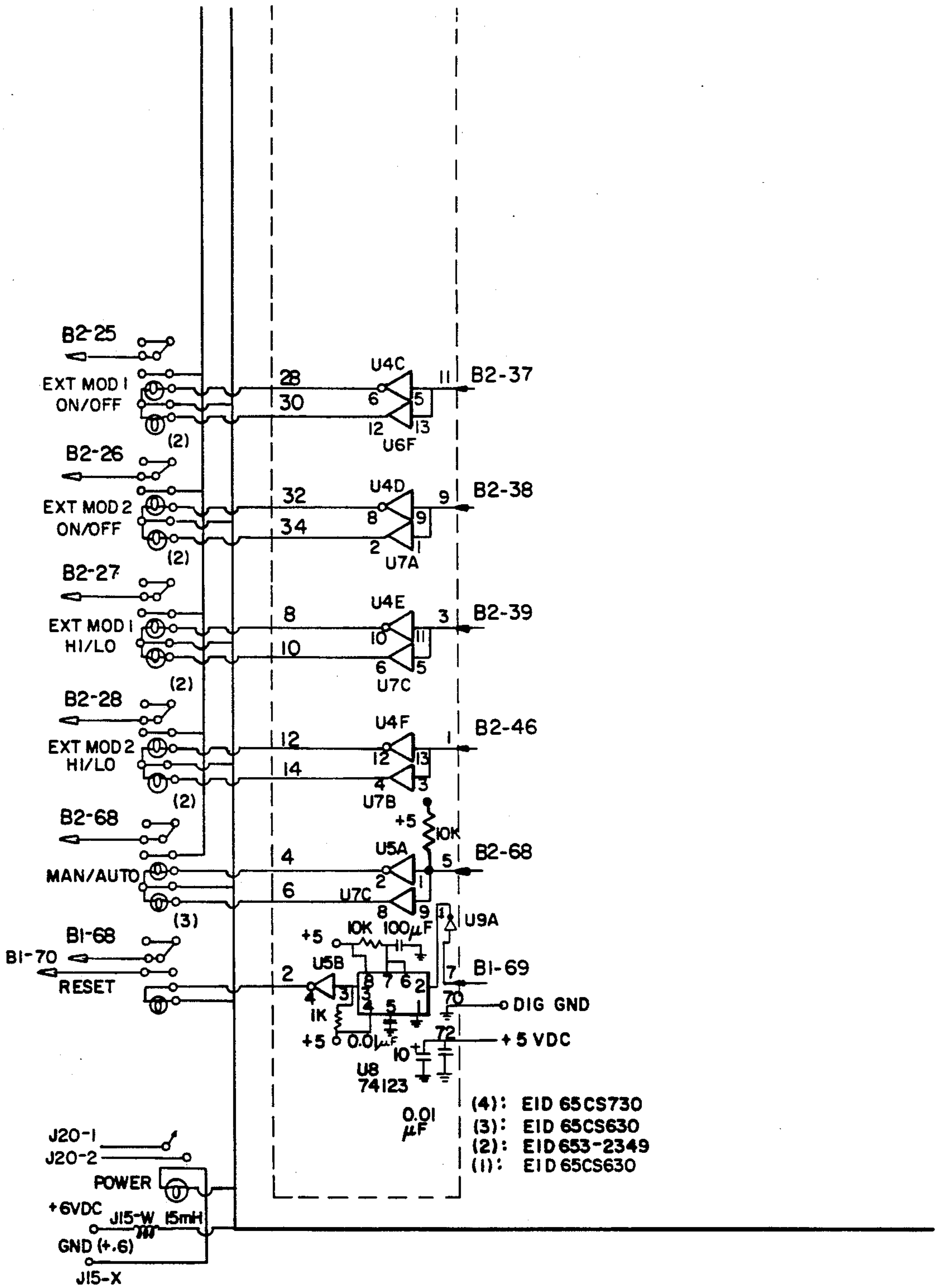
Figure 32C:
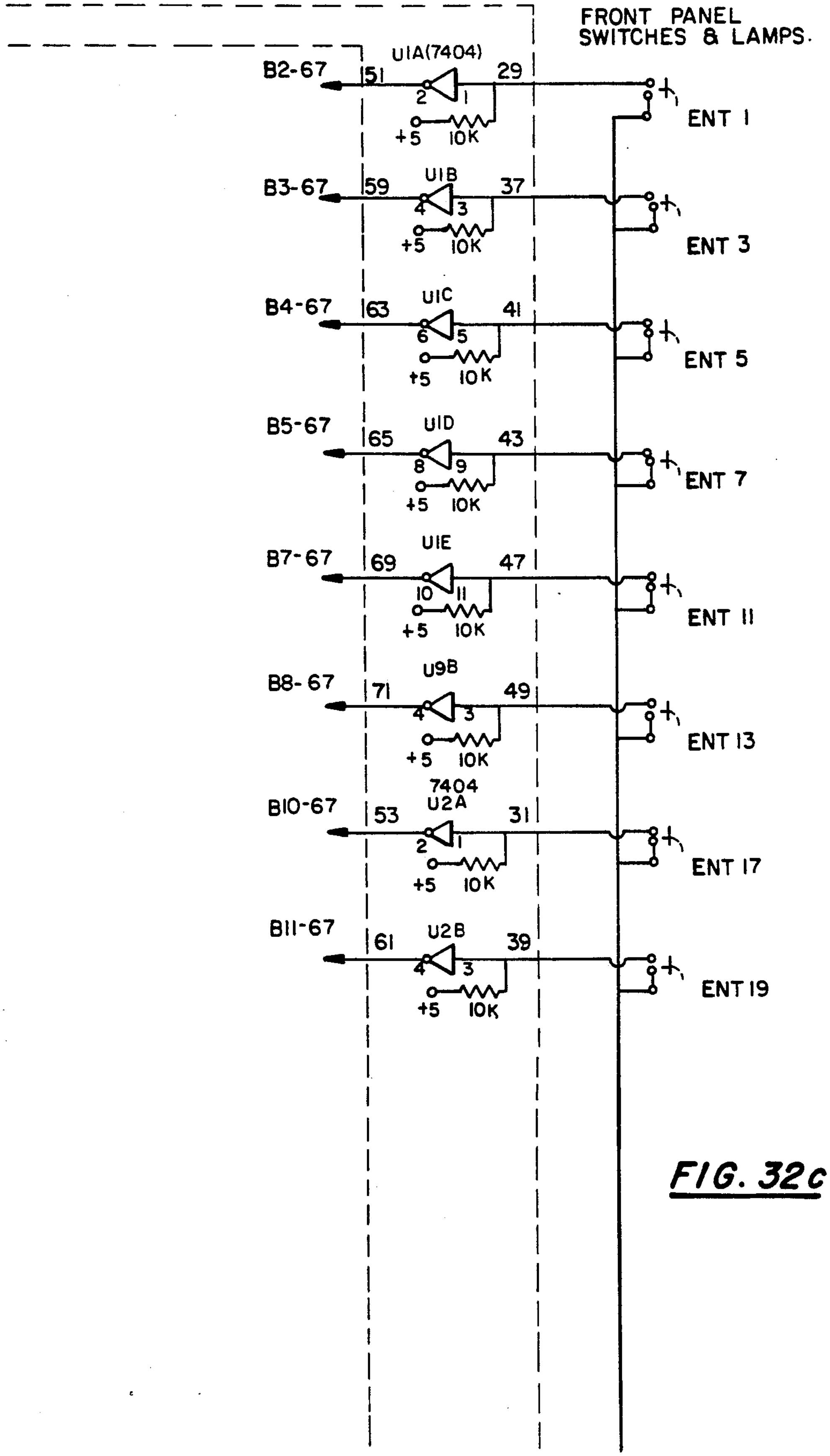
Figure 32D:
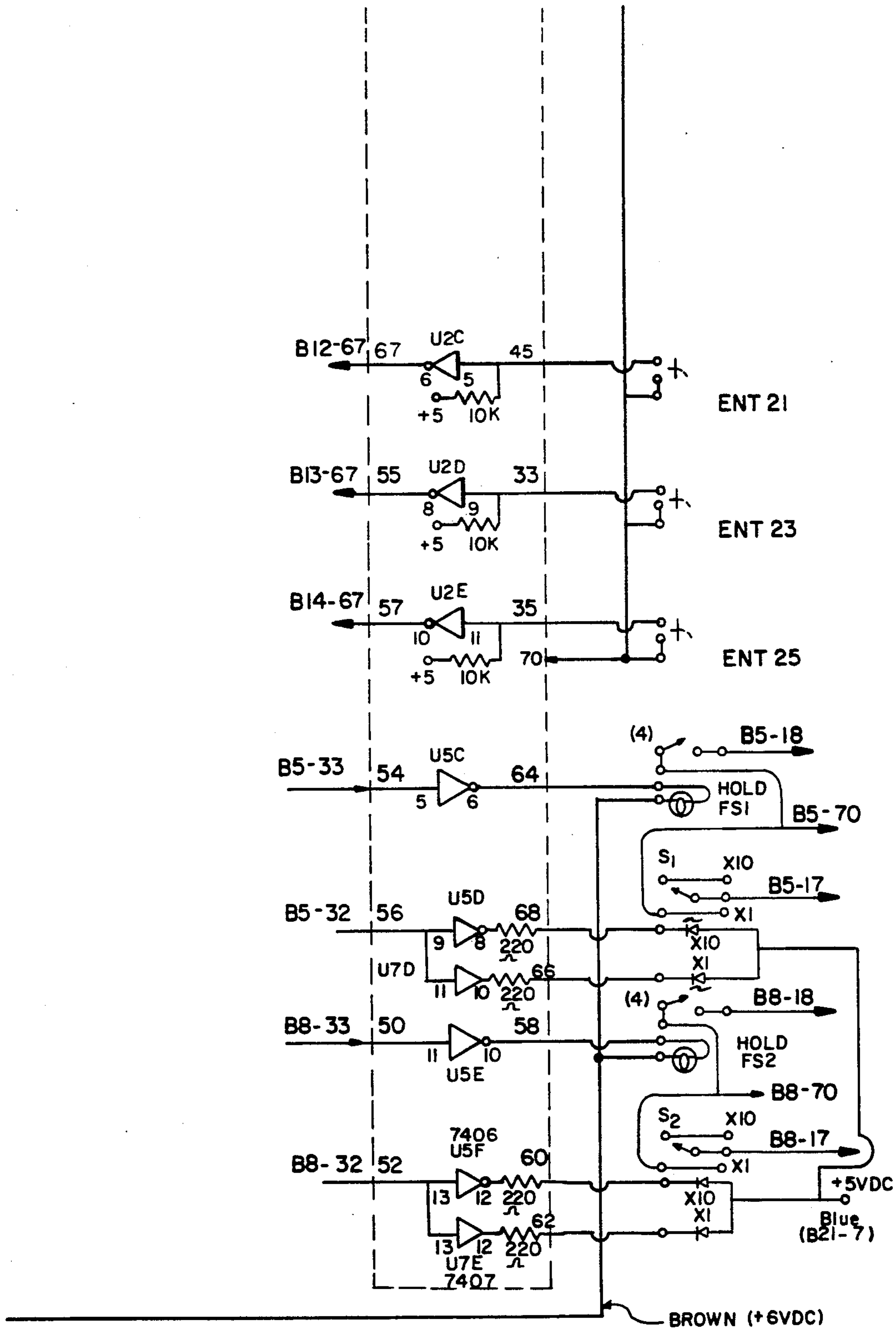
Figure 33B:
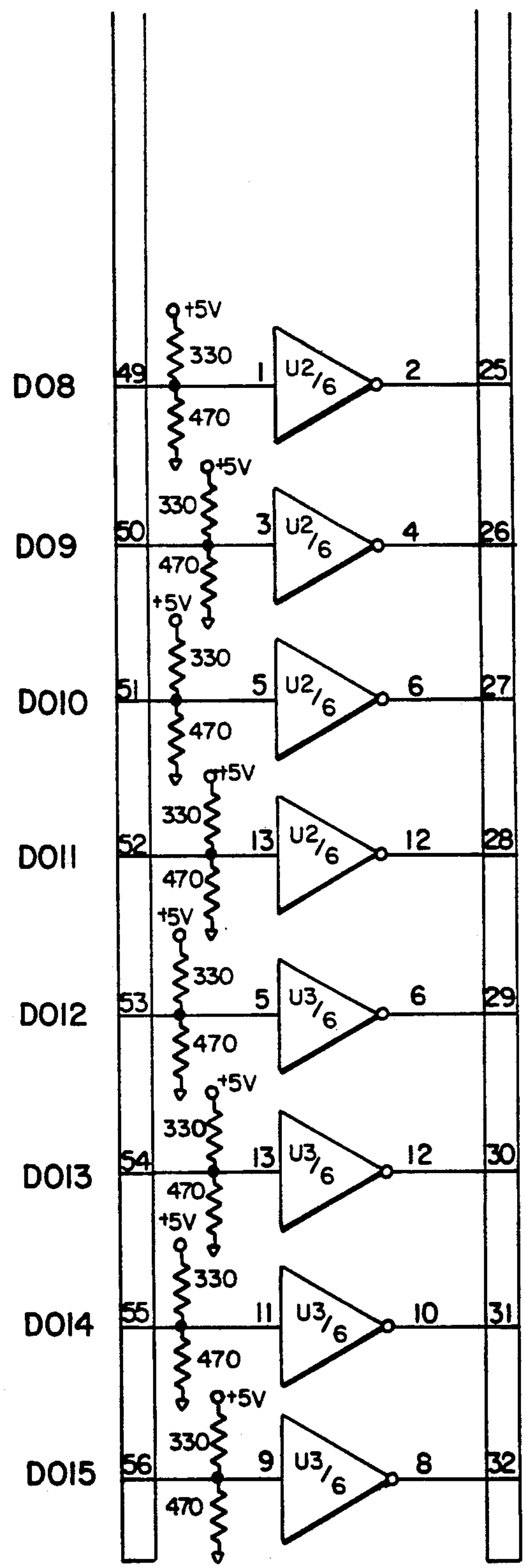
Figure 33C:
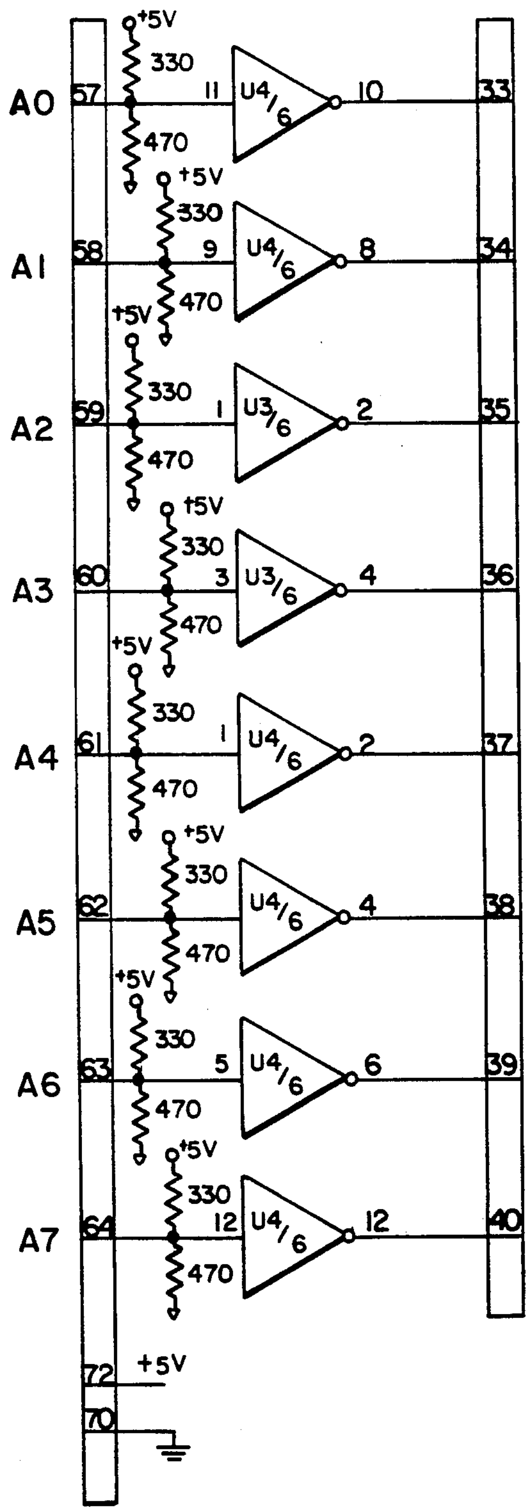
Figure 33D:
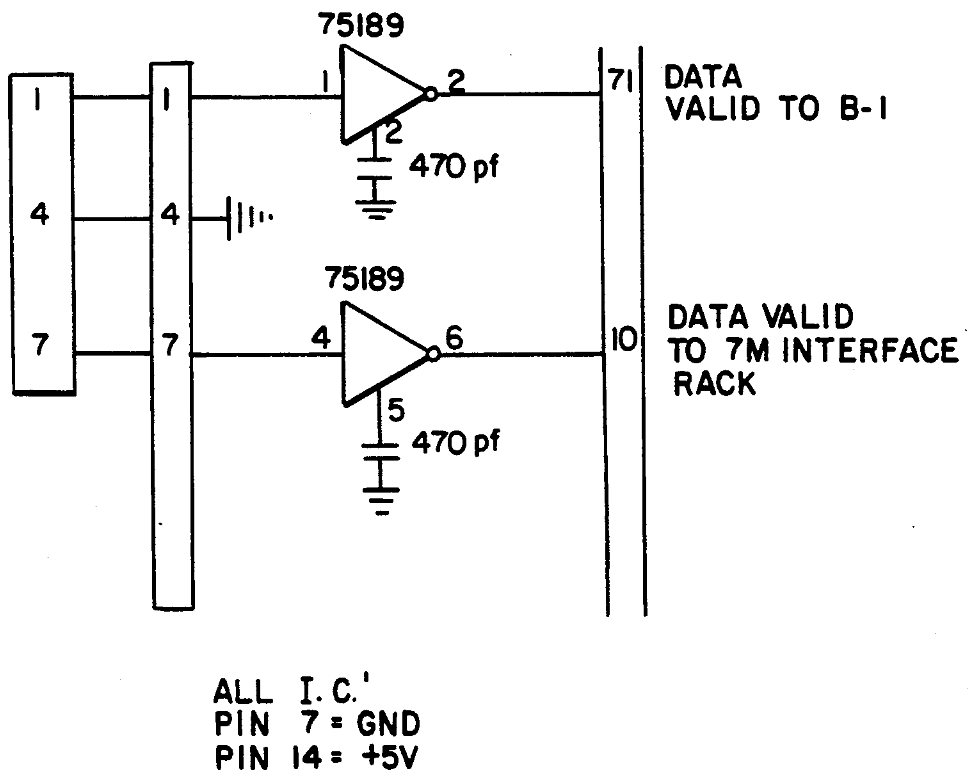

(7) FM NOISE. The simulator has been designed to provide the low FM noise requirement shown in FIG. 11*d*.

Looking to the FIGS. 12–33 the constituents of the aforedescribed boards forming the subject matter of this invention concept are shown. The composition and function of the circuit diagrams are in such detail and clarity as to enable anyone skilled in the art to which this invention pertains to make end and use the same.

Obviously many modifications and variations of the present invention are possible in the light of the above teachings. It is therefore to be understood that within the scope of the appended claims the invention may be practiced otherwise than as specifically described.

What is claimed is:

1. An apparatus for providing microwave signals to simulate a target for a missile in a fully automatic, semi-automatic or fully manual mode of operation comprising:

means (20) for providing controlling signals representative of the mode of operation;

means (40) coupled to the controlling signal providing means for synthesizing first, second and third frequency modulated IF signals and an amplitude modulated coding signal in response thereto;

means (40' and 50) coupled to the signal providing controlling means for creating digital command signals representative of three modes of operation;

means (60) coupled to the digital command signal creating means and the synthesizing means for storing the command signals and for extracting Doppler frequencies in both AC and DC forms from the synthesized first, second and third frequency modulated IF signals; and means (80) coupled to the command signal storing and Doppler frequency extracting means and the controlling signal providing means for generating microwave signals to simulate the missile.

2. An apparatus according to claim 1 in which the digital command signal creating means is a number of manually operated switches on a front panel and an external computer.

3. An apparatus according to claim 2 further including:

means (96 and 98) coupled to the microwave signal generating means for measuring the frequency and output power levels.

4. An apparatus according to claim 3 further including:

means (15) for providing D.C. power to the controlling signal providing means, the command signal storing and Doppler frequency extracting means and the microwave signal generating means.

5. An apparatus according to claim 4 in which the synthesizing means is coupled to feed AM coding signals to the signal controlling providing means to allow the feeding of responsive power level control signals to the microwave signal providing means.

6. An apparatus according to claim 5 in which the signal controlling providing means is a control section, the synthesizing means is a frequency synthesizing section, the storing and extracting means is an IF section and the microwave generating means is a microwave section.

7. An apparatus according to claim 6 in which front panels are provided for the control section and the IF section to assure a visual operator-simulator communication of the mode of simulation being transmitted.

* * * * *